(12) United States Patent
Kennell et al.

(10) Patent No.: US 9,117,201 B2
(45) Date of Patent: Aug. 25, 2015

(54) GENERATING INTERVIEW SCHEDULE RESULTS FROM A SET OF CONSTRAINT SATISFACTION PROBLEMS

(71) Applicant: HireVue, Inc., South Jordan, UT (US)

(72) Inventors: Jonathan Kennell, New York, NY (US); Sandeep Jain, New York, NY (US)

(73) Assignee: HIREVUE, INC., South Jordan, UT (US)

( * ) Notice: Subject to any disclaimer, the term of this patent is extended or adjusted under 35 U.S.C. 154(b) by 0 days.

(21) Appl. No.: 14/210,025

(22) Filed: Mar. 13, 2014

(65) Prior Publication Data

US 2014/0278682 A1  Sep. 18, 2014

Related U.S. Application Data

(60) Provisional application No. 61/779,764, filed on Mar. 13, 2013.

(51) Int. Cl.
*G06Q 10/00* (2012.01)
*G06Q 10/10* (2012.01)
*G06Q 10/06* (2012.01)

(52) U.S. Cl.
CPC ...... *G06Q 10/1053* (2013.01); *G06Q 10/06311* (2013.01); *G06Q 10/1095* (2013.01)

(58) Field of Classification Search
CPC .............................................. G06Q 10/06311
See application file for complete search history.

(56) References Cited

U.S. PATENT DOCUMENTS

| | | | |
|---|---|---|---|
| 8,065,362 B2 * | 11/2011 | Greven et al. | 709/203 |
| 2001/0032112 A1 * | 10/2001 | Linz | 705/8 |
| 2003/0204474 A1 * | 10/2003 | Capek et al. | 705/64 |
| 2008/0172284 A1 * | 7/2008 | Hartmann | 705/9 |
| 2009/0271716 A1 * | 10/2009 | Jones et al. | 715/758 |
| 2009/0313075 A1 * | 12/2009 | O'Sullivan et al. | 705/9 |
| 2011/0276507 A1 * | 11/2011 | O'Malley | 705/321 |
| 2013/0254279 A1 * | 9/2013 | Bentley et al. | 709/204 |
| 2014/0156333 A1 * | 6/2014 | Olivier et al. | 705/7.19 |

* cited by examiner

*Primary Examiner* — Sujay Koneru
(74) *Attorney, Agent, or Firm* — Lowenstein Sandler

(57) ABSTRACT

Interview scheduling technologies are described. In one method, the interview-scheduling tool presents an interface to receive candidate availability information from a user for possible interview schedules for an interview candidate. The user interface permits the user to define an interview schedule framework that specifies desired criteria for a desired interview schedule for the interview candidate. The desired criteria of the interview schedule framework specify one or more interview sessions. The interview-scheduling tool receives the candidate availability information and the desired criteria and defines a data structure representing the interview schedule framework, wherein the data structure comprises a set of constraint satisfaction problems (CSPs). The interview-scheduling tool presents the interview schedule results that fit the desired interview schedule for selection by the user. The interview schedule results are automatically generated from the set of CSPs by a constraint solver tool and without additional user interaction at the user interface.

22 Claims, 29 Drawing Sheets

| Schedule System | Schedule | Interviewers | Rooms | | Plugins | User | Help |
|---|---|---|---|---|---|---|---|

Interview Schedule

| + Schedule Interview | Search candidates | ☐ Search only interviews you created | | List view | Calendar view |
|---|---|---|---|---|---|

| Thur Jan 28 | 11:30am - 2:30pm | John Smith for Candidate | |
|---|---|---|---|
| | 11:30am - 2:30pm | Coding with Sandeep Jain (declined) | 7th Board Room(12) (declined) |
| | 12:30am - 1:30pm | Lunch with Nick Bosch (declined) | 7th Board Room(12) (declined) |
| | 1:00pm - 1:30pm | Algorithms with Jonathan Kennell (declined) | 7th Board Room(12) (declined) |
| | 1:30pm - 2:30pm | Sell Interview with Clark Kent (declined) | 7th Board Room(12) (declined) |

| Wed Mar 6 | 3:00pm - 6:00pm | John Smith for Marketing Manager | |
|---|---|---|---|
| | 3:00pm - 4:00pm | Management Interview with Jonathan Kennell (accepted) | 212 Labs HQ (accepted) |
| | 4:00pm - 5:00pm | Cultural Interview with Sandeep Jain (declined) | 212 Labs HQ (accepted) |
| | 5:00pm - 6:00pm | Marketing Interview with Nick Bosch (accepted) | 212 Labs HQ (accepted) |

*Fig. 2A*

Schedule Interview

102 —

| Schedule System | Schedule | Interviewers | Rooms | | Plugins | User | Help |

104

1. Enter candidate information » 2. Design interview » 3. Select proposal » 4. Final review

Candidate name

Carl Candidate

Requisition

Software Engineer

[Next]

Candidate availability

[▼][▲] [today]    Feb 24 -- Mar 2 2013

| | Sun 2/24 | Sun 2/24 | Sun 2/24 | Sun 2/24 | Sun 2/24 | Sun 2/24 | Sun 2/24 |
|---|---|---|---|---|---|---|---|
| all-day | | | | | | | |
| 9am | | | | | | | |
| 10am | | | | 10:00 - 3:00 | 10:00 - 3:00 | | |
| 12pm | | | | | | | |
| 1pm | | | | | | | |
| 2pm | | | | | | | |
| 3pm | | | | | | | |
| 4pm | | | | | | | |
| 5pm | | | | | | | |
| 6pm | | | | | | | |

Hint: click "all-day" to select 9a - 6p

[Next]

| Reschedge | Interviews | Interviewers | User | Help |

Schedule Interview

1. Enter Details → 2. Select Proposal → 3. Customize

Back to Event List

| | Thu 8/2 | | ☐ Keep entire interview schedule | Back |
| --- | --- | --- | --- | --- |
| | 11 -12p Algorithms | | ☑ Keep Algorithms interview at 11-12p | Reschedule |
| | Cercei Lannister (3/9) | | ☐ Keep Coding interview at 12p-12:30p | |
| | | | ☐ Keep Lunch / Culture Fit interview at 12:30p-1:30p | Customize |
| | 12p - 112:30p Coding | | ☐ Keep Presentation Skills interview at 1:30p-3p | |
| | Tyrion Lannister (1/4) | | | Candidate Summary |
| | 12:30p - 1:30p Lunch / Culture Fit | | ☐ Keep all interviewer assignments | |
| | Arya Stark (4/4) | | ☐ Keep Cersei Lannister as Algorithms interviewer | Interviewer Summary |
| | | | ☑ Keep Tyrion Lannister as Coding interviewer | |
| | 1:30 - 3p Presentation Skills | | ☑ Keep Arya Stark as Lunch / Culture Fit interviewer | Add to Calendar |
| | Daenarys Targaryen (4/6) | | ☐ Keep Daenarys Targaryen as Presentation Skills interviewer | |
| | | | | |
| | | | Cancel     View Proposals | Save changes |

*Fig. 2G*

Carl Candidate
back to interview schedule

Scheduling System | Schedule | Interviewers | Rooms | | User | Help

Thursday, January 3rd

| 12 - 12:45p | Jonathan Kennell ⊙ and Steve Stevey |
| Cool Cafe | Lunch |

| 12:45 - 1:45p | Bruce Wayne |
| Interview Room 1 | Algorithms |

| 1:45 - 2:45p | Sandeep Jain⊙, Bruce Banner, and Skippy-Skeedo |
| Interview Room 2 / Remote Room Z | Coding |

| 2:45 - 3:15p | Clark Kent |
| Clark's Office | Sell Conversation |

+ add interview

☑ Notes

⌘ Attachments  Add attachment
☐ Carl Candidate Resume.doc  ✕
☐ Phone Screen Feedback.doc  ✕

☎ Sync to Calendar ☐

☒ Notifications
☒ Notify me when interviewers accept or decline this interview

↻ Reschedule | 🖶 Print | ✉ Send Email | 🗑 Remove cancel | Save changes

| Calendar Conflict? | Invite Status | Presentation | Examples |
|---|---|---|---|
| YES(visible) | "Accepted" | Normal, with checkmark | Accepted (conflicts with "Lunch")<br>Jonathan Kennell ✓ |
| YES(visible) | Anything other than "Accepted" | Strikethrough | No response (conflicts with "CEO Meeting")<br>Jonathan Kennell |
| YES(hidden) | Anything other than "Accepted" | Strikethrough | Tentatively accepted (has conflict)<br>Jonathan Kennell |
| NO | No response, or "Maybe" | Normal | No response — Tentatively accepted<br>Jonathan Kennell — Jonathan Kennell |
| NO | "Declined" | Strikethrough | Declined<br>Jonathan Kennell |
| NO | "Accepted" | Normal, with checkmark | Accepted<br>Jonathan Kennell ✓ |

Manage Interviewers

| | Name | Email | Interviews per week | Tags | |
|---|---|---|---|---|---|
| ☐ | Arya Stark | arya@domain.com | 4 / 6 | (frontend) (senior) | |
| ☐ | Cersei Lannister | cersei@domain.com | 4 / 4 | (sysops) | |
| ☐ | Daenarys Targaryen | daenarys@domain.com | 3 / 8 ☞ | (frontend X) (senior X) [+ add tags] | cancel Save |
| ☐ | Tyrion Lannister | tryrion@bozo.com | 0 / 8 | (warehouse) | |
| ☐ | Ygriite | ygriite@domain.com | 1 / 4 | (warehouse) (sysops) | |

Scheduling System | Schedule | Interviewers | Rooms | User | Help

+ Add interviewers | Edit Selected ▼ | Columns ▼ Show 25 ▼ 1-5 of 5 cancel all  Save all

+ Add interviewers | Edit Selected ▼ | Columns ▼ Show 25 ▼ 1-5 of 5

*Cancel all / Save all only appear if multiple people are being edited*

Fig. 5

| Scheduling System | Schedule | Interviewers | Rooms | | User | Help |
|---|---|---|---|---|---|---|

Manage Interview Rooms
back to home screen

| + Add interviewers rooms | Edit Selected ▼ | 3 interview rooms selected | | Show 25 ▼ | 1-5 of 5 ▲▼ |
|---|---|---|---|---|---|

Search

| | Room ID | Email | Use be default ? | Max Occupancy | Tags |
|---|---|---|---|---|---|
| ☐ | CR-NYC-14-12-BR | Boardroom | no | 12 | (New York) |
| ☑ | CR-NYC-14-12-BR | Phonebooth 11 | no | 1 | (New York) |
| ☑ | CR-SFO-IR-4 | Interview room 4 | yes | 2 | (San Francisco) |
| ☑ | CR-SFO-IR-5 | Interview room 5 | yes | 2 | (San Francisco) |
| ☐ | CR-NYC-HEMI | Hemispheres Cafe | no | 350 | (New York) (Cafeteria) |

| + Add interviewers rooms | Edit Selected ▼ | 3 interview rooms selected | | Show 25 ▼ | 1-5 of 5 ▲▼ |
|---|---|---|---|---|---|

Edit Selected
Remove Selected

*Columns can be re-ordered by dragging and dropping*

*Only rooms that can be booked on calendar should be added. Unbookable locations can be specified manually.*

*Fig. 10*

| Name | Name | |
| --- | --- | --- |
| Carl Coolguy | Carl Coolguy | If left blank, reverts to the email address |

| Title | Title |
| --- | --- |
| Director of Directing | Director of Directing |
| | optional |

Email: carl@domain.com
Linked calendars: 2

*These are both read-only (no edit mode)*

| Interviews per week | Interviews per week |
| --- | --- |
| 4 / 4 | 3 / 8 ▸ |

| Hours available | Hours available |
| --- | --- |
| 9am - 6pm | 9:00 am ▸ — 6:00 pm ▸ | Not applicable |

| Days available | Days available |
| --- | --- |
| M, T, W, R, F | M ☑ T ☑ W ☑ R ☑ F ☑ Sa ☐ Su ☐ | Not applicable |

| Scheduling System | | User | Help |
|---|---|---|---|
| Basic Information | | | |
| Name | Carl Coolguy | | |
| Email address | carl@domain.com | | |
| Name | | | |
| Tags | (frontend) (senior) (engineering) | 👆 Basic information is read-only to interviewers | |
| Interviewing Availability | | | |
| Availability mode | ○ Available unless calendar has a conflicting event | | Availability information can be edited by the interviewer. |
| Linked calendars | 📅 carl@domain.com   📅 ccoolguy@gmail.com | | |
| Additional unavailable times | Mon Dec 17 4p - 6p, Tuesday 12p - 6p | | |
| Schedule interviews between | 9am and 6pm | | |
| Schedule interviews on | Monday, Tuesday, Wednesday, Thursday, or Friday | | |
| Max interviews per week | Unlimited | | |

Scheduling System | Schedule | Interviewers | Rooms | User | Help

Carl Candidate — 104
back to interview schedule

Thursday, January 3rd

12 - 12:45p — Jonathan Kennell ⊙ and Steve Stevey
Cool Cafe — Lunch - Take candidate to Cool Café and allow them..

1:00 - 2:00p — Bruce Wayne
Interview Room 1 — Algorithms

2:00 - 3:00p — Sandeep Jain⊙, Bruce Banner, and Skippy Skeedo
Interview Room 1 / Remote Room Z — Coding 3:00 - 3:30p — Clark Kent
Clark's Office — Sell Conversation + add interview 9am
10am
11am
12pm
1pm
2pm
3pm
4pm
5pm
6pm ✏️ Notes 📎 Attachments   Add attachment
☐ Carl Candidate Resume.doc ✕
☐ Phone Screen Feedback.doc ✕

🗓 Sync to Calendar ☐
   Calendar [ Interviews ▸ ]
▸ Send invitations
▸ Include notes and attachments
   Additional Attendees
   [ Add attendee ]   Add ✉ Notifications
▸ Notify me when interviewers accept or decline this interview 🔄 Reschedule    🖨 Print    ✉ Send Email    🗑 Remove                    cancel    Save changes

Interviewers
Interviewers: Jonathan Kennell ⊘ ✕    sj@aol.com ✕
Add interviewers
Search
All interviewers in group  Engineering ✕
Sandeep Jain
Bruce Wayne
Karl Koolguy
Ponytail Pete (conflicts with "Sleeping")
Add
cancel    Save

*Search box does not allow unrecognized names, but it DOES allow unrecognized email addresses.*

*When unrecognized email is entered we show the "add interviewer" flow after the user clicks "Save".*

*It is an ERROR to Save without specifying at least one interviewer*

Interviewers
   Accepted (conflicts with "Lunch")
Interviewers: Jonathan Kennell ⊘ ✕
Add interviewers
Search
Sandeep Jain
Bruce Wayne
Karl Koolguy
Ponytail Pete (conflicts with "Sleeping")
Add
cancel    Save Interviewers
   Declined
Interviewers: Jonathan Kennell ✕
Add interviewers
Search
Sandeep Jain
Bruce Wayne
Karl Koolguy
Ponytail Pete (conflicts with "Sleeping")
Add
cancel    Save
At least one interviewer is required

GENERATING INTERVIEW SCHEDULE RESULTS FROM A SET OF CONSTRAINT SATISFACTION PROBLEMS

RELATED APPLICATIONS

This application claims the benefit of U.S. Provisional Application No. 61/779,764, filed Mar. 13, 2013, the entire contents of which are incorporated herein by reference. This application is related to co-pending U.S. patent application Ser. No. 14/210,132, filed Mar. 13, 2014.

COPYRIGHT NOTICE

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

Job interviews typically include one or more meetings between a candidate and interviewers for a position at an entity such as a company or an organization. The interviewers are commonly selected to interview candidates and to determine whether the candidate's experience and skills in specific areas, work history, availability, and the personal attributes match those being sought out by the entity.

Coordinating and scheduling the employees or interviewers to conduct interviews in a way that schedules the most appropriate person for the type of interview to be conducted can be challenging. In order to ease the scheduling burden companies may employ a dedicated human resource professional or a recruiting coordinator. This recruiting coordinator can choose interviewers based on their skill set and the type of interview to be conducted. The dedicated recruiting coordinator schedules interviews that work best for the candidate and fulfill interviewing criteria.

Different types of interviews may be conducted to find out whether the candidate is a good fit within the company. Phone interviews or phone screens are a common first step in the interview process and can be conducted over the phone between one candidate and one interviewer. Multiple interviewers may conduct interviews, for example one interviewer at a time on a rotating basis. On-site interviews can include the candidate being interviewed at the company location. The on-site interview can include different sessions with different interviewers, each session having one or more interviewers. Each interview generally takes place in one or more rooms, which are typically reserved in advance to avoid double booking.

Each interview session can be used for a particular purpose or theme to determine the candidate's competency in a specific area. For example, technical or competency interviews may be conducted to determine the candidate's knowledge of a specific technical area and may be conducted by interviewers skilled in that area of competency. Behavioral interviews may be conducted to understand how the candidate has acted in specific employment-related situations. Case interviews allow the interviewer to assess the candidate's analytical ability and problem solving skills and include the candidate presenting a solution to a problem posed by the interviewer. Group interviews include multiple interviewers conducting the interview to understand how the candidate interacts in a group dynamic. Lunch interviews may also be conducted where one or more interviewers in an informal setting evaluate the candidate.

Even with a dedicated coordinator, scheduling complex interviews can be challenging. For example, the coordinator may not be familiar with multiple employees and their job descriptions to select the most qualified interviewer for the particular interview. After selecting the most fitting group of employees for the interviews, the coordinator may also have to search through calendars to find the available time slots for each person. The coordinator would have to confirm with each person and make sure to send calendar invitations to each one. If the interviewers make changes to the schedule, especially last minute, the coordinator would need to repeat part of the same process. The process is manual and may necessitate multiple steps of trial and error before the most fitting schedule is produced.

BRIEF DESCRIPTION OF THE DRAWINGS

FIGS. 2A-2G are illustrations of interview scheduling screens provided by a scheduling system according to one example;

FIGS. 3A-3D are illustrations of interview management screens provided by the scheduling system according to one example;

FIG. 4 is an illustration of interviewer management screen provided by the scheduling system according to one example;

FIG. 5 is an illustration of a resource management screen provided by the scheduling system according to one example;

FIG. 10 is an illustration of another interviewer management screen provided by the scheduling system with additional interviewer fields according to one embodiment;

Figure 12:
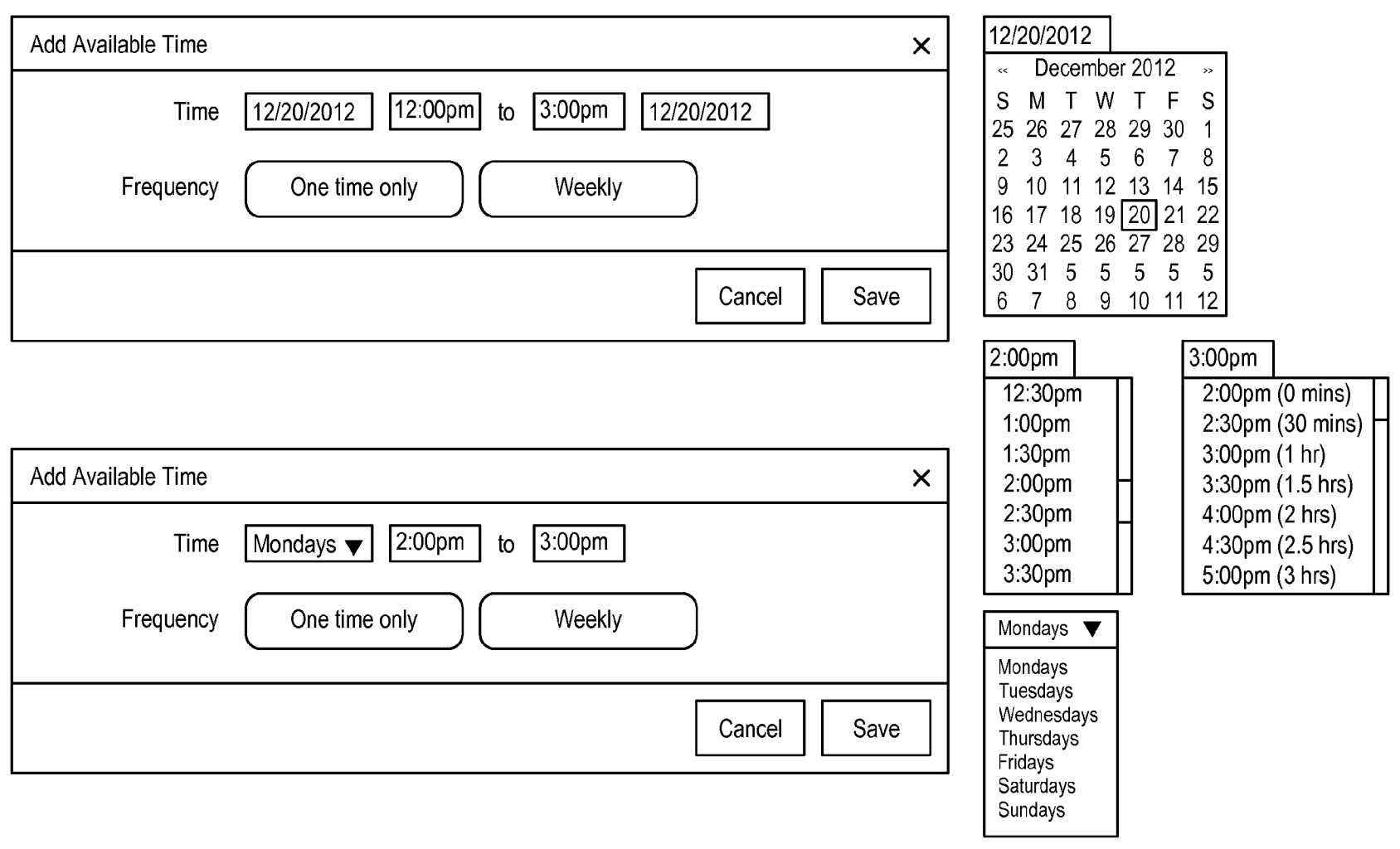

FIG. 12 is an illustration of another interviewer management screen provided by the scheduling system with elements for manually adding available times for an interviewer according to one embodiment;

FIG. 13 is an illustration of another interviewer management screen provided by the scheduling system with multiple linked calendars according to one embodiment;

Figure 16:
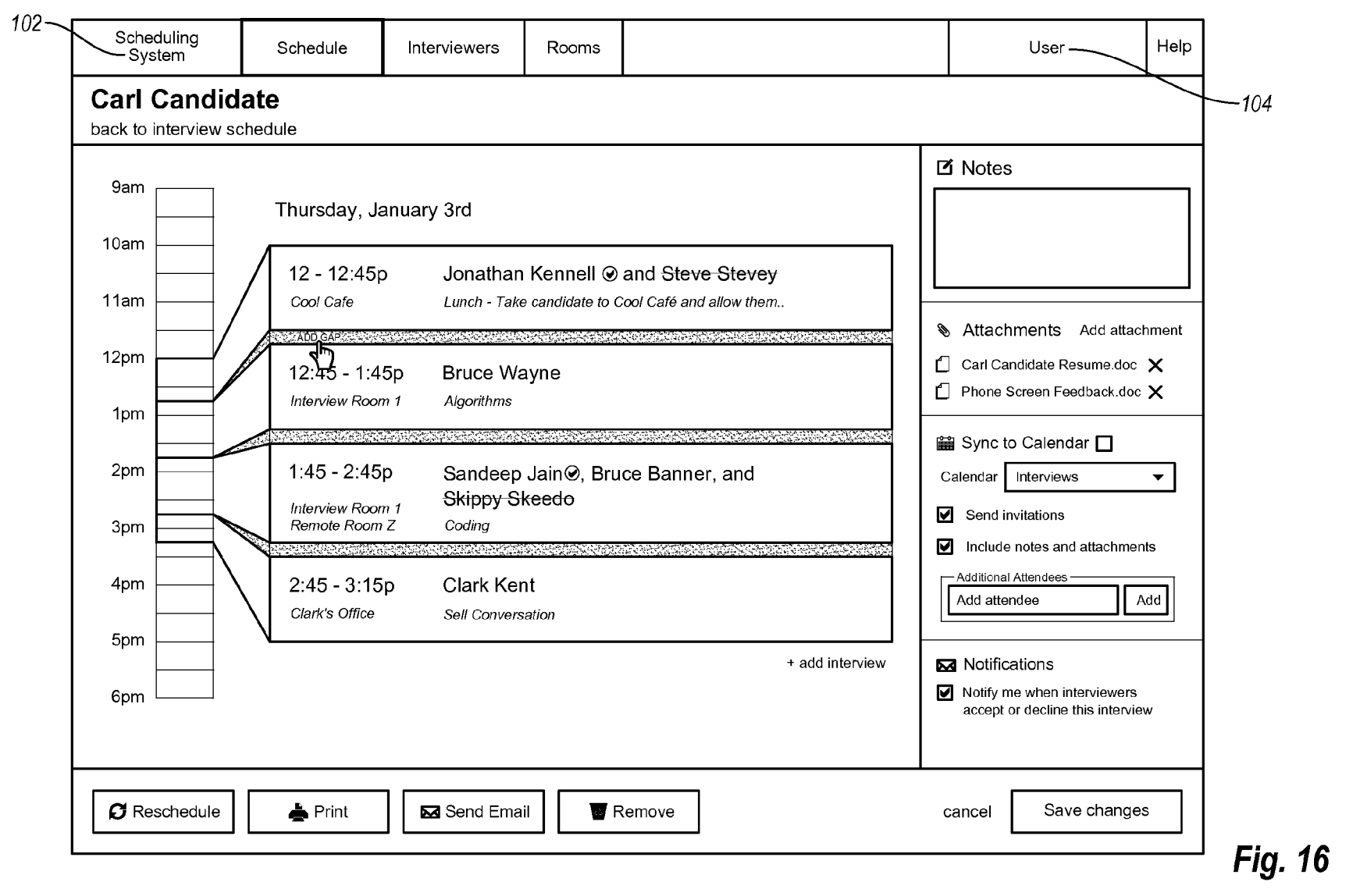

FIGS. 14-18 are illustrations of interview management screens provided by the scheduling system for rendering an interview schedule with multiple back-to-back interview sessions and modifying the interview schedule according to various embodiments; and FIG. 19 is an illustration of another interviewer management screen provided by the scheduling system for swapping interviewers according to one embodiment.

DETAILED DESCRIPTION

Figure 1A:
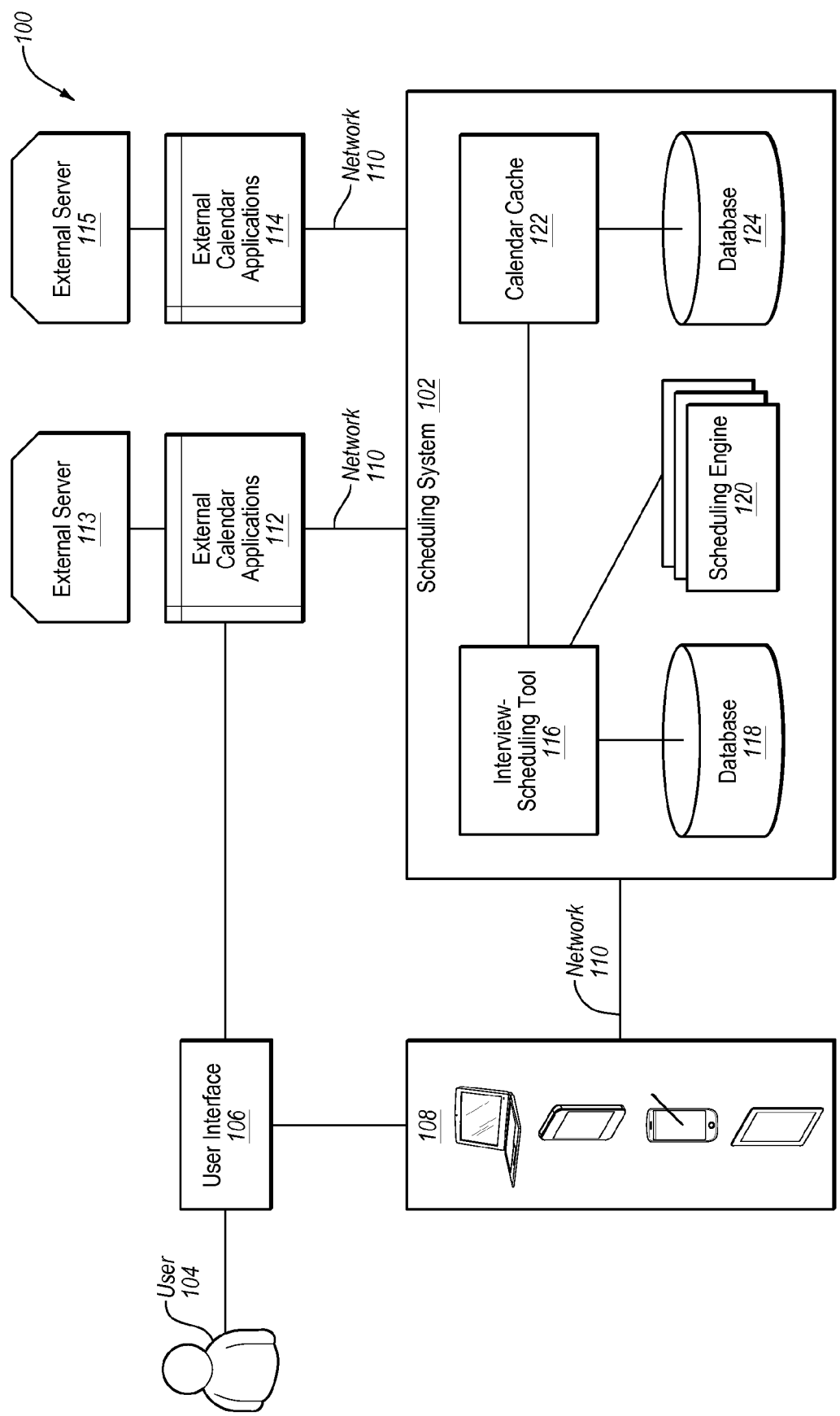
FIG. 1A is a schematic diagram of a distributed computing system which includes a scheduling system according to one example.

Interview scheduling technologies are described. In one method, the interview-scheduling tool presents an interface to receive candidate availability information from a user for possible interview schedules for an interview candidate. The user interface permits the user to define an interview schedule framework that specifies desired criteria for a desired interview schedule for the interview candidate. The desired criteria of the interview schedule framework specify one or more interview sessions. In some embodiments, the desired criteria include at least two back-to-back interview sessions. The interview-scheduling tool receives the candidate availability information and the desired criteria and defines a data structure representing the interview schedule framework, wherein the data structure comprises a set of constraint satisfaction problems (CSPs). The interview schedule results are automatically generated from the set of CSPs by a constraint solver tool and without additional user interaction at the user interface. The interview-scheduling tool presents the interview schedule results that fit the desired interview schedule for selection by the user.

Some of the aspects and embodiments disclosed herein describe systems and methods of scheduling candidates for complex interviews based on input parameters and constraints. According to some embodiments, a computer system executes components that enable a scheduling system to receive interview parameters and constraints and calculate one or more optimal schedules and to provide interview proposals to the user. One or more of the optimized schedule proposals may be selected and customized. According to other embodiments, a computer system executes components that enable the scheduling system to manage interviewer preferences including groups or tags associated with the interviewers and interview load. The groups or tags allow the user to quickly and seamlessly schedule the most appropriate interviewer matching the theme of the interview session. Further, managing the interview load (e.g. the number of interviews per week) allows the interviewers to control the amount of disruption from day-to-day job responsibilities.

Embodiments of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Embodiments of specific implementations are provided herein for illustrative purposes only and are not intended to be limiting. In particular, acts, components, elements and features discussed in connection with any one or more examples or embodiments are not intended to be excluded from a similar role in any other examples or embodiments.

The systems and methods of scheduling interviews described herein are directed to automating the process of scheduling complex interviews. The complex interview schedules, in some examples, include one or more sessions (i.e. multi-session), with one or more interviewers, which may be scheduled in one or more rooms. The systems and methods include a scheduling system that removes the need for a dedicated coordinator allowing any user to create an interview. The systems and methods allow the user to input parameters and constraints in preformed interview forms, which are then transmitted to the scheduling system. The scheduling system, in one example, can search through multiple calendars associated with interviewees and provides multiple optimal interview schedule proposals matching the inputted parameters and constraints.

The systems and methods, according to various examples, integrate with existing calendaring systems, and automatically select interviewers based on their scheduling availability. Once the optimal interview schedule proposal is identified, the scheduling system can be used to easily create calendar events and notify the selected interviewers. The methods of scheduling interviews described herein allow for any interviewing scenarios and schedule complexity. Each interviewer profile includes information relating to interview load associated with each interviewer (e.g. the number of interviews per week). The systems and methods according to at least one embodiment balances the interviewing load across all of the interviewers in the system, so everyone stays involved, and no one gets overwhelmed.

The systems and methods are built in with flexibility that leaves room for personal preferences. For example, by allowing a user to choose from a number of interview schedule proposals, the system provides for the user to account for interviewer and interviewee time preferences. The system further includes a method of tagging associated with interviewer and room profiles. The system of tags allows the user to set up interviews based on general characteristics rather than pick specific users. In addition, the system can compensate for any last minute changes dynamically.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Some embodiments disclosed herein implement a scheduling system using one or more computer systems, such as the computer systems described below with reference to FIG. 7.

FIG. 1A illustrates an exemplary scheduling system 102 within the context of an exemplary overarching distributed computer system 100. As shown in FIG. 1A, the distributed computer system 100 includes users 104, a user interface 106, computer systems 108, a network 110 and external calendar applications 112 and 114. The user 104 may interact (e.g., provide or receive information) with the user interface 106 on one of the computer systems 108. According to these embodiments, the scheduling system 102 receives and transmits information relating to schedules from the external calendar applications 112 and 114.

According to various embodiments, the scheduling system 102 includes an interview-scheduling tool 116, a database 118, a scheduling engine 120, a calendar cache 122 and a database 124. The scheduling system 102 is configured to receive calendar information from the external calendar application 112 and 114, and various parameters and constraints from the users via the user interface 106 and the computer systems 108 and determine one or more optimized schedules matching the parameters and constraints.

The interview-scheduling tool 116 can be an application server that services interview-scheduling requests by the user 104 via the user interface 106. The interview-scheduling tool 116 can be implemented as software stored as a set of instructions in one or more memory devices of the scheduling system 102 implemented, that when executed by one or more processing devices of the scheduling system 102 perform the operations as described herein. In another embodiment, the operations can be implemented as processing logic comprising any combination of software, firmware, or even aspects of hardware. The interview-scheduling tool 116 can include various components for searching for interview schedule results as described herein. For example, the interview-scheduling tool 116 may include a web server to present the user interface 106 to the user 104 over the network 110. The interview-scheduling tool 116 may include other engines, agents, components or the like, to interact with the external calendar applications 112, 114 over the network 110, the external servers 113, 115 over the network 110, or other devices over the same or different networks of the scheduling system 102. Also, the other engines, agents, components or the like can be used to interact with other components of the scheduling system, such as the calendar cache 122, database 118, database 124 and the scheduling engines 120. The scheduling engine 120, as described herein, can be a constraint solver tool. The constraint solver tool can be implemented as software and may be a specific-purpose constraint solver, or a general-purpose constraint solver. The constraint solver tool can be executed on the same processing device(s) as the interview-scheduling tool 116 or can be executed on a separate processing device. The specific-purpose constraint solver can be a solver that is specifically configured for solving constraint satisfaction problems (CSPs) for interview schedule searching, as described herein. The general-purpose constraint solver can be a solver that is not specifically designed for searching interview schedule solutions. In some embodiments, the interview-scheduling tool 116 creates a data structure including a set of CSPs that can be sent to the general-purpose constraint solver to find and return results for possible interview schedules.

As depicted in FIG. 1A, the computer systems 108, the external calendar applications 112 and 114 exchange (i.e. transmit or receive) information via the network 110. The network 110 may include any communication network through which computer systems exchange information. For example, the network 110 may be a public network, such as the Internet, and may include other public or private networks such as LANs, WANs, extranets, intranets, and cloud computing systems. Although shown as a single network in FIG. 1A, in some embodiments, the network 110 includes multiple communication networks.

In the embodiment illustrated in FIG. 1A, the scheduling system 102 is configured to implement the user interface 106 in conjunction with the computer systems 108 via the network 110. For example, in some embodiments illustrated by FIG. 1A, the interface 106 is a browser-based user interface served by the scheduling system 102. In still other embodiments, the interface 106 is a specialized client program that executes outside of a browser environment, such as an application program executing on a mobile device. The user interface 106 may be implemented using a variety of technologies and may include various elements (e.g., screens, windows, buttons, boxes, text fields, menus, etc.) arranged according to various user interface metaphors.

Similarly, the external calendar applications 112 and 114, in some embodiments, may be browser-based interfaces served by external servers 113, 115. In one example, the external server 113 may be a cloud-based computing system, for example, Google Accounts Server provided by Google, Inc. In another embodiment, the external server 115 may be a remote corporate server, for example, a Microsoft Exchange Server provided by Microsoft Corporation. In other embodiments, the external calendar applications 112 and 114 may be a specialized client program that executes outside of a browser environment, such as an application program executing on a mobile device.

Information may flow between the components illustrated in FIG. 1A, or any of the elements, components and subsystems disclosed herein, using a variety of techniques. Such techniques include, for example, passing the information over a network using standard protocols, such as TCP/IP, HTTP, or HTTPS, passing the information between modules in memory and passing the information by writing to a file, database, or some other nonvolatile data storage device, among others. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

The scheduling system 102 may be configured according to a variety of architectures. The architecture illustrated in FIG. 1A is provided for exemplary purposes only and embodiments disclosed herein are not limited to the architecture shown in FIG. 1A. For example, in some of the embodiments, the physical components described below may be virtualized.

In some embodiments, the scheduling system 102 receives parameters and constraints inputted by the user 104 via the interface 106, and in combination with constraints and parameters received from the external calendar application(s) 112, 114, the scheduling system 102 determines one or more optimal interview schedules. The scheduling system 102 may provide the optimal schedules in the form of interview schedule proposals to the user 104 via the interface 106. The parameters and constraints can include information pertaining to one or more interview sessions, interview times and dates, interviewers for each interview session, general or specific tags associated with the interviewers, interview resources, interview title, and interview position designations (e.g., first interview designation, last interview designation, or the like).

In at least one embodiment, additional parameters and constraints may be received from the external calendar applications 112 and 114, which can be used by the scheduling system 102 to determine one or more optimal interview schedules. The parameters and constraints received from external calendar applications 112 and 114 may include calendar information associated with one or more users 104 or one or more resources (e.g. rooms, video or audio conferencing equipment, parking spots, etc.). The calendar information may include user schedules or resource schedules, including date and time information associated with one or more designated blocks of time. For example, the designated blocks of time can include existing meetings previously scheduled for possible interviewers, and existing meetings previously scheduled for one or more possible resources. The calendar information may be retrieved by the scheduling system 102 via the network 110 based on the scheduling system 102 being granted permission to access the calendaring information. Different external calendar applications may be associated with different entities (e.g. users or resources). In some embodiments, the scheduling system 102 may be granted permission to access calendar information associated with multiple entities, on one or more servers.

In one implementation, the calendar information received from the external calendar application may be stored in the database 124. The calendar cache 122 may periodically update the calendar information stored in the database 124. The calendar cache 122 synchronizes the calendar information stored in the database 124 with the calendar information from the external calendar applications using one or more protocols.

In one embodiment, the protocols can include procedures for receiving or downloading the calendar information for every user in the external calendar application once access is provided to the scheduling system 102. In one embodiment, the protocols can include procedures for updating the calendar information on demand.

Whenever any part of the scheduling system uses the user's calendar information, the scheduling system may synchronously or asynchronously update the calendar information stored in the calendar cache 122. In one embodiment, the calendar information stored in the calendar cache 122 is a write-through cache, which may expire after a predetermined period of time. In one embodiment of a synchronous update, at the time of access, if the calendar information stored in the calendar cache 122 has been updated within the predetermined period, the scheduling system uses that data. For example, the calendar information stored in the cache 122 may expire after 15 minutes. Otherwise, the scheduling system synchronously contacts the user's external calendar application to access the calendar information and uses the updated calendar information.

In one embodiment of an asynchronous update, the scheduling system may receive a notification of a user accessing the scheduling system via the user interface 106. In response, the scheduling system may "warm" the cache for all interviewers in a given account for a predetermined period of time by contacting the user's external calendar application, storing the results in the calendar cache 122, and using the updated calendar information. For example, the scheduling system 102 may cache all calendar data for those users from one day in the past through one month in the future.

In one embodiment, the database 118 may include information pertaining to interviewers, users, interview resources, optimized interview schedules determined using the scheduling system 102, and response statuses received from the interviewers. The database 118 may include data structures (e.g. templates) associated with previously created and stored optimized interview schedules, as described further below.

The interview-scheduling tool 116 can provide access to the user interface 106 and receive and transmit information to the user 104 via the user interface 106. The user interface 106 provides one or more screens to the user 104. In one embodiment, one or more screens enable the user to input parameters and constraints and provide to the user an optimized complex interview schedule (e.g. multi-session interview schedule). The scheduling engine 120 may receive the calendar information, the parameters and constraints for one or more interview sessions, resource parameters and constraints, as well as other interview related information, from the interview-scheduling tool 116 and determine one or more optimized complex interviews.

In embodiments described below, the interview-scheduling tool 116 may receive as input an interview specification that includes interview constraints and parameters and candidate availability. The interview specification may be a data structure that specifies the interview constraints, interview parameters, candidate availability, or any other constraint as described herein. The interview-scheduling tool 116 can use the interview specification to determine manageable sub-problems and to generate input files, which can be provided to the scheduling engine 120. In one embodiment, a single interview specification may be broken out into a number of sub-problems, each of which is represented by a single problem statement. The scheduling engine 120 can compile solutions to the problem statement into general interview proposals (also referred to herein as possible interview schedules). The interview proposals can be merged into one sorted list, which is provided to the user for the user to select one of the interview proposals. The selected interview proposal can be finalized by the user and transmitted as calendar invitations to the interviewers. Alternatively, the interview-scheduling tool 116 can receive the inputs as desired criteria of an interview schedule framework, as described below with respect to FIG. 1B.

In one implementation, the user 104 may make changes to the finalized interview schedule at any time after the interview schedule is finalized, for example, by making changes to the constraints and parameters. Any changes to the final optimized interview schedule can be received by the interview-scheduling tool 116 and compiled into a new interview specification, which can be provided to the scheduling engine 120. The new interview specification can then be used to provide new optimized schedule proposals. The interview-scheduling tool 116 determines the order of the proposed interview schedules based on the degree of matching to the interview information including the constraints and parameters, as well as the interview and interviewer availability received from the external calendar applications 112, 114. In one embodiment, the proposed schedules may be ranked based on a penalty associated with one or more of the parameters or constants. For example, if a proposed schedule includes a conflict, the interview-scheduling tool 116 assigns a penalty to the schedule. In some embodiments, the conflicts can include a double-booked interviewer, an interviewer reaching or exceeding the interview threshold, a double-booked resource, or making the candidate change rooms in the middle of the day, or a resource reaching or exceeding its capacity, as well as other conflicts.

In at least one implementation, a "perfect" schedule (e.g. one with no conflicts) may have a penalty score of zero. A schedule with a single double-booked interviewer or resource may have a penalty score of one. The proposed interview schedules are ranked based on the penalty score, in this example listing the schedule with penalty score of zero, followed by the schedule with penalty score of one and so on. It is appreciated that penalties may be assigned for other conflicts and any penalty may be assigned to any conflict. In some embodiments, the interview proposals having the same penalty may be grouped together.

The user 104 may be a company recruiter desiring to schedule a complex or a multi-session interview. The scheduling system 102 can include one or more interview-scheduling tools 116. The company recruiter can access the interview-scheduling tool(s) 116 via the user interface 106 and the interview-scheduling tool(s) 116 can provide one or more scheduling screens which allow the user 104 to schedule one or more new interviews and view and manage previously scheduled interviews, such as the screens displayed in FIGS. 2A-2G.

In addition, the interview-scheduling tool(s) 116 can provide one or more schedule management screens that allow the recruiter to manage scheduled interviews, such as the screens displayed in FIGS. 3A-3D. Further, the interview-scheduling tool(s) 116 can provide one or more interviewer management screens that allow the user to view and manage interviewers, such as the screen shown in FIG. 4. The interview-scheduling tool(s) 116 can also provide one or more interview resources screens that allow the user to view and manage interview resources (e.g. rooms) such as the screen shown in FIG. 5.

Figure 1B:
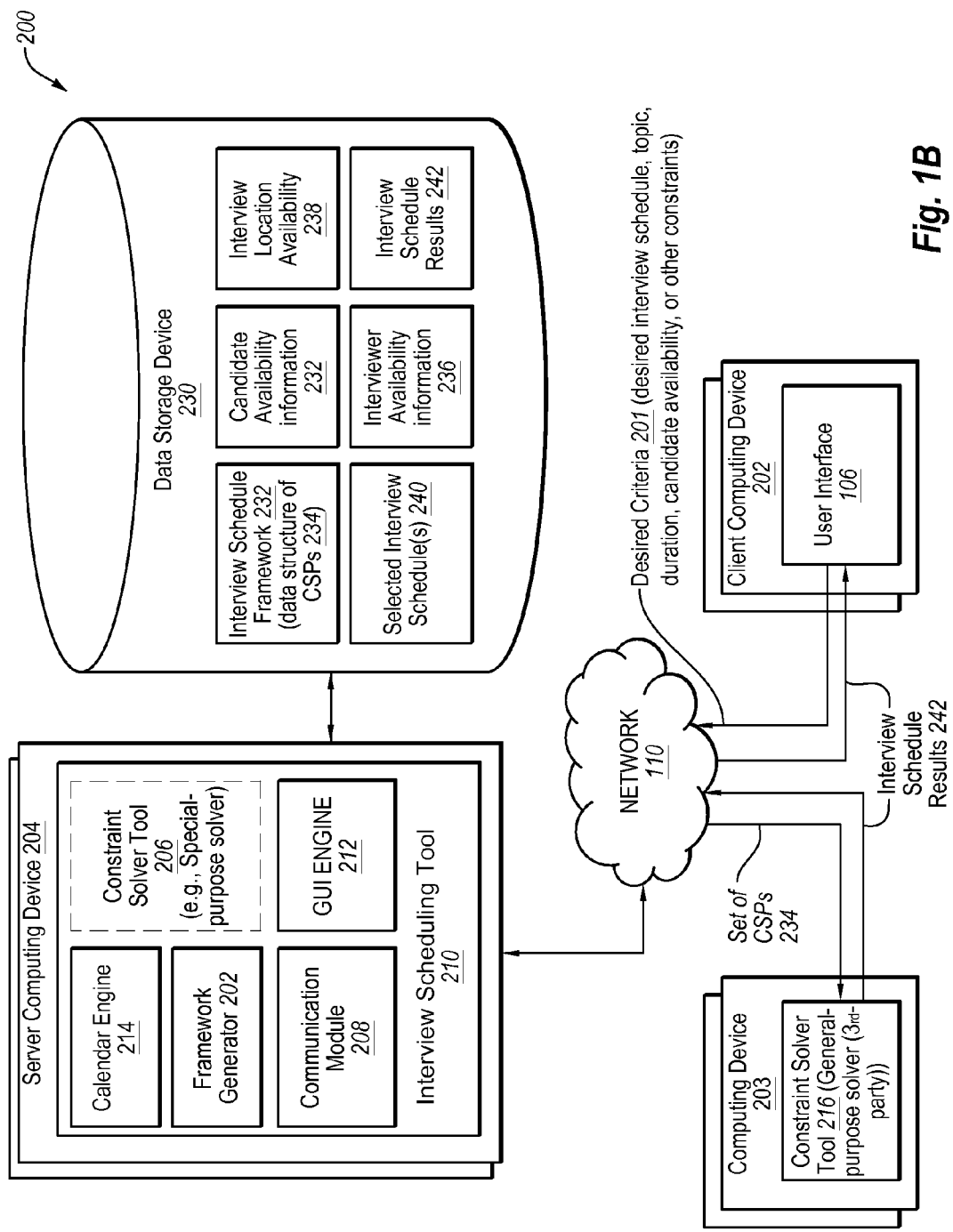
FIG. 1B is a block diagram of an exemplary network architecture in which embodiments of an interview-scheduling tool may operate according to one embodiment.

FIG. 1B is a block diagram of an exemplary network architecture 200 in which embodiments of an interview-scheduling tool 210 may operate according to one embodiment. The network architecture 200 may include multiple clients 202 (hereinafter clients 202), multiple server computing systems 204 (hereinafter servers 204), and multiple computing devices 203 each coupled to the network 110 a (e.g., public network such as the Internet or private network such as a local area network (LAN)). The computing devices 203 may be server computing devices that host a constraint solver tool 216, such as a third-party general-purpose solver (e.g., the Minion CSP solver). The network 110 may include the Internet and network connections to the Internet. Alternatively, server 204 and the client 202 (and 203) may be located on a common Local Area Network (LAN), Personal area network (PAN), Campus Area Network (CAN), Metropolitan area network (MAN), Wide area network (WAN), wireless local area network, cellular network, virtual local area network, or the like. The server 204 may include one or more machines (e.g., one or more server computer systems, routers, gateways) that have processing and storage capabilities to provide the functionality described herein. The server 204 may execute the interview-scheduling tool 210. The interview-scheduling tool 210 can perform various functions as described herein. In other embodiments, the interview-scheduling tool 210 can be implemented as a standalone application that interfaces with other applications on the server 204, a client application on the client 102, the constraint solver 216, or other systems in the network architecture 200. It should also be noted that in this embodiment, the server 204 implements the interview-scheduling tool 210, but one or more of other clients may also include client modules of the interview-scheduling tool 210 that can work in connection with, or independently from the functionality of the interview-scheduling tool 210 on the server 204.

The clients 202 may be a client workstation, a server, a computer, a portable electronic device, an entertainment system configured to communicate over a network, such as a set-top box, a digital receiver, a digital television, a mobile phone, a smart phone, a tablet, or other electronic devices. For example, portable electronic devices may include, but are not limited to, cellular phones, portable gaming systems, portable computing devices or the like. The client 202 may have access to the Internet via a firewall, a router or other packet switching devices. The clients 202 may connect to the server 204 through one or more intervening devices, such as routers, gateways, or other devices. The clients 202 are variously configured with different functionality and may include a browser and one or more applications. In one embodiment, the clients 202 accesses the interview-scheduling tool 210 via the browser and the interview-scheduling tool 210 is a web-based application or a cloud computing system that presents user interface(s) 106 to the client 202 via the browser. Similarly, one of the applications can be used to access the interview-scheduling tool 210. For example, a mobile application (referred to as "app") can be used to access one or more user interfaces of the interview-scheduling tool 210. The interview-scheduling tool 210 can be one or more software products that facilitate the digital interview process. For example, a recruiter (user 104) can use the client 202 to schedule an interview with a candidate (or interviewer). The interview-scheduling tool 210 can store various types of data in a data store 230, such as in one or more data storage devices. The data store 230 can represent one or more data repositories on one or more memory devices. The data store 230 may be a database or any other organized collection of data. The data store 230 may store interview schedule framework 232, candidate availability information 232, interviewer availability information 236, interview location availability 238, interview schedule results 242, and selected interview schedules 240.

In the depicted embodiment, the server 204 may execute the interview-scheduling tool 210 and the server 204 can include web server functionality that facilitates communication between the clients 202 and the interview-scheduling tool 210 to schedule interviews as described herein. Alternatively, the web server functionality may be implemented on a separate machine than the interview-scheduling tool 210. It should also be noted that the functionality of the interview-scheduling tool 210 could be implemented on one or more servers 104. In other embodiments, the network architecture 100 may include other devices, such as directory servers, website servers, statistic servers, devices of a network infrastructure operator (e.g., an ISP), or the like. Alternatively, other configurations are possible as would be appreciated by one of ordinary skill in the art having the benefit of this disclosure.

During operation, the interview-scheduling tool 210 may present the user interface 106 to receive candidate availability information from the user 104 (e.g., a recruiting coordinator) for possible interview schedules for an interview candidate. The user interface 106 may also permit the user 104 to define an interview schedule framework that specifies desired criteria for a desired interview schedule for the interview candidate. The desired criteria of the interview schedule framework can specify one or more interview sessions, a desired duration of the respective interview session, specific start and stop times of the interview sessions, an interview topic for each of interview sessions, ordering of interview sessions, specific interviewer names, interviewer tags, specific interview locations (e.g., specific rooms, building, cubicles, or the like), interview location tags, or the like. The interview-scheduling tool 210 receives the candidate availability information and the desired criteria via the user interface 106. In some embodiments, the desired criteria specify multiple back-to-back interview sessions. In other embodiments, the desired criteria specify one interview session. Various embodiments described herein describe multiple interview sessions, including back-to-back interview sessions. In other embodiments, the interview-scheduling tool 210 can also works with just one session. For instance, the features of tagging and finding the best time to schedule interviewers and interview locations for interview sessions as described herein, all apply whether the user is scheduling one or more interview sessions. When more than one interview session is being scheduled, the user can use an ordering constraint to force interview sessions to be in a specific order, to be back to back, or any combination thereof. The interview-scheduling tool 210 defines a data structure representing the interview schedule framework 232. The data structure includes a set of constraint satisfaction problems (CSPs) 234. CSPs are mathematical problems defined as a set of objects whose state must satisfy a number of constraints or limitations. The CSPs can represent constraints for the interview schedule framework 232 as homogeneous collection of finite constraints over variables, which are solved by the constraint solver tool (204 or 206). The Boolean satisfiability problem (SAT), the Satisfiability Modulo Theories (SMT) and answer set programming (AS) can be certain forms of the constraint satisfaction problem (CSP). The interview-scheduling tool 210 presents one or more interview schedule results 242 that fit the desired interview schedule for selection by the user via the user interface 106. The interview schedule results 242 are automatically generated from the set of CSPs 234 solved by a constraint solver tool 204 (or 206) and without additional user interaction at the user interface 106. The interview schedule results 242 can be considered "ready-to-use interview schedule results. It should be noted that multiple interview schedule results 242 are described as being found. However, in some cases, there may be only one interview schedule result 242 or zero interview schedule results.

The interview-scheduling tool 210 can be implemented as processing logic comprising hardware (circuitry, dedicated logic, etc.), software (such as is run on a general purpose computing system or a dedicated machine), firmware (embedded software), or any combination thereof. In the depicted embodiment, the interview-scheduling tool 210 includes a framework generator 202, a constraint solver tool 204, a communication module 208, a graphical user interface (GUI) engine 212 and a calendar engine 214. The framework generator 202 is to generate the interview schedule frameworks 232 from the desired criteria 201. The user can input the desired criteria 201 into the user interface 106. The desired criteria 201 can include a desired interview schedule, a number of interview sessions, duration of each session, start time and end time of each session, candidate names, tags, candidate availability, interview locations, interview location tags, or the like.

Regarding tagging, when searching for schedules, the interview-scheduling tool 210 first identifies the various interviewers and interview rooms to consider using the interviewer roles from the interview spec. Each role can specify one or more interviewers, or one or more tags. When using tags, the one or more tags are combined to create an intersection. That is, any matching interviewers must have ALL specified tags. With this set of tags, the interview-scheduling tool 210 looks up all matching interviewers that have all required tags. This becomes the pool of eligible interviewers. In the event that the role was a list of one or more specific people, then that list is the pool of eligible interviewers. Once the pool of eligible interviewers is identified, if there are more than 20 people, for example, the interview-scheduling tool 210 randomly chooses 20 to keep the number of interviewers manageable. Of course, fewer or more people than 20 can be used. Then, the interview-scheduling tool 210 looks up the availability of those 20 or fewer interviewers from the connected calendar system, for the availability window being searched. It should be noted that this data could be cached at this point, since the cache could be warm. The interviewers' availability then becomes constraints in the job for the constraint solver tool.

The constraint solver tool 204 can be used to solve the CSPs of the interview schedule framework 232 to obtain the interview schedule results 242. The constraint solver tool 204 can be a specific-purpose constraint solver, or a general-purpose constraint solver. The constraint solver tool 206 can also be used to solve the CSPs of the interview schedule framework 232 to obtain the interview schedule results 242. The candidate-sorting tool 210 can communicate with other components of the network architecture 200 using the communication module 208.

The communication module 208 can also be used by the modules of the interview-scheduling tool 210 to communicate with each other, as well as with other components outside of the interview-scheduling tool 210, such as the clients 202, the servers 204, or devices 203.

The GUI engine 212 can create a GUI with input mechanisms for the user interface 106 to obtain the desired criteria 101 or other data used by the interview-scheduling tool 210. The GUI engine 212 can also create other user interface mechanisms to facilitate selection of constraints, rules, properties of scheduling data, or the like. The GUI engine 212 can provide visual representation of the data in order to schedule or modify interview schedules, or individual interview sessions as illustrated in various figures. In another embodiment, the GUI engine 212 can be used in connection with a web server that creates and displays a webpage to be sent to another device for display. The GUI engine 212 can also generate a GUI with the interview schedule results for selection by the user. The GUI engine 212 can work with other components to display the interview schedule results as a sorted list, a graphical timeline, or the like.

The calendar engine 214 can interface with the external calendar applications 112 and 114 to perform various operations, including obtaining availability information for interviewers, interview locations, candidate availability information, or the like. The calendar engine 214 can also mange scheduling the individual interview sessions once an interview schedule is selected. For example, the calendar engine 214 can create and send out meeting invites to the interviewers, the candidate, or any combination thereof, as well as receive acceptances and rejections of those invites. The calendar engine 214 can interface with the GUI engine 214 to indicate status of the meeting invites.

The components of the interview-scheduling tool 210 may represent modules that can be combined together or separated into further modules, according to some embodiments. The interview-scheduling tool 210 may include more or less components than those depicted in FIG. 1B.

During operation in further embodiments, the interview-scheduling tool 210 presents the interview schedule results that fit the desired interview schedule in the user interface 106, and the interview-scheduling tool 210 receives a selection of one of the interview schedule results as a selected interview schedule for the interview candidate. The interview-scheduling tool 210 initiates one or more scheduling operations to schedule the selected interview schedule. For example, the interview-scheduling tool 210 can send invites to the interviewers (and candidate) for each of the interview sessions, book interview locations or other resources, generate a report of the selected interview schedule for printing or emailing to the candidate or the interviewers, or other actions pertaining to the schedule interview. In a further embodiment, the interview-scheduling tool 210 can receive a rejection of the individual interview session and rescheduling another interviewer for the interview session. Similarly, the interview-scheduling tool 210 can could the same for the interview location, when it becomes unavailable. These operations can be performed without re-solving the remaining interview sessions. However, in some cases, the interview-scheduling tool 210 may re-solve the interview schedule to obtain a new set of interview schedule results for selection. In another embodiment, the interview-scheduling tool 210 transmits a calendar invite associated with the at least one interview session to the one or more interviewers and updates the interview session based on a response status to the calendar invite. Once the interview sessions have been accepted, the interview-scheduling tool 210 can determine a finalized interview schedule based on the received response status of all interview sessions (or most of the interview sessions).

In a further embodiment, the interview-scheduling tool 210 can present a visual representation of interview session of the selected interview schedule on a timeline. The visual representation can include status of the interview sessions.

In one embodiment, the user can input a specific interviewer name for any one or more of the interview sessions within the interview schedule framework 232. In another embodiment, the user can input multiple specific interviewer names for any one or more of the interview sessions and the interview-scheduling tool 210 can select one of the specific interview names for the respective interview session. Alternatively, the user can input an interviewer tag. The interviewer tag permits the user to specify a type of interviewer without specifying an interviewer name. For example, the user may specify a specific name of a person to conduct a particular interview session. The user can specify that a second interview session be conducted with someone from engineering, in which case the user inputs an interviewer tag of "engineering" for the interview session. The interview-scheduling tool 210 uses the tag to filter the available interviewers to those interviewers with the "engineering" tag, for example. An interviewer tag is a keyword or term assigned to interviewer's profiles. The interviewer tags help describe the interviewer and allows the interviewer to be browsed or searched using the interviewer tag. For example, when an interviewer is added to a list of potential interviewers, various tags can be assigned to the interviewer so that these tags can be used to identify potential interviewers with these characteristics. Similar to interviewer tags, interview location tags can be used to describe interview locations. The interview-scheduling tool 210 can use tags in order to quickly filter through a bunch of people or locations when generating the interview schedule framework 232. The interview-scheduling tool 210 can combine the tags with availability information (calendar data) to identify a list of qualified people for the interviews (or interview locations). Similar to interviewer tags, a user can input multiple interview location tags and the interview-scheduling tool can select one of the multiple interview location tags for the respective interview session. Once the interviewers (and/or interview locations) have been identified by specific names, interviewer tags, interview location names, interview location tags, or any combination thereof, the interview-scheduling tool 210 can create the interview schedule framework 232 with a list of possible interviewers, a list of possible interview locations, or the like. In another embodiment, the interview-scheduling tool 210 generates a list of available interviewers in view of the specific interviewer names, the interviewer tags, or any combination thereof, specified in the desired criteria 201. It should be noted that the user might not specify specific names or tags as well. The interview-scheduling tool 210 can obtain availability information for the list of available interviewers. The availability information and the list of available interviewers can be defined as constraints in the set of CSPs.

In another embodiment, the interview-scheduling tool 210 can track interviewer load of the interviews and generate the list of available interviewers in view of the interviewer load. Instead of using the interviewer load to determine who to include or exclude from the list of available interviewers, the interview-scheduling tool 210 could also use the interview load as a penalty when solving for interview schedule results. For example, someone with an interview load that is higher than others may be selected for an interview, but the corresponding interview may be ranked lower because of the interviewer load penalty. In the same manner, a list of interview locations can be processed as above for the interviewers.

In another embodiment, the desired criteria 201 include timing and ordering information. For example, the timing and ordering information may be an interview position designation (e.g., first interview designation, a last interview designation, or the like) or a specific time for any of the interview sessions. Also, any position order information for any given interview session may be specified. The framework generator 202 can use this information to define timing constraints or ordering constraints in the set of CSPs.

In one embodiment, the framework generator 202 generates the interview schedule framework as an input file with the set of CSPs. In some embodiments, the interview-scheduling tool 210 sends the input file with the set of CSPs 234 to the constraint solver tool 204 (executing on the same computing system) or constraint solver tool 206 (executing on a separate computing system). The constraint solver tools may be specific-purpose solvers or general-purpose solvers. One type of third-party general-purpose solver is the Minion CSP solver as described herein; however, any general-purpose solver with an expressive input language based on common constraint matrix modeling may be used. The constraint solver tool (204 or 206) solves the CSPs 234 and returns an output file, the output file including data that represents the interview schedule results that fit the interview schedule framework. The interview-scheduling tool 210 receives the output file and presents the interview schedule results to the user via the user interface 106.

In another embodiment, the interview-scheduling tool 210 determines a ranking of the plurality of interview schedule results and presents the interview schedule results in an order based on the ranking. For example, when generating schedules, the interview-scheduling tool 210 can run several minion jobs. The number of jobs potentially run is N×M, where N is the number of candidate availability windows, and M is the number of different penalty values to try. M is always 1+ the number of interview sessions in the interview. The interview-scheduling tool 210 sends these jobs to the constraint solver tool 206, the Minion CSP solver in this example, in a priority order, where a job has higher priority (and goes first) if it calls for a lower penalty. The interview-scheduling tool 210 sends the penalty 0 jobs first, then the penalty 1 jobs, and so on. Once the constraint solver tool 206 sends a number of results, such as eight results (interview schedule results for the candidate), the interview-scheduling tool 210 stops sending jobs. So if results with low penalty are found, the interview-scheduling tool 210 may not run all N*M jobs. When results are not found, the interview-scheduling tool 210 may continue running all N*M jobs.

In a further embodiment, the interview-scheduling tool 210 creates the input files by defining a list of variables that make up the CSPs and defining a set of constraints that define what values can be assigned to the list of variables. The result values for the list of variables are to be returned in the output file. It should be noted that every rule specified in the set of CSPs 234 is considered a constraint for searching for interview schedule results.

In one embodiment, the input file includes an input language based on common constraint matrix modeling in which the list of variables includes interview times in a two-dimensional array of integers. Each row represents start and end times of one of the respective interview sessions and each column represents whether the respective interview session is occurring in the respective time interval. In a further embodiment, the two-dimensional array further includes a first column with a first index of a start time when the respective interview session begins and a second column with a second index of an end time when the respective interview session ends. It should be noted that other formats could be used for variables in the input file than two-dimensional matrix for any given variable.

In another embodiment, the list of variables in the input file includes available interviewers in a two-dimensional array of Boolean variables, where rows represent the available interviewers and columns represent the multiple interview sessions, or vice versa, wherein the list of available interviewers is based on the at least one of an interview name or an interviewer tag in the desired criteria.

In another embodiment, the list of variables in the input file includes available interview locations in a two-dimensional array of Boolean variables, where rows represent the available interview locations and columns represent the multiple interview sessions, or vice versa.

In another embodiment, the list of variables in the input file includes one or more of the following: a first helper variable to store a start time for a first interview session; a second helper variable to store an end time for a last interview session; a third helper array of Boolean variables to track which one of the interview sessions is to occur after which other one of the interview sessions; and a fourth helper array to track a final order of each of the interview sessions.

In another embodiment, the list of variables in the input file includes a penalty variable to designate one or more of an interviewer conflict, an interview location conflict and a location change. The interviewer conflict may be when the respective available interviewer is double booked. The interview location conflict may be when the interview location is double booked. The location change may be when the interview candidate switches to another interview location between adjacent interview sessions.

In some embodiments, the set of constraints may be interviewer constraints, interviewer availability constraints, interview location constraints, interview location availability constraints, and specific interview ordering constraints, if more than one interview session exists. An "interviewer constraint" would be "I want Bob or Tim" for a given interview session, while "interviewer availability constraint" would be Bob & Tim's calendar availability. For locations, the "interview location constraint" would be "I need a room in our Salt Lake City office", while "interview location availability constraint" would be the availability of those room. For example, the ordering constraints may enforce that a specific type of interview occur later in the interview sessions. The ordering constraints may also specify that an interview session occur after a lunch interview session. The ordering constraints may encode a specific order of interview sessions, such as based on interview topics in the following example: first an introduction interview session, then a skills-assessment interview session, and then a closing interview session. The interview ordering constraints may force an identified interview session be schedule at a specific position relative to other interview schedules. For example, an interview ordering constraint may force an interview session to be a second interview session of five interview sessions. Also, the ordering constraints can be one kind of constraint where a given session can be constrained to any of the possible orders for the interview. For example, the ordering constraints are not limited to a constraint such as "this session must be after that session," but can also constrain the possible orderings in a way to guarantee that will happen (e.g. Morning Session can only be in slots 1, 2, or 3, and Afternoon Session can only be in slots 4, 5, or 6).

In other embodiments, the set of constraints may include one or more of the following: a first constraint to find a solution that has exactly one penalty from an interviewer conflict; an interview location conflict or a room change for a number of candidate availability windows to be checked for the desired interview schedule; a second constraint to enforce an exact start time and duration of each of the interview sessions; a third constraint to enforce that no two interview sessions of the interview sessions overlap; a fourth constraint to enforce that the interview session are consecutive, such as by constraining a total duration; a fifth constraint to enforce that the interview sessions start at a correct modulo; a sixth constraint to enforce that each available interviewer has at most one interviewer role assignment unless specifically identified in the desired criteria; a seventh constraint to enforce that each interviewer role must have exactly one interviewer assignment; an eighth constraint to enforce that each available interview location role must have exactly one interview location assignment; a ninth constraint to enforce that a specific interviewer be assigned to a specific interview session; a tenth constraint to enforce an order on duplicate interview sessions so as to avoid duplicate interview schedule results; and an eleventh constraint to enforce a penalty when there is a change of interview locations between any two of the plurality of interview sessions. The tenth constraint can be used to eliminate symmetry that would result in duplicate interviews schedule results. In another embodiment, the sixth constraint, a specific person can be assigned for more than one role, but if that specific person is being requested for an interview session, that specific person can be assigned at most one role. Another constraint may be that each interview location can occupy at most one room assignment per interview session. It should be noted that a solution that has exactly one penalty, the penalty could be zero or one, for each interview session.

As described herein, the interview schedule framework 232, generated by the framework generator 202, can be saved as a template for subsequent use in scheduling a subsequent interview.

The following illustrates one example of an input file created by the framework generator 202 that can be sent to a constraint solver tool (204 or 206) with a set of CSPs 234.

```
SOF
MINION 3
VARIABLES
DISCRETE INTERVIEW_TIMES[6,38] {0 .. 36}
BOOL INTERVIEWER_MAPPINGS[6,6]
BOOL ROOM_MAPPINGS[2,6]
DISCRETE aux_INTERVIEW_START {0 .. 36}
DISCRETE aux_INTERVIEW_END {0 .. 36}
```

-continued

```
BOOL aux_AFTER[6,6]
EOF
DISCRETE aux_ORDER[7]{0 .. 6}
# 6 interviews; max-interviewers-per-interview: 1, max-rooms-per-interview: 1
BOOL aux_PENALTIES[6,3]
TUPLELIST
# Restrict possible solutions for variables with duration 45
duration_45 34 38
1 1 1 0 0 0 0 0 0 0 0 0 0 0 0 0 0 0 0 0 0 0 0 0 0 0 0 0 0 0 0 0 0 3
0 1 1 1 0 0 0 0 0 0 0 0 0 0 0 0 0 0 0 0 0 0 0 0 0 0 0 0 0 0 0 0 0 1 4
0 0 1 1 1 0 0 0 0 0 0 0 0 0 0 0 0 0 0 0 0 0 0 0 0 0 0 0 0 0 0 0 0 2 5
0 0 0 1 1 1 0 0 0 0 0 0 0 0 0 0 0 0 0 0 0 0 0 0 0 0 0 0 0 0 0 0 0 3 6
0 0 0 0 1 1 1 0 0 0 0 0 0 0 0 0 0 0 0 0 0 0 0 0 0 0 0 0 0 0 0 0 0 4 7
0 0 0 0 0 1 1 1 0 0 0 0 0 0 0 0 0 0 0 0 0 0 0 0 0 0 0 0 0 0 0 0 0 5 8
0 0 0 0 0 0 1 1 1 0 0 0 0 0 0 0 0 0 0 0 0 0 0 0 0 0 0 0 0 0 0 0 0 6 9
0 0 0 0 0 0 0 1 1 1 0 0 0 0 0 0 0 0 0 0 0 0 0 0 0 0 0 0 0 0 0 0 0 7 10
0 0 0 0 0 0 0 0 1 1 1 0 0 0 0 0 0 0 0 0 0 0 0 0 0 0 0 0 0 0 0 0 0 8 11
0 0 0 0 0 0 0 0 0 1 1 1 0 0 0 0 0 0 0 0 0 0 0 0 0 0 0 0 0 0 0 0 0 9 12
0 0 0 0 0 0 0 0 0 0 1 1 1 0 0 0 0 0 0 0 0 0 0 0 0 0 0 0 0 0 0 0 0 10 13
0 0 0 0 0 0 0 0 0 0 0 1 1 1 0 0 0 0 0 0 0 0 0 0 0 0 0 0 0 0 0 0 0 11 14
0 0 0 0 0 0 0 0 0 0 0 0 1 1 1 0 0 0 0 0 0 0 0 0 0 0 0 0 0 0 0 0 0 12 15
0 0 0 0 0 0 0 0 0 0 0 0 0 1 1 1 0 0 0 0 0 0 0 0 0 0 0 0 0 0 0 0 0 13 16
0 0 0 0 0 0 0 0 0 0 0 0 0 0 1 1 1 0 0 0 0 0 0 0 0 0 0 0 0 0 0 0 0 14 17
0 0 0 0 0 0 0 0 0 0 0 0 0 0 0 1 1 1 0 0 0 0 0 0 0 0 0 0 0 0 0 0 0 15 18
0 0 0 0 0 0 0 0 0 0 0 0 0 0 0 0 1 1 1 0 0 0 0 0 0 0 0 0 0 0 0 0 0 16 19
0 0 0 0 0 0 0 0 0 0 0 0 0 0 0 0 0 1 1 1 0 0 0 0 0 0 0 0 0 0 0 0 0 17 20
0 0 0 0 0 0 0 0 0 0 0 0 0 0 0 0 0 0 1 1 1 0 0 0 0 0 0 0 0 0 0 0 0 18 21
0 0 0 0 0 0 0 0 0 0 0 0 0 0 0 0 0 0 0 1 1 1 0 0 0 0 0 0 0 0 0 0 0 19 22
0 0 0 0 0 0 0 0 0 0 0 0 0 0 0 0 0 0 0 0 1 1 1 0 0 0 0 0 0 0 0 0 0 20 23
0 0 0 0 0 0 0 0 0 0 0 0 0 0 0 0 0 0 0 0 0 1 1 1 0 0 0 0 0 0 0 0 0 21 24
0 0 0 0 0 0 0 0 0 0 0 0 0 0 0 0 0 0 0 0 0 0 1 1 1 0 0 0 0 0 0 0 0 22 25
0 0 0 0 0 0 0 0 0 0 0 0 0 0 0 0 0 0 0 0 0 0 0 1 1 1 0 0 0 0 0 0 0 23 26
0 0 0 0 0 0 0 0 0 0 0 0 0 0 0 0 0 0 0 0 0 0 0 0 1 1 1 0 0 0 0 0 0 24 27
0 0 0 0 0 0 0 0 0 0 0 0 0 0 0 0 0 0 0 0 0 0 0 0 0 1 1 1 0 0 0 0 0 25 28
0 0 0 0 0 0 0 0 0 0 0 0 0 0 0 0 0 0 0 0 0 0 0 0 0 0 1 1 1 0 0 0 0 26 29
0 0 0 0 0 0 0 0 0 0 0 0 0 0 0 0 0 0 0 0 0 0 0 0 0 0 0 1 1 1 0 0 0 27 30
0 0 0 0 0 0 0 0 0 0 0 0 0 0 0 0 0 0 0 0 0 0 0 0 0 0 0 0 1 1 1 0 0 28 31
0 0 0 0 0 0 0 0 0 0 0 0 0 0 0 0 0 0 0 0 0 0 0 0 0 0 0 0 0 1 1 1 0 29 32
0 0 0 0 0 0 0 0 0 0 0 0 0 0 0 0 0 0 0 0 0 0 0 0 0 0 0 0 0 0 1 1 1 0 30 33
0 0 0 0 0 0 0 0 0 0 0 0 0 0 0 0 0 0 0 0 0 0 0 0 0 0 0 0 0 0 0 1 1 1 0 31 34
0 0 0 0 0 0 0 0 0 0 0 0 0 0 0 0 0 0 0 0 0 0 0 0 0 0 0 0 0 0 0 0 1 1 1 0 32 35
0 0 0 0 0 0 0 0 0 0 0 0 0 0 0 0 0 0 0 0 0 0 0 0 0 0 0 0 0 0 0 0 0 1 1 1 33 36
# Restrict possible solutions for variables with duration 15
duration_15 36 38
1 0 0 0 0 0 0 0 0 0 0 0 0 0 0 0 0 0 0 0 0 0 0 0 0 0 0 0 0 0 0 0 0 0 0 0 0 1
0 1 0 0 0 0 0 0 0 0 0 0 0 0 0 0 0 0 0 0 0 0 0 0 0 0 0 0 0 0 0 0 0 0 0 0 1 2
0 0 1 0 0 0 0 0 0 0 0 0 0 0 0 0 0 0 0 0 0 0 0 0 0 0 0 0 0 0 0 0 0 0 0 0 2 3
0 0 0 1 0 0 0 0 0 0 0 0 0 0 0 0 0 0 0 0 0 0 0 0 0 0 0 0 0 0 0 0 0 0 0 0 3 4
0 0 0 0 1 0 0 0 0 0 0 0 0 0 0 0 0 0 0 0 0 0 0 0 0 0 0 0 0 0 0 0 0 0 0 0 4 5
0 0 0 0 0 1 0 0 0 0 0 0 0 0 0 0 0 0 0 0 0 0 0 0 0 0 0 0 0 0 0 0 0 0 0 0 5 6
0 0 0 0 0 0 1 0 0 0 0 0 0 0 0 0 0 0 0 0 0 0 0 0 0 0 0 0 0 0 0 0 0 0 0 0 6 7
0 0 0 0 0 0 0 1 0 0 0 0 0 0 0 0 0 0 0 0 0 0 0 0 0 0 0 0 0 0 0 0 0 0 0 0 7 8
0 0 0 0 0 0 0 0 1 0 0 0 0 0 0 0 0 0 0 0 0 0 0 0 0 0 0 0 0 0 0 0 0 0 0 0 8 9
0 0 0 0 0 0 0 0 0 1 0 0 0 0 0 0 0 0 0 0 0 0 0 0 0 0 0 0 0 0 0 0 0 0 0 0 9 10
0 0 0 0 0 0 0 0 0 0 1 0 0 0 0 0 0 0 0 0 0 0 0 0 0 0 0 0 0 0 0 0 0 0 0 0 10 11
0 0 0 0 0 0 0 0 0 0 0 1 0 0 0 0 0 0 0 0 0 0 0 0 0 0 0 0 0 0 0 0 0 0 0 0 11 12
0 0 0 0 0 0 0 0 0 0 0 0 1 0 0 0 0 0 0 0 0 0 0 0 0 0 0 0 0 0 0 0 0 0 0 0 12 13
0 0 0 0 0 0 0 0 0 0 0 0 0 1 0 0 0 0 0 0 0 0 0 0 0 0 0 0 0 0 0 0 0 0 0 0 13 14
0 0 0 0 0 0 0 0 0 0 0 0 0 0 1 0 0 0 0 0 0 0 0 0 0 0 0 0 0 0 0 0 0 0 0 0 14 15
0 0 0 0 0 0 0 0 0 0 0 0 0 0 0 1 0 0 0 0 0 0 0 0 0 0 0 0 0 0 0 0 0 0 0 0 15 16
0 0 0 0 0 0 0 0 0 0 0 0 0 0 0 0 1 0 0 0 0 0 0 0 0 0 0 0 0 0 0 0 0 0 0 0 16 17
0 0 0 0 0 0 0 0 0 0 0 0 0 0 0 0 0 1 0 0 0 0 0 0 0 0 0 0 0 0 0 0 0 0 0 0 17 18
0 0 0 0 0 0 0 0 0 0 0 0 0 0 0 0 0 0 1 0 0 0 0 0 0 0 0 0 0 0 0 0 0 0 0 0 18 19
0 0 0 0 0 0 0 0 0 0 0 0 0 0 0 0 0 0 0 1 0 0 0 0 0 0 0 0 0 0 0 0 0 0 0 0 19 20
0 0 0 0 0 0 0 0 0 0 0 0 0 0 0 0 0 0 0 0 1 0 0 0 0 0 0 0 0 0 0 0 0 0 0 0 20 21
0 0 0 0 0 0 0 0 0 0 0 0 0 0 0 0 0 0 0 0 0 1 0 0 0 0 0 0 0 0 0 0 0 0 0 0 21 22
0 0 0 0 0 0 0 0 0 0 0 0 0 0 0 0 0 0 0 0 0 0 1 0 0 0 0 0 0 0 0 0 0 0 0 0 22 23
0 0 0 0 0 0 0 0 0 0 0 0 0 0 0 0 0 0 0 0 0 0 0 1 0 0 0 0 0 0 0 0 0 0 0 0 23 24
0 0 0 0 0 0 0 0 0 0 0 0 0 0 0 0 0 0 0 0 0 0 0 0 1 0 0 0 0 0 0 0 0 0 0 0 24 25
0 0 0 0 0 0 0 0 0 0 0 0 0 0 0 0 0 0 0 0 0 0 0 0 0 1 0 0 0 0 0 0 0 0 0 0 25 26
0 0 0 0 0 0 0 0 0 0 0 0 0 0 0 0 0 0 0 0 0 0 0 0 0 0 1 0 0 0 0 0 0 0 0 0 26 27
0 0 0 0 0 0 0 0 0 0 0 0 0 0 0 0 0 0 0 0 0 0 0 0 0 0 0 1 0 0 0 0 0 0 0 0 27 28
0 0 0 0 0 0 0 0 0 0 0 0 0 0 0 0 0 0 0 0 0 0 0 0 0 0 0 0 1 0 0 0 0 0 0 0 28 29
0 0 0 0 0 0 0 0 0 0 0 0 0 0 0 0 0 0 0 0 0 0 0 0 0 0 0 0 0 1 0 0 0 0 0 0 29 30
0 0 0 0 0 0 0 0 0 0 0 0 0 0 0 0 0 0 0 0 0 0 0 0 0 0 0 0 0 0 1 0 0 0 0 0 30 31
0 0 0 0 0 0 0 0 0 0 0 0 0 0 0 0 0 0 0 0 0 0 0 0 0 0 0 0 0 0 0 1 0 0 0 0 31 32
0 0 0 0 0 0 0 0 0 0 0 0 0 0 0 0 0 0 0 0 0 0 0 0 0 0 0 0 0 0 0 0 1 0 0 0 32 33
0 0 0 0 0 0 0 0 0 0 0 0 0 0 0 0 0 0 0 0 0 0 0 0 0 0 0 0 0 0 0 0 0 1 0 0 33 34
```

```
0 0 0 0 0 0 0 0 0 0 0 0 0 0 0 0 0 0 0 0 0 0 0 0 0 0 0 0 0 0 0 0 0 1 0 34 35
0 0 0 0 0 0 0 0 0 0 0 0 0 0 0 0 0 0 0 0 0 0 0 0 0 0 0 0 0 0 0 0 0 0 1 35 36
```
\*\*SEARCH\*\*
PRINT[INTERVIEW_TIMES, INTERVIEWER_MAPPINGS, ROOM_MAPPINGS]
VARORDER[INTERVIEW_TIMES, ROOM_MAPPINGS,
INTERVIEWER_MAPPINGS]
\*\*CONSTRAINTS\*\*
penalties
sumgeq(aux_PENALTIES, 1)
sumleq(aux_PENALTIES, 1)
enforce the durations and exact start time of each interview
table(INTERVIEW_TIMES[0,_], duration_45)
table(INTERVIEW_TIMES[1,_], duration_45)
table(INTERVIEW_TIMES[2,_], duration_45)
table(INTERVIEW_TIMES[3,_], duration_15)
table(INTERVIEW_TIMES[4,_], duration_45)
table(INTERVIEW_TIMES[5,_], duration_45)
enforce that no two interviews overlap
occurrenceeq(INTERVIEW_TIMES[_,0], 1, 1)
occurrenceeq(INTERVIEW_TIMES[_,1], 1, 1)
occurrenceeq(INTERVIEW_TIMES[_,2], 1, 1)
occurrenceeq(INTERVIEW_TIMES[_,3], 1, 1)
occurrenceeq(INTERVIEW_TIMES[_,4], 1, 1)
occurrenceeq(INTERVIEW_TIMES[_,5], 1, 1)
occurrenceeq(INTERVIEW_TIMES[_,6], 1, 1)
occurrenceeq(INTERVIEW_TIMES[_,7], 1, 1)
occurrenceeq(INTERVIEW_TIMES[_,8], 1, 1)
occurrenceeq(INTERVIEW_TIMES[_,9], 1, 1)
occurrenceeq(INTERVIEW_TIMES[_,10], 1, 1)
occurrenceeq(INTERVIEW_TIMES[_,11], 1, 1)
occurrenceeq(INTERVIEW_TIMES[_,12], 1, 1)
occurrenceeq(INTERVIEW_TIMES[_,13], 1, 1)
occurrenceeq(INTERVIEW_TIMES[_,14], 1, 1)
occurrenceeq(INTERVIEW_TIMES[_,15], 1, 1)
occurrenceeq(INTERVIEW_TIMES[_,16], 1, 1)
occurrenceeq(INTERVIEW_TIMES[_,17], 1, 1)
occurrenceeq(INTERVIEW_TIMES[_,18], 1, 1)
occurrenceeq(INTERVIEW_TIMES[_,19], 1, 1)
occurrenceeq(INTERVIEW_TIMES[_,20], 1, 1)
occurrenceeq(INTERVIEW_TIMES[_,21], 1, 1)
occurrenceeq(INTERVIEW_TIMES[_,22], 1, 1)
occurrenceeq(INTERVIEW_TIMES[_,23], 1, 1)
occurrenceeq(INTERVIEW_TIMES[_,24], 1, 1)
occurrenceeq(INTERVIEW_TIMES[_,25], 1, 1)
occurrenceeq(INTERVIEW_TIMES[_,26], 1, 1)
occurrenceeq(INTERVIEW_TIMES[_,27], 1, 1)
occurrenceeq(INTERVIEW_TIMES[_,28], 1, 1)
occurrenceeq(INTERVIEW_TIMES[_,29], 1, 1)
occurrenceeq(INTERVIEW_TIMES[_,30], 1, 1)
occurrenceeq(INTERVIEW_TIMES[_,31], 1, 1)
occurrenceeq(INTERVIEW_TIMES[_,32], 1, 1)
occurrenceeq(INTERVIEW_TIMES[_,33], 1, 1)
occurrenceeq(INTERVIEW_TIMES[_,34], 1, 1)
occurrenceeq(INTERVIEW_TIMES[_,35], 1, 1)
Make interviews consecutive by constraining total duration
element([INTERVIEW_TIMES[_,36], aux_INTERVIEW_END], aux_ORDER[0], aux_INTERVIEW_START)
element([INTERVIEW_TIMES[_,36], aux_INTERVIEW_END], aux_ORDER[1], INTERVIEW_TIMES[0,37])
element([INTERVIEW_TIMES[_,36], aux_INTERVIEW_END], aux_ORDER[2], INTERVIEW_TIMES[1,37])
element([INTERVIEW_TIMES[_,36], aux_INTERVIEW_END], aux_ORDER[3], INTERVIEW_TIMES[2,37])
element([INTERVIEW_TIMES[_,36], aux_INTERVIEW_END], aux_ORDER[4], INTERVIEW_TIMES[3,37])
element([INTERVIEW_TIMES[_,36], aux_INTERVIEW_END], aux_ORDER[5], INTERVIEW_TIMES[4,37])
element([INTERVIEW_TIMES[_,36], aux_INTERVIEW_END], aux_ORDER[6], INTERVIEW_TIMES[5,37])
alldiff(aux_ORDER)
Make sure interviews start at the right modulo
modulo(aux_INTERVIEW_START, 1, 0)
each interviewer must have at most one interviewer "role" assignment (unless they're explicitly named)
sumleq(INTERVIEWER_MAPPINGS[0,_], 1)
sumleq(INTERVIEWER_MAPPINGS[1,_], 1)
sumleq(INTERVIEWER_MAPPINGS[2,_], 1)
sumleq(INTERVIEWER_MAPPINGS[3,_], 1)
sumleq(INTERVIEWER_MAPPINGS[4,_], 1)

```
sumleq(INTERVIEWER_MAPPINGS[5,_], 1)
# each interviewer "role" must have exactly one interviewer assignment
occurrence(INTERVIEWER_MAPPINGS[_,0], 1, 1)
occurrence(INTERVIEWER_MAPPINGS[_,1], 1, 1)
occurrence(INTERVIEWER_MAPPINGS[_,2], 1, 1)
occurrence(INTERVIEWER_MAPPINGS[_,3], 1, 1)
occurrence(INTERVIEWER_MAPPINGS[_,4], 1, 1)
occurrence(INTERVIEWER_MAPPINGS[_,5], 1, 1)
# each room "role" must have exactly one room assignment
occurrence(ROOM_MAPPINGS[_,0], 1, 1)
occurrence(ROOM_MAPPINGS[_,1], 1, 1)
occurrence(ROOM_MAPPINGS[_,2], 1, 1)
occurrence(ROOM_MAPPINGS[_,3], 1, 1)
occurrence(ROOM_MAPPINGS[_,4], 1, 1)
occurrence(ROOM_MAPPINGS[_,5], 1, 1)
# each room can occupy at most one room assignment per interview
# specific interviewers constraints
sumgeq([INTERVIEWER_MAPPINGS[5,0]], 1)
sumgeq([INTERVIEWER_MAPPINGS[4,1]], 1)
sumgeq([INTERVIEWER_MAPPINGS[0,2]], 1)
sumgeq([INTERVIEWER_MAPPINGS[2,3]], 1)
sumgeq([INTERVIEWER_MAPPINGS[1,4]], 1)
sumgeq([INTERVIEWER_MAPPINGS[3,5]], 1)
# interviewers availability constraints
reifyimply(reify(weightedsumgeq([0,0,0,0,0,0,0,0,0,0,0,0,0,0,0,0,1,1,0,0,0,0,0,0,1,1,1,1,0,0,
0,0,0,0,0,0,0], INTERVIEW_TIMES[0, _], 1), aux_PENALTIES[0,0]),
INTERVIEWER_MAPPINGS[5,0])
reifyimply(reify(weightedsumgeq([1,1,1,1,1,1,1,1,1,1,1,1,1,1,1,1,1,1,1,1,1,1,1,1,1,1,1,1,1,1,
1,1,1,1,1,0,0], INTERVIEW_TIMES[1, _], 1), aux_PENALTIES[1,0]),
INTERVIEWER_MAPPINGS[4,1])
reifyimply(reify(weightedsumgeq([0,0,0,0,0,0,0,0,0,0,0,0,0,0,0,0,0,0,0,0,0,0,0,0,0,0,0,0,0,0,
0,0,0,0,0,0,0], INTERVIEW_TIMES[2, _], 1), aux_PENALTIES[2,0]),
INTERVIEWER_MAPPINGS[0,2])
reifyimply(reify(weightedsumgeq([0,0,0,0,0,0,0,0,0,0,0,0,0,0,0,0,0,0,0,0,0,0,0,0,0,0,0,0,0,0,
0,0,0,0,0,0,0], INTERVIEW_TIMES[3, _], 1), aux_PENALTIES[3,0]),
INTERVIEWER_MAPPINGS[2,3])
reifyimply(reify(weightedsumgeq([0,0,0,0,0,0,0,0,0,1,1,0,0,0,0,0,0,0,0,0,0,0,0,0,0,0,0,0,0,0,
0,0,0,0,0,0,0], INTERVIEW_TIMES[4, _], 1), aux_PENALTIES[4,0]),
INTERVIEWER_MAPPINGS[1,4])
reifyimply(reify(weightedsumgeq([0,0,0,0,0,0,0,0,0,0,0,0,0,0,0,0,0,0,0,0,0,0,0,0,0,0,0,0,0,0,
0,0,0,0,0,0,0], INTERVIEW_TIMES[5, _], 1), aux_PENALTIES[5,0]),
INTERVIEWER_MAPPINGS[3,5])
# specific rooms constraints
sumgeq([ROOM_MAPPINGS[1,0], ROOM_MAPPINGS[0,0]], 1)
sumgeq([ROOM_MAPPINGS[1,1], ROOM_MAPPINGS[0,1]], 1)
sumgeq([ROOM_MAPPINGS[1,2], ROOM_MAPPINGS[0,2]], 1)
sumgeq([ROOM_MAPPINGS[1,3], ROOM_MAPPINGS[0,3]], 1)
sumgeq([ROOM_MAPPINGS[1,4], ROOM_MAPPINGS[0,4]], 1)
sumgeq([ROOM_MAPPINGS[1,5], ROOM_MAPPINGS[0,5]], 1)
# rooms availability constraints
reifyimply(reify(weightedsumgeq([0,0,0,0,0,0,0,0,0,0,0,0,0,0,0,0,1,1,0,0,0,0,0,0,0,0,0,0,0,0,
0,0,0,0,0,0,0], INTERVIEW_TIMES[0, _], 1), aux_PENALTIES[0,1]),
ROOM_MAPPINGS[1,0])
reifyimply(reify(weightedsumgeq([1,1,1,1,1,1,1,1,1,1,1,1,1,1,1,1,1,1,1,1,1,1,1,1,1,1,1,1,1,1,
1,1,1,1,1,0,0], INTERVIEW_TIMES[0, _], 1), aux_PENALTIES[0,1]),
ROOM_MAPPINGS[0,0])
reifyimply(reify(weightedsumgeq([0,0,0,0,0,0,0,0,0,0,0,0,0,0,0,0,1,1,0,0,0,0,0,0,0,0,0,0,0,0,
0,0,0,0,0,0,0], INTERVIEW_TIMES[1, _], 1), aux_PENALTIES[1,1]),
ROOM_MAPPINGS[1,1])
reifyimply(reify(weightedsumgeq([1,1,1,1,1,1,1,1,1,1,1,1,1,1,1,1,1,1,1,1,1,1,1,1,1,1,1,1,1,1,
1,1,1,1,1,0,0], INTERVIEW_TIMES[1, _], 1), aux_PENALTIES[1,1]),
ROOM_MAPPINGS[0,1])
reifyimply(reify(weightedsumgeq([0,0,0,0,0,0,0,0,0,0,0,0,0,0,0,0,1,1,0,0,0,0,0,0,0,0,0,0,0,0,
0,0,0,0,0,0,0], INTERVIEW_TIMES[2, _], 1), aux_PENALTIES[2,1]),
ROOM_MAPPINGS[1,2])
reifyimply(reify(weightedsumgeq([1,1,1,1,1,1,1,1,1,1,1,1,1,1,1,1,1,1,1,1,1,1,1,1,1,1,1,1,1,1,
1,1,1,1,1,0,0], INTERVIEW_TIMES[2, _], 1), aux_PENALTIES[2,1]),
ROOM_MAPPINGS[0,2])
reifyimply(reify(weightedsumgeq([0,0,0,0,0,0,0,0,0,0,0,0,0,0,0,0,1,1,0,0,0,0,0,0,0,0,0,0,0,0,
0,0,0,0,0,0,0], INTERVIEW_TIMES[3, _], 1), aux_PENALTIES[3,1]),
ROOM_MAPPINGS[1,3])
reifyimply(reify(weightedsumgeq([1,1,1,1,1,1,1,1,1,1,1,1,1,1,1,1,1,1,1,1,1,1,1,1,1,1,1,1,1,1,
1,1,1,1,1,0,0], INTERVIEW_TIMES[3, _], 1), aux_PENALTIES[3,1]),
ROOM_MAPPINGS[0,3])
reifyimply(reify(weightedsumgeq([0,0,0,0,0,0,0,0,0,0,0,0,0,0,0,0,1,1,0,0,0,0,0,0,0,0,0,0,0,0,
0,0,0,0,0,0,0], INTERVIEW_TIMES[4, _], 1), aux_PENALTIES[4,1]),
ROOM_MAPPINGS[1,4])
reifyimply(reify(weightedsumgeq([1,1,1,1,1,1,1,1,1,1,1,1,1,1,1,1,1,1,1,1,1,1,1,1,1,1,1,1,1,1,
1,1,1,1,1,0,0], INTERVIEW_TIMES[4, _], 1), aux_PENALTIES[4,1]),
```

ROOM_MAPPINGS[0,4])
reifyimply(reify(weightedsumgeq([0,0,0,0,0,0,0,0,0,0,0,0,0,0,0,0,0,0,1,1,0,0,0,0,0,0,0,0,0,0,0,0,0,0,0,0,0], INTERVIEW_TIMES[5,_], 1), aux_PENALTIES[5,1]),
ROOM_MAPPINGS[1,5])
reifyimply(reify(weightedsumgeq([1,1,1,1,1,1,1,1,1,1,1,1,1,1,1,1,1,1,1,1,1,1,1,1,1,1,1,1,1,1,1,1,1,1,1,0,0], INTERVIEW_TIMES[5,_], 1), aux_PENALTIES[5,1]),
ROOM_MAPPINGS[0,5])
ordering constraints
eq(aux_AFTER[0,0], 0)
reify(sumleq(INTERVIEW_TIMES[1,37], INTERVIEW_TIMES[0,36]), aux_AFTER[0,1])
reify(sumleq(INTERVIEW_TIMES[2,37], INTERVIEW_TIMES[0,36]), aux_AFTER[0,2])
reify(sumleq(INTERVIEW_TIMES[3,37], INTERVIEW_TIMES[0,36]), aux_AFTER[0,3])
reify(sumleq(INTERVIEW_TIMES[4,37], INTERVIEW_TIMES[0,36]), aux_AFTER[0,4])
reify(sumleq(INTERVIEW_TIMES[5,37], INTERVIEW_TIMES[0,36]), aux_AFTER[0,5])
reify(sumleq(INTERVIEW_TIMES[0,37], INTERVIEW_TIMES[1,36]), aux_AFTER[1,0])
eq(aux_AFTER[1,1], 0)
reify(sumleq(INTERVIEW_TIMES[2,37], INTERVIEW_TIMES[1,36]), aux_AFTER[1,2])
reify(sumleq(INTERVIEW_TIMES[3,37], INTERVIEW_TIMES[1,36]), aux_AFTER[1,3])
reify(sumleq(INTERVIEW_TIMES[4,37], INTERVIEW_TIMES[1,36]), aux_AFTER[1,4])
reify(sumleq(INTERVIEW_TIMES[5,37], INTERVIEW_TIMES[1,36]), aux_AFTER[1,5])
reify(sumleq(INTERVIEW_TIMES[0,37], INTERVIEW_TIMES[2,36]), aux_AFTER[2,0])
reify(sumleq(INTERVIEW_TIMES[1,37], INTERVIEW_TIMES[2,36]), aux_AFTER[2,1])
eq(aux_AFTER[2,2], 0)
reify(sumleq(INTERVIEW_TIMES[3,37], INTERVIEW_TIMES[2,36]), aux_AFTER[2,3])
reify(sumleq(INTERVIEW_TIMES[4,37], INTERVIEW_TIMES[2,36]), aux_AFTER[2,4])
reify(sumleq(INTERVIEW_TIMES[5,37], INTERVIEW_TIMES[2,36]), aux_AFTER[2,5])
reify(sumleq(INTERVIEW_TIMES[0,37], INTERVIEW_TIMES[3,36]), aux_AFTER[3,0])
reify(sumleq(INTERVIEW_TIMES[1,37], INTERVIEW_TIMES[3,36]), aux_AFTER[3,1])
reify(sumleq(INTERVIEW_TIMES[2,37], INTERVIEW_TIMES[3,36]), aux_AFTER[3,2])
eq(aux_AFTER[3,3], 0)
reify(sumleq(INTERVIEW_TIMES[4,37], INTERVIEW_TIMES[3,36]), aux_AFTER[3,4])
reify(sumleq(INTERVIEW_TIMES[5,37], INTERVIEW_TIMES[3,36]), aux_AFTER[3,5])
reify(sumleq(INTERVIEW_TIMES[0,37], INTERVIEW_TIMES[4,36]), aux_AFTER[4,0])
reify(sumleq(INTERVIEW_TIMES[1,37], INTERVIEW_TIMES[4,36]), aux_AFTER[4,1])
reify(sumleq(INTERVIEW_TIMES[2,37], INTERVIEW_TIMES[4,36]), aux_AFTER[4,2])
reify(sumleq(INTERVIEW_TIMES[3,37], INTERVIEW_TIMES[4,36]), aux_AFTER[4,3])
eq(aux_AFTER[4,4], 0)
reify(sumleq(INTERVIEW_TIMES[5,37], INTERVIEW_TIMES[4,36]), aux_AFTER[4,5])
reify(sumleq(INTERVIEW_TIMES[0,37], INTERVIEW_TIMES[5,36]), aux_AFTER[5,0])
reify(sumleq(INTERVIEW_TIMES[1,37], INTERVIEW_TIMES[5,36]), aux_AFTER[5,1])
reify(sumleq(INTERVIEW_TIMES[2,37], INTERVIEW_TIMES[5,36]), aux_AFTER[5,2])
reify(sumleq(INTERVIEW_TIMES[3,37], INTERVIEW_TIMES[5,36]), aux_AFTER[5,3])
reify(sumleq(INTERVIEW_TIMES[4,37], INTERVIEW_TIMES[5,36]), aux_AFTER[5,4])
eq(aux_AFTER[5,5], 0)
interview 0: ordering is:[3, 4]
sumleq(aux_AFTER[0,_], 3)
sumgeq(aux_AFTER[0,_], 2)
interview 3: ordering is:[6]
sumleq(aux_AFTER[3,_], 5)
sumgeq(aux_AFTER[3,_], 5)
equivalent ordering constraints
Penalties for swapping rooms
reify(watched-or({watched-and(leq(INTERVIEW_TIMES[0,36],
INTERVIEW_TIMES[1,37]), hamming(ROOM_MAPPINGS[_,0],
ROOM_MAPPINGS[_,1], 1)}), watched-and({eq(INTERVIEW_TIMES[0,36],
INTERVIEW_TIMES[2,37]), hamming(ROOM_MAPPINGS[_,0],
ROOM_MAPPINGS[_,2], 1)}), watched-and({eq(INTERVIEW_TIMES[0,36],
INTERVIEW_TIMES[3,37]), hamming(ROOM_MAPPINGS[_,0],
ROOM_MAPPINGS[_,3], 1)}), watched-and({eq(INTERVIEW_TIMES[0,36],
INTERVIEW_TIMES[4,37]), hamming(ROOM_MAPPINGS[_,0],
ROOM_MAPPINGS[_,4], 1)}), watched-and({eq(INTERVIEW_TIMES[0,36],
INTERVIEW_TIMES[5,37]), hamming(ROOM_MAPPINGS[_,0],
ROOM_MAPPINGS[_,5], 1)})}), aux_PENALTIES[0,2])
reify(watched-or({watched-and({eq(INTERVIEW_TIMES[1,36],
INTERVIEW_TIMES[0,37]), hamming(ROOM_MAPPINGS[_,1],
ROOM_MAPPINGS[_,0], 1)}), watched-and({eq(INTERVIEW_TIMES[1,36],
INTERVIEW_TIMES[2,37]), hamming(ROOM_MAPPINGS[_,1],
ROOM_MAPPINGS[_,2], 1)}), watched-and({eq(INTERVIEW_TIMES[1,36],
INTERVIEW_TIMES[3,37]), hamming(ROOM_MAPPINGS[_,1],
ROOM_MAPPINGS[_,3], 1)}), watched-and({eq(INTERVIEW_TIMES[1,36],
INTERVIEW_TIMES[4,37]), hamming(ROOM_MAPPINGS[_,1],
ROOM_MAPPINGS[_,4], 1)}), watched-and({eq(INTERVIEW_TIMES[1,36],
INTERVIEW_TIMES[5,37]), hamming(ROOM_MAPPINGS[_,1],
ROOM_MAPPINGS[_,5], 1)})}), aux_PENALTIES[1,2])
reify(watched-or({watched-and({eq(INTERVIEW_TIMES[2,36],
INTERVIEW_TIMES[0,37]), hamming(ROOM_MAPPINGS[_,2],
ROOM_MAPPINGS[_,0], 1)}), watched-and({eq(INTERVIEW_TIMES[2,36],
INTERVIEW_TIMES[1,37]), hamming(ROOM_MAPPINGS[_,2],
ROOM_MAPPINGS[_,1], 1)}), watched-and({eq(INTERVIEW_TIMES[2,36],

```
INTERVIEW_TIMES[3,37]), hamming(ROOM_MAPPINGS[_,2],
ROOM_MAPPINGS[_,3], 1)}), watched-and({eq(INTERVIEW_TIMES[2,36],
INTERVIEW_TIMES[4,37]), hamming(ROOM_MAPPINGS[_,2],
ROOM_MAPPINGS[_,4], 1)}), watched-and({eq(INTERVIEW_TIMES[2,36],
INTERVIEW_TIMES[5,37]), hamming(ROOM_MAPPINGS[_,2],
ROOM_MAPPINGS[_,5], 1)})}), aux_PENALTIES[2,2])
reify(watched-or({watched-and({eq(INTERVIEW_TIMES[3,36],
INTERVIEW_TIMES[0,37]), hamming(ROOM_MAPPINGS[_,3],
ROOM_MAPPINGS[_,0], 1)}), watched-and({eq(INTERVIEW_TIMES[3,36],
INTERVIEW_TIMES[1,37]), hamming(ROOM_MAPPINGS[_,3],
ROOM_MAPPINGS[_,1], 1)}), watched-and({eq(INTERVIEW_TIMES[3,36],
INTERVIEW_TIMES[2,37]), hamming(ROOM_MAPPINGS[_,3],
ROOM_MAPPINGS[_,2], 1)}), watched-and({eq(INTERVIEW_TIMES[3,36],
INTERVIEW_TIMES[4,37]), hamming(ROOM_MAPPINGS[_,3],
ROOM_MAPPINGS[_,4], 1)}), watched-and({eq(INTERVIEW_TIMES[3,36],
INTERVIEW_TIMES[5,37]), hamming(ROOM_MAPPINGS[_,3],
ROOM_MAPPINGS[_,5], 1)})}), aux_PENALTIES[3,2])
reify(watched-or({watched-and((eq(INTERVIEW_TIMES[4,36],
INTERVIEW_TIMES[0,37]), hamming(ROOM_MAPPINGS[_,4],
ROOM_MAPPINGS[_,0], 1)}), watched-and({eq(INTERVIEW_TIMES[4,36],
INTERVIEW_TIMES[1,37]), hamming(ROOM_MAPPINGS[_,4],
ROOM_MAPPINGS[_,1], 1)}), watched-and({eq(INTERVIEW_TIMES[4,36],
INTERVIEW_TIMES[2,37]), hamming(ROOM_MAPPINGS[_,4],
ROOM_MAPPINGS[_,2], 1)}), watched-and({eq(INTERVIEW_TIMES[4.36],
INTERVIEW_TIMES[3,37]), hamming(ROOM_MAPPINGS[_,4],
ROOM_MAPPINGS[_,3], 1)}), watched-and({eq(INTERVIEW_TIMES[4,36],
INTERVIEW_TIMES[5,37]), hamming(ROOM_MAPPINGS[_,4],
ROOM_MAPPINGS[_,5], l)})}), aux_PENALTIES[4,2])
reify(watched-or({watched-and({eq(INTERVIEW_TIMES[5,36],
INTERVIEW_TIMES[0,37]), hamming(ROOM_MAPPINGS[_,5],
ROOM_MAPPINGS[_,0], 1)}), watched-and({eq(INTERVIEW_TIMES[5,36],
INTERVIEW_TIMES[1,37]), hamming(ROOM_MAPPINGS[_,5],
ROOM_MAPPINGS[_,1], 1)}), watched-and({eq(INTERVIEW_TIMES[5,36],
INTERVIEW_TIMES[2,37]), hamming(ROOM_MAPPINGS[_,5],
ROOM_MAPPINGS[_,2], 1)}), watched-and({eq(INTERVIEW_TIMES[5,36],
INTERVIEW_TIMES[3,37]), hamming(ROOM_MAPPINGS[_,5],
ROOM_MAPPINGS[_,3], 1)}), watched-and({eq(INTERVIEW_TIMES[5,36],
INTERVIEW_TIMES[4,37]), hamming(ROOM_MAPPINGS[_,5],
ROOM_MAPPINGS[_,4], 1)})}), aux_PENALTIES[5,2])
EOF
```

The interview-scheduling tool 210 compiled a scheduling problem into the above input file for the CSP solver. The input file above has four sections: 1) VARIABLES; 2) TUPLELIST; 3) SEARCH; and 4) CONSTRAINTS. The VARIABLES section lists the variables that make up our constraint satisfaction problem. When the CSP solver is done, the CSP solver prints the values it has found for the variables listed in the PRINT directive in the SEARCH section. The variable, INTERVIEW_TIMES, is a 6×38 2-dimensional array of integers between 0 and 36. Our actual scheduling problem here involves 6 back-to-back meetings, which is why there are 6 rows in this 2-D array (each row represents the start and end times of a given meeting). In this example, interview-scheduling tool 210 is searching over a 9.5-hour window of time. For efficiency, interview-scheduling tool 210 looks at time in 15-minute chunks. 9.5 hours works out to 36 15-minute chunks (that's why the range of this variable is 0-36). The first 36 columns in this 2-D array represent whether a given meeting is happening at a given 15-minute chunk of time. If it is happening, that cell will be "1"; and if it is not, that cell will be a "0". The last 2 columns represent the start and end time in a different way, simply for convenience. The 37th column is the index of the 15-minute chunk when the meeting begins, and the 38th column (the last column) is the index of the 15-minute chunk when the meeting ends. If it weren't for these last 2 columns, the domain of this variable would just be 0-1. But since these last 2 columns need to be able to be any of the 15-minute chunks within the 9.5 hours, the range is 0-36. The INTERVIEWER_MAPPINGS variable denotes which interviewers are participating in which meetings. In this example, 6 people are considered, and there are 6 meetings to place them in, which is why it's exactly 6×6. The type of this variable is BOOL, meaning that each cell can be either 0 or 1. The ROOM_MAPPINGS variable denotes which rooms (or other interview locations) are being utilized by each meeting. In this example, there are only two rooms to choose from, which is why there are 2 rows, and 6 meetings, which is why there are 6 columns. The variable aux_INTERVIEW_START and aux_INTERVIEW_END are helper variables that store the 15-minute chunk in which the entire interview (i.e. the first meeting) starts, and when the entire interview (i.e. the last meeting) ends. Just like the INTERVIEW_TIMES, they are bound to be from 0 to 36, since there are thirty-six 15-minute chunks. Like with the interviewer mappings, the type is BOOL, meaning each cell must be 0 or 1. The variable aux_AFTER is a helper 6×6 2-D array of Booleans that tracks which meeting is scheduled to occur after which other meetings. Basically, if [x,y] is 1, then meeting x is after meeting y. The variable aux_ORDER is a 1-D array that tracks what the final order of each meeting is. The 0 represents the beginning of the entire interview, and the 6 represents the end of the entire interview, with everything in between representing the boundary between two meetings. A penalty variable, aux_PENALTIES, must be true if an interviewer or room is double booked, or if there is a scenario where the candidate switch rooms between adjacent meetings. The aux_PENALTIES is 6×3. That's because each row represents one of our 6 meetings, and there are three kinds of penalties per meeting: interviewer conflict, room conflict, and room change. So cell (3,0) is 1 if and only if meeting 3 has an interview conflict. Cell (3,1) is 1 if and only if meeting 3 has a room conflict. And Cell (3,2) is 1 if and only if meeting 3 is in a different room than meeting 4.

The TUPLELIST section allows the interview-scheduling tool 210 to define some arrays that it will use later in the constraints. The TUPLELIST is used to define the possible solutions for our interview times, so the search space can be reduced and be more efficient. This defines an array called duration_45, with dimensions 34×38. These 38 rows represent every valid assignment to a 45-minute meeting's interview times. Since each column represents a 15-minute chunk, it can be seen that the assignments are restricted to 45-minute meetings to be 3 consecutive 15-minute chunks. By listing all valid 45-minute options, and using them later as a constraint, the interview-scheduling tool 210 can help CSP solver search faster.

The SEARCH section can be more administrative for the CSP solver in that this section tells the CSP solver the following: 1) which variables to print when it's done, and in what order to print them; and 2) what order it should search through the search space across our various variables.

The CONSTRAINTS section has all of the various constraints, or rules, defining what values can be assigned to the variables. The interview-scheduling tool 210 runs several jobs to fully search a schedule. The total number of jobs processed is N×M, where N is the number of candidate availability windows the solver has to check, and M is the number of penalties that could possibly incur from double-booking interviewers or rooms, etc.

The pair of constraints sumgeq(aux_PENALTIES, 1) and sumleq(aux_PENALTIES, 1) tells CSP solver that, for this solve, the interview-scheduling tool 210 wants the solver to find solutions that have exactly 1 penalty. The sumgeq indicates that "the sum of this vector must be greater than or equal to 1" and the sumleq says "the sum of this vector must be less than or equal to 1". The table interview time constraints enforces that a given vector match the values allowed in a specific array specified in the TUPLELIST. There is one constraint for each meeting, enforcing that the interview times for that meeting match the allowed values corresponding the meetings' desired duration.

Recall that each cell in the INTERVIEW_TIMES 2-D array is true if a given meeting is happening at a given 15-minute chunk of time. The set of occurenceleq constraints requires that each column in the INTERVIEW_TIMES array has at most 1 cell that is 1. This essentially indicates, "at most one meeting can be going on at any given time". The element constraints basically are saying that each meeting's start must line up with another meeting's end. The constraint element (A,B,C) says that element B of vector A must equal C. INTERVIEW_TIMES[_,36] is a vector of the 6 meetings' start times, which combined with aux_INTERVIEW_END is every time boundary of the entire interview. The alldiff constraint says that each aux_ORDER value must be different from every other aux_ORDER value. This ensures that each meeting gets its own distinct order in the solution.

Regarding the modulo constraint, most meetings start on the top of the hour, or on the half-hour. If all of the durations of the various meetings are multiples of 30 minutes, this constraint will require that the interview start on the half hour. If one or more of the meetings are some multiple of 15 minutes in duration, the interview-scheduling tool 210 simply requires the modulo to be 1, which says that the interview can start on the :15 or :45 as well as the top of the hour or :30 after the hour (what you see here). This constraint, as well as other constraints, can be removed where appropriate.

Regarding the interview role assignment constraints, recall that the INTERVIEWER_MAPPINGS cell is 1 when an interviewer is participating in a meeting. These constraints ensure that each interviewer will participate in at most 1 meeting each. If a user asks for an interviewer specifically for more than one meeting, this constraint is adjusted to let the interviewer be used more than once. The constraints of each interviewer ensure that each interviewer role defined in the interview is assigned exactly one person. The same thing can be done for rooms with each room assignment and each room role. It should be noted that it is fine for a room to be used for more than one meeting. In fact, it may be preferable to use the same room as much as possible. If there were more than one room being used for a given meeting, there would be a constraint here telling the CSP solver that each room slot for each given meeting must have a different room. In this example, there are no meetings with multiple rooms, so there are no constraints here.

The interview-scheduling tool 210 allows you to request specific people for each interviewer slot with the specific interviewers constraints. These constraints require a specific person be assigned to a specific meeting. The interviewers availability constraints force the CSP solver to either avoid double booking an interviewer (or room), or take a penalty. For example, take the following constraint: reifyimply(reify (weightedsumgeq([0,0,0,0,0,0,0,0,0,0,0,0,0,0,0,0,1,1,0,0,0, 0,0,0,1,1,1,1,0,0,0, 0,0,0,0,0,0,0], INTERVIEW_TIMES [0,_], 1), aux_PENALTIES[0,0]), INTERVIEWER_MAPPINGS[5,0]). This indicates that if interviewer 5 is assigned to meeting 0 then the dot product of meeting 0's times and interviewer 5's availability (represented by the vector of 0s and 1s) must be 0 OR there must be a double-booked interviewer penalty for meeting 0. So basically, if interviewer 5 is in meeting 0, then meeting 0 must not conflict with interviewer 5's existing meetings.

For the specific room constraints, in the interview design step, the user can list specific rooms they would like to use for a given meeting. Each of these constraints ensures that one of the rooms required by the user is selected for each meeting. In this specific example, there are two rooms (room 0 and room 1) that are allowed to be chosen for all six meetings. If there were a single room allowed, there would be a single ROOM_MAPPINGS cell listed; if there were three rooms allowed, there would be three ROOM_MAPPINGS cells listed, etc.

The room availability constraints are similar to the interviewer availability constraints, except for the available rooms. If a given room is being used for a given meeting, then either the room must be free at that time, or a room penalty is taken for that meeting.

The ordering constraints apply the desired semantics of our aux_AFTER variable to the actual variable. Specifically, if aux_AFTER[A,B] is true, then interview A must take place after interview B.

If there are specific ordering constraints (e.g. meeting must be 2nd), they are expressed in a constraint like in the examples above "sumleq(aux_AFTER[0,_],3)," "sumgeq(aux_AFTER[0,_2)," and "sumleq(aux_AFTER[3,_],5)." In this case, the first meeting must be the 3rd or 4th meeting of the day, and interview 4 must be the 6th meeting of the day.

Sometimes multiple meetings in a single interview are effectively identical. This can result in duplicate results (one version where the first identical meeting occurs "first" and one version where the second identical meeting is "first"). To the end user, this looks like duplicate interview schedule results. To avoid this, when there are effectively identical meetings, an ordering rule is artificially added that says one of them must be before the other in an equivalent ordering constraint. This causes the CSP solver to only return one result, instead of two duplicates. In this example, all meetings are different enough that this feature is used, so no constraint appears in this input file.

It may be bad from a candidate experience perspective to switch rooms. So a penalty can be taken if rooms are switched between two adjacent meetings with the penalty-for-swapping constraints. Each of these constraints is saying: for a given meeting, if the previous or following meetings use different rooms than this meeting, then a room-switching penalty is taken.

The following illustrates one example of an output file returned by the constraint solver tool (204 or 206) with data represents the interview schedule results 242.

```
SOF
#Four Results
#start of first result
# INTERVIEW_TIMES
0 0 0 0 0 0 0 0 0 0 0 0 0 0 0 0 0 0 0 0 0 0 0 0 0 0 0 0 1 1 1 0 0 0 0 0 29 32
0 0 0 0 0 0 0 0 0 0 0 0 0 0 0 0 0 0 0 0 0 0 0 0 0 0 0 0 0 0 0 1 1 1 0 32 35
0 0 0 0 0 0 0 0 0 0 0 0 0 0 0 0 0 0 0 0 0 0 0 0 0 1 1 1 0 0 0 0 0 0 0 0 26 29
0 0 0 0 0 0 0 0 0 0 0 0 0 0 0 0 0 0 0 0 0 0 0 0 0 0 0 0 0 0 0 0 0 1 1 1 35 36
0 0 0 0 0 0 0 0 0 0 0 0 0 0 0 0 0 0 0 0 0 0 1 1 1 0 0 0 0 0 0 0 0 0 23 26
0 0 0 0 0 0 0 0 0 0 0 0 0 0 0 0 0 0 0 1 1 1 0 0 0 0 0 0 0 0 0 0 0 0 20 23
#INTERVIEWER_MAPPINGS
0 0 1 0 0 0
0 0 0 0 1 0
0 0 0 1 0 0
0 0 0 0 0 1
0 1 0 0 0 0
1 0 0 0 0 0
#ROOM_MAPPINGS
0 0 0 0 0 0
1 1 1 1 1 1
#start of second result
0 0 0 0 0 0 0 0 0 0 0 0 0 0 0 0 0 0 0 0 0 0 0 0 0 0 0 0 1 1 1 0 0 0 0 0 29 32
0 0 0 0 0 0 0 0 0 0 0 0 0 0 0 0 0 0 0 0 0 0 0 0 0 0 0 0 0 0 0 1 1 1 0 32 35
0 0 0 0 0 0 0 0 0 0 0 0 0 0 0 0 0 0 0 0 0 0 0 0 0 1 1 1 0 0 0 0 0 0 0 0 26 29
0 0 0 0 0 0 0 0 0 0 0 0 0 0 0 0 0 0 0 0 0 0 0 0 0 0 0 0 0 0 0 0 0 1 1 1 35 36
0 0 0 0 0 0 0 0 0 0 0 0 0 0 0 0 0 0 0 1 1 1 0 0 0 0 0 0 0 0 0 0 0 0 20 23
0 0 0 0 0 0 0 0 0 0 0 0 0 0 0 0 0 0 0 0 0 0 1 1 1 0 0 0 0 0 0 0 0 0 23 26
0 0 1 0 0 0
0 0 0 0 1 0
0 0 0 1 0 0
0 0 0 0 0 1
0 1 0 0 0 0
1 0 0 0 0 0
0 0 0 0 0 0
1 1 1 1 1 1
#start of third result
0 0 0 0 0 0 0 0 0 0 0 0 0 0 0 0 0 0 0 0 0 0 0 0 0 0 0 0 1 1 1 0 0 0 0 0 29 32
0 0 0 0 0 0 0 0 0 0 0 0 0 0 0 0 0 0 0 0 0 0 0 0 0 0 0 0 0 0 0 1 1 1 0 32 35
0 0 0 0 0 0 0 0 0 0 0 0 0 0 0 0 0 0 0 0 0 0 1 1 1 0 0 0 0 0 0 0 0 0 23 26
0 0 0 0 0 0 0 0 0 0 0 0 0 0 0 0 0 0 0 0 0 0 0 0 0 0 0 0 0 0 0 0 0 1 1 1 35 36
0 0 0 0 0 0 0 0 0 0 0 0 0 0 0 0 0 0 0 0 0 0 0 0 0 1 1 1 0 0 0 0 0 0 0 0 26 29
0 0 0 0 0 0 0 0 0 0 0 0 0 0 0 0 0 0 0 1 1 1 0 0 0 0 0 0 0 0 0 0 0 0 20 23
0 0 1 0 0 0
0 0 0 0 1 0
0 0 0 1 0 0
0 0 0 0 0 1
0 1 0 0 0 0
1 0 0 0 0 0
0 0 0 0 0 0
1 1 1 1 1 1
#start of fourth result
0 0 0 0 0 0 0 0 0 0 0 0 0 0 0 0 0 0 0 0 0 0 0 0 0 0 0 0 1 1 1 0 0 0 0 0 29 32
0 0 0 0 0 0 0 0 0 0 0 0 0 0 0 0 0 0 0 0 0 0 0 0 0 0 0 0 0 0 0 1 1 1 0 32 35
0 0 0 0 0 0 0 0 0 0 0 0 0 0 0 0 0 0 0 0 0 0 1 1 1 0 0 0 0 0 0 0 0 0 23 26
0 0 0 0 0 0 0 0 0 0 0 0 0 0 0 0 0 0 0 0 0 0 0 0 0 0 0 0 0 0 0 0 0 1 1 1 35 36
0 0 0 0 0 0 0 0 0 0 0 0 0 0 0 0 0 0 0 1 1 1 0 0 0 0 0 0 0 0 0 0 0 0 20 23
0 0 0 0 0 0 0 0 0 0 0 0 0 0 0 0 0 0 0 0 0 0 0 0 0 1 1 1 0 0 0 0 0 0 0 0 26 29
0 0 1 0 0 0
0 0 0 0 1 0
0 0 0 1 0 0
0 0 0 0 0 1
0 1 0 0 0 0
1 0 0 0 0 0
0 0 0 0 0 0
1 1 1 1 1 1
EOF
```

It should be noted that the # designate notations added to the output file for purposes of identifying the data for the four results. From the INTERVIEW_TIMES it can be seen for each row (which represents one of the six meetings in this interview) which 15-minute chunks the meeting takes up in the first 36 columns, as well as the start and end 15-minute chunks in the last two columns. For the INTERVIEWER_MAPPINGS, if cell (A,B) is 1, that indicates that interviewer A is assigned to attend meeting B. For the ROOM_MAPPINGS, if cell (A,B) is 1, then room A is going to be used for meeting B.

FIG. 2A illustrates one embodiment of a screen provided by the interview-scheduling tool 116 (or 210), which allows the user to schedule one or more interviews as well as view and manage currently scheduled interviews. For ease of description, the following description refers only to interview-scheduling tool 116, but the description also applies to the interview-scheduling tool 210. It should be noted that interview schedule may display the scheduled interviews, which may already be set up by the user, or by other users with appropriate permissions. In some embodiments, the interview schedule screen may display to the user only upcoming scheduled interviews. FIG. 2A shows two sets of scheduled interviews associated with the user, including one with "Carl Candidate" and "Carrie Mathison," scheduled for January 3 and January 4 in a list view. In other embodiments, the interview schedule screen may display only interviews created by the user. In addition, the interview schedule screen may provide for the user to change the display options, including showing a limited number of scheduled interviews. In addition, the interview-scheduling tool 116 may search for interview schedule results using the scheduling engine 120 based on inputs received from the user via the interview schedule screen.

In one embodiment, the interview-scheduling tool 116 may provide for the user to schedule a new interview with a new candidate. FIG. 2A shows the scheduled interview screen includes a "schedule interview" button, which allows the interview-scheduling tool 116 to direct the user to schedule a new interview.

Figure 2C:
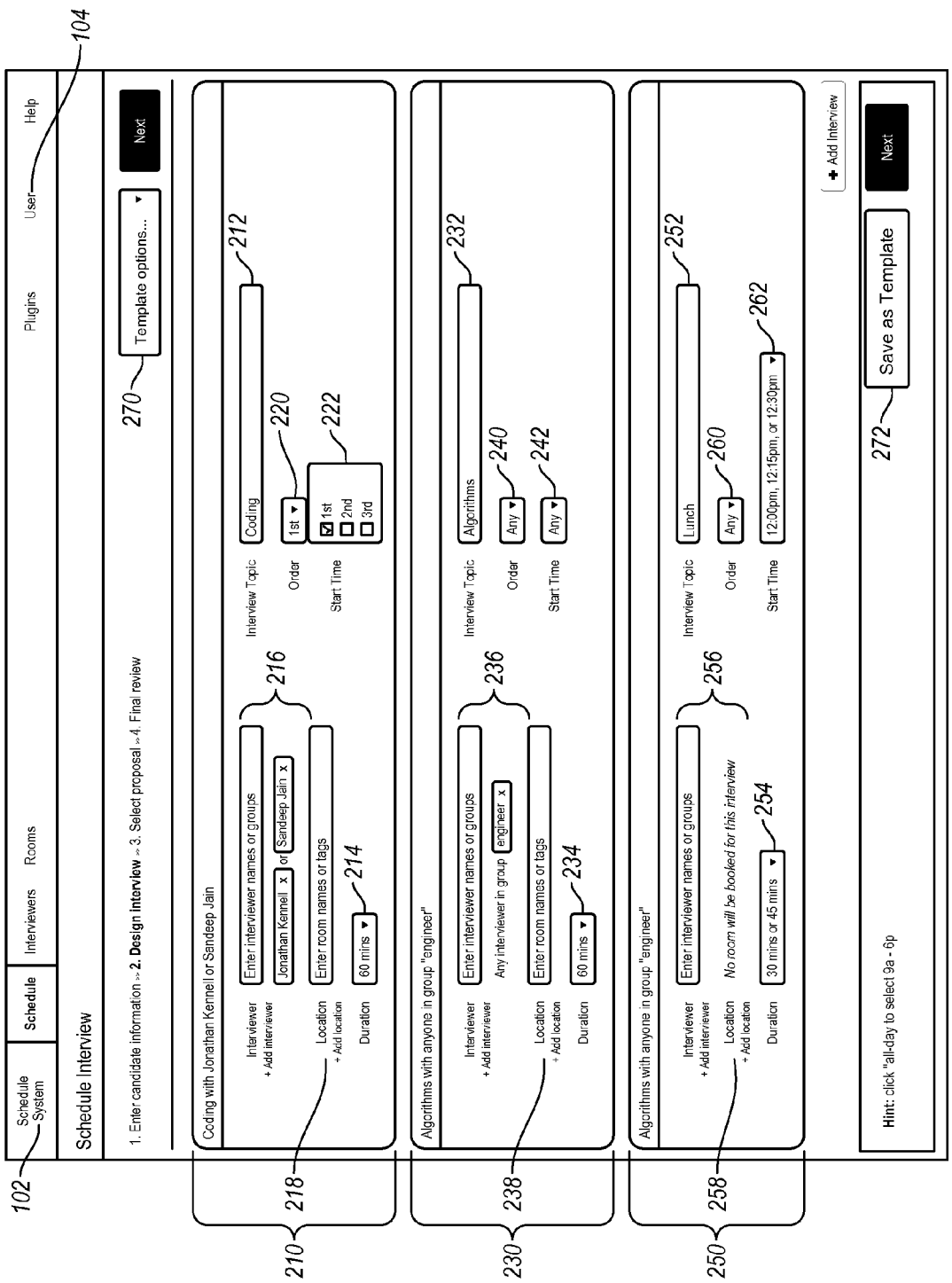

FIGS. 2B-2C illustrate examples of screens provided which allow the user to input information pertaining to the candidate, as well as interview parameters and constraints. The information can include candidate information such as candidate name and candidate availability and can include other candidate information. The information can also include interview information such as interview template, interview topic, interview resources (e.g. rooms, video or audio conferencing equipment, parking spots, etc.) and one or more interviewer or interview resource tags. In some embodiments, the information can also include parameter or constraint information, such as information requiring a particular interviewer, a precise time (e.g. start or stop time) for the interview, interview duration, or interview ordering (e.g. start first or last). The inputted information can be transmitted to the interview-scheduling tool 116 and stored in the database 118.

As shown in FIG. 2B, in one embodiment, the interview-scheduling tool 116 can provide for the user to input the candidate name and the candidate availability. The interview-scheduling tool 116 can provide for the user to enter the candidate availability by providing a calendar screen and allowing the user to select a period of time by clicking and dragging a particular time period on the calendar, for example a block of time or an entire day. For example, FIG. 2B shows one embodiment of selecting candidate availability on a calendar screen, which may be provided by the interview-scheduling tool 116. The interview-scheduling tool 116 can receive an input from the user to "use the selected times" and enter the input as the candidate availability for the purposes of scheduling a complex interview.

In one implementation, the interview-scheduling tool 116 can provide for the candidate to enter candidate availability. In one embodiment, the interview-scheduling tool 116 can receive candidate contact information (e.g. email address), and prompt them to enter their own availability. For example, the candidate can either select availability on a calendar screen, enter dates and times the candidate is available, and/or provide availability via a link to an external calendar application associated with the candidate.

As shown in FIG. 2C, in one embodiment, the interview-scheduling tool 116 can provide for the user to input interview information including parameters and constraints, via one or more screens via the user interface. The interview-scheduling tool 116 can receive the interview information including the parameters and constraints and transmit the parameters and constraints to the scheduling engine 120, which is configured to determine one or more optimized complex interview schedules, as further described below. In one embodiment, the interview information, including the parameters and constraints, can include one or more interview sessions 210, 230 and 250. Each of the interview sessions can include interview information including constraints and parameters, such as the interview topics 212, 232 and 252, the interview durations 214, 234, and 254, one or more interviewers 216, 236, and 256, one or more locations (e.g. rooms) 218, 238, 258, a specific order of interviews 220, 240, 260, and a specific start time 232, 242, and 262.

As shown in FIG. 2C, in one embodiment, the interview-scheduling tool 116 can provide for the user to select an interview template. For example, the interview-scheduling tool 116 may provide for the user to select one of the interview templates from the pull-down menu 270. As described above, the interview-scheduling tool 116 allows the user to save a defined interview as an interview template. In response to selecting a particular interview template, the interview-scheduling tool 116 can set the details in the interview-scheduling screen. For example, as shown in FIG. 2C, the interview template applied by the interview-scheduling tool 116 is shown in the interview sessions 210, 230 and 250. In at least one embodiment, the interview-scheduling tool 116 can provide for the information entered into the interview screen to be saved as a new template, such as by selecting option 272 "save as template." The interview information including the constraints and parameters associated with each interview session are shown below the title of the session. For example, the interview session 210 includes the interviewers 216 "Jonathan Kennell," or "Sandeep Jain, the duration 214 of "60 min" and the constraint of interview order 220 that the session 210 is included as the first session. Another constraint can include one or more interview session start times, such as the start times shown in 222, 242, and 262. In various embodiments, the start time complaint can require the interview session to start at the specified time. For example, the interview session 250 is specified to start at 12:00, 12:15 or 12:30.

In some embodiments, the interview-scheduling tool 116 allows selection of tags in place of specific interviewers or resources (e.g. locations or rooms). In some embodiments, the interview session 230 can receive as input tags such as, for example, "engineer" in place of specific interviewers in field 236. In some embodiments, the interview-scheduling tool 116 can determine the possible interviewers matching the selected tags and display them as part of that interview session.

Figure 2D:
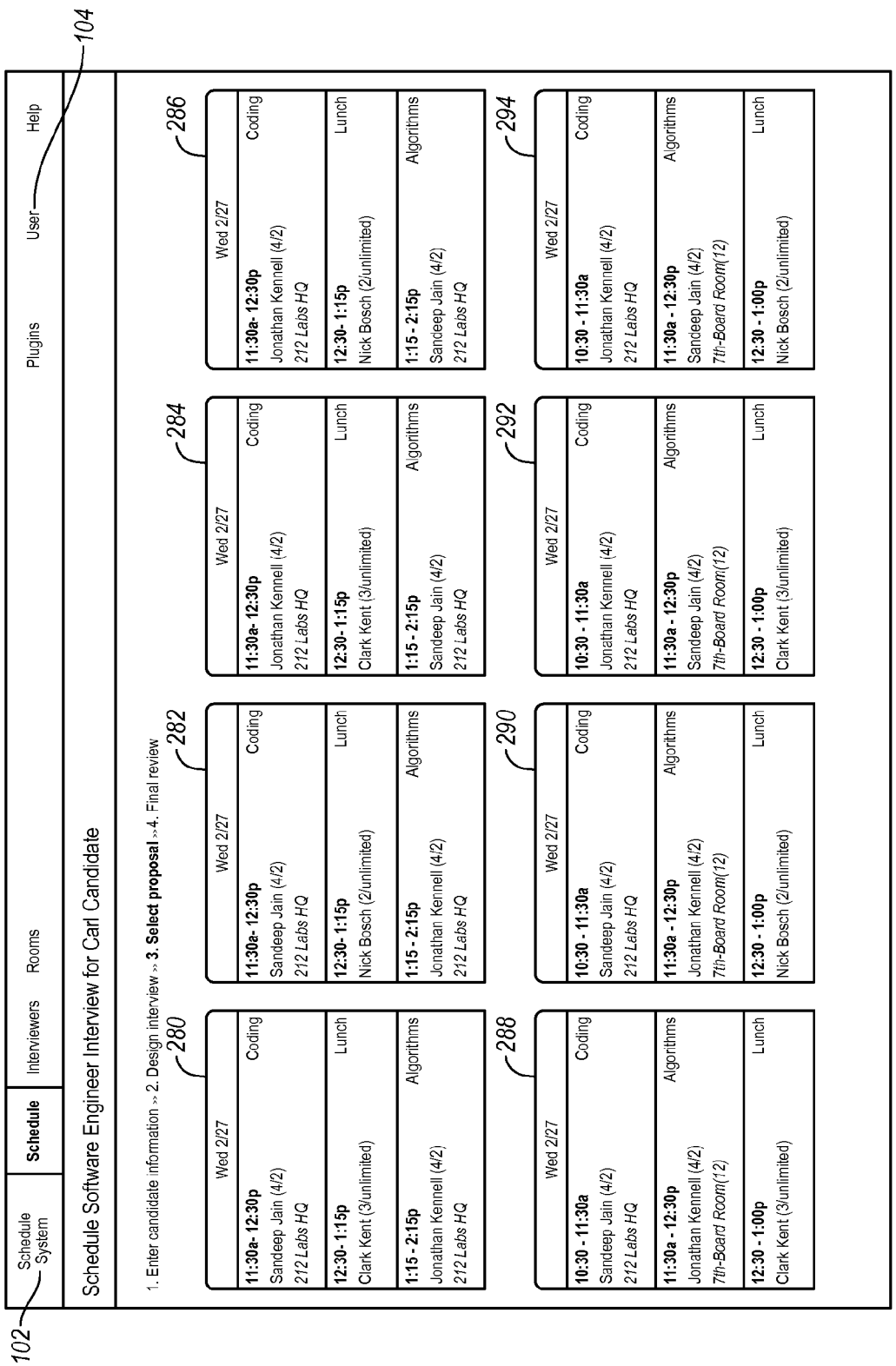

According to at least one embodiment, the interview-scheduling tool 116 generates one or more optimized interview schedules, including one or more interview sessions, based on the inputs provided by the user in the interview session input screens, for example such as those shown in FIGS. 2B and 2C. The optimized interview schedules are displayed to the user in the user interface. FIG. 2D shows one embodiment of a screen of proposed optimized interview schedules. The interview-scheduling tool 116 can provide any number of proposed optimized interview schedules matching the parameters and the constraints specified by the user. The optimized interview schedules, in one embodiment, are generated using the scheduling engine 120, according to the method described in FIG. 9.

FIG. 2D shows proposed interview schedules 280-294, meeting the parameters and constraints shown in FIGS. 2B and 2C. In the illustrated example, the proposed schedules 280-294 match the parameters and the constraints in varying degrees, from most fitting to least fitting. The proposed schedules 280-292 include schedules for the candidate availability date of Thursday 2/27 and meet the parameters and constraints specified in FIG. 2B. For example, schedules 280-294 include the first interview as the "Coding" interview as constrained by the user in the order field 220. In this schedule 280, Lunch (e.g. the interview session 250) is scheduled at 12:30 as constrained by the user in the interview start time field 262.

In addition, resource information (e.g. location) can be displayed as part of the proposed schedules 280-294. For example, location "212 Labs HQ" is shown for the proposed interview schedule 280. Further, the interviewer load can be displayed adjacent to the interview name and whether the interviewer has reached or exceeded the interview threshold for the week. For example, in FIG. 2D, the interviewer Sandeep Jain is shown to have reached the interview load of four for the week and exceeded the interview threshold of two, while the interviewer Clark Kent is shown to have reached the interview load of three out of the unlimited number of interviews set as the threshold for that interviewer.

Figure 2E:
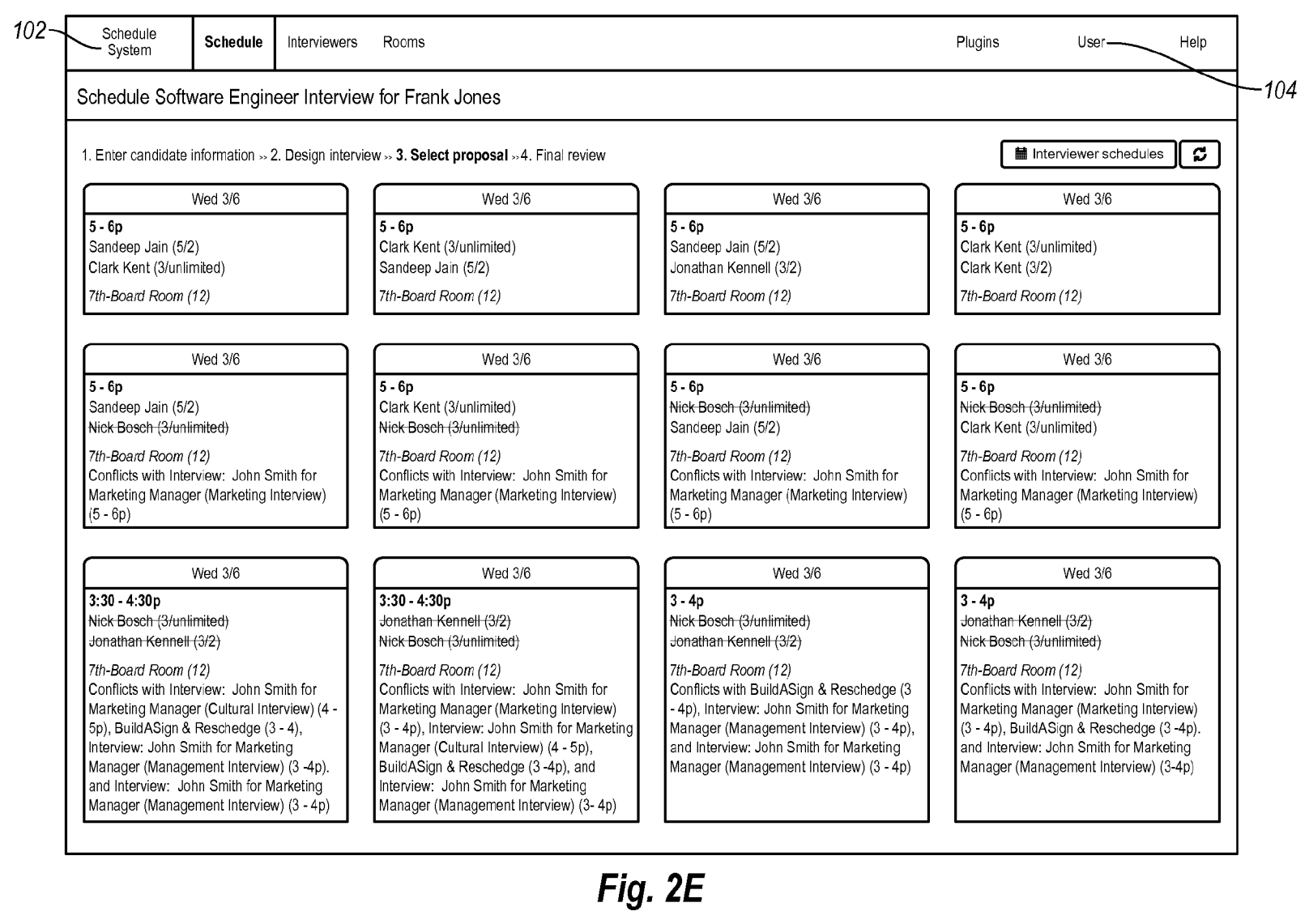

FIG. 2E illustrates another embodiment of proposed interview schedules that are determined by the scheduling engine and are ordered based on the degree of matching to the input information. In the illustrated example, various interviewer names are shown with strikethrough because the interviewers are double-booked. In this example, the first row of proposed schedules, determined by the interview-scheduling tool 116, is associated with a penalty of one, based on the determination that the number of interviews exceeds the interview threshold. As illustrated, the second row of proposed schedules, determined by the interview-scheduling tool 116, includes a penalty of two, based on the determination that the number of interviews exceeds the interview threshold and at least one interviewer is double-booked for the particular time period. The third row of proposed schedules includes the penalty of three, based on the determination that the number of interviews exceeds the interview threshold and at least two interviewers are double-booked for the particular time period.

In the various embodiments, the user can determine which of the proposed schedules is most appropriate and select one of the proposed interview schedules 280-294 to finalize the optimal interview schedule. In one implementation, the proposed interview schedules that are not selected by the user are removed from the interview-scheduling tool 116 once the user selects one of the proposed schedules and finalizes the interview schedule.

Figure 2F:
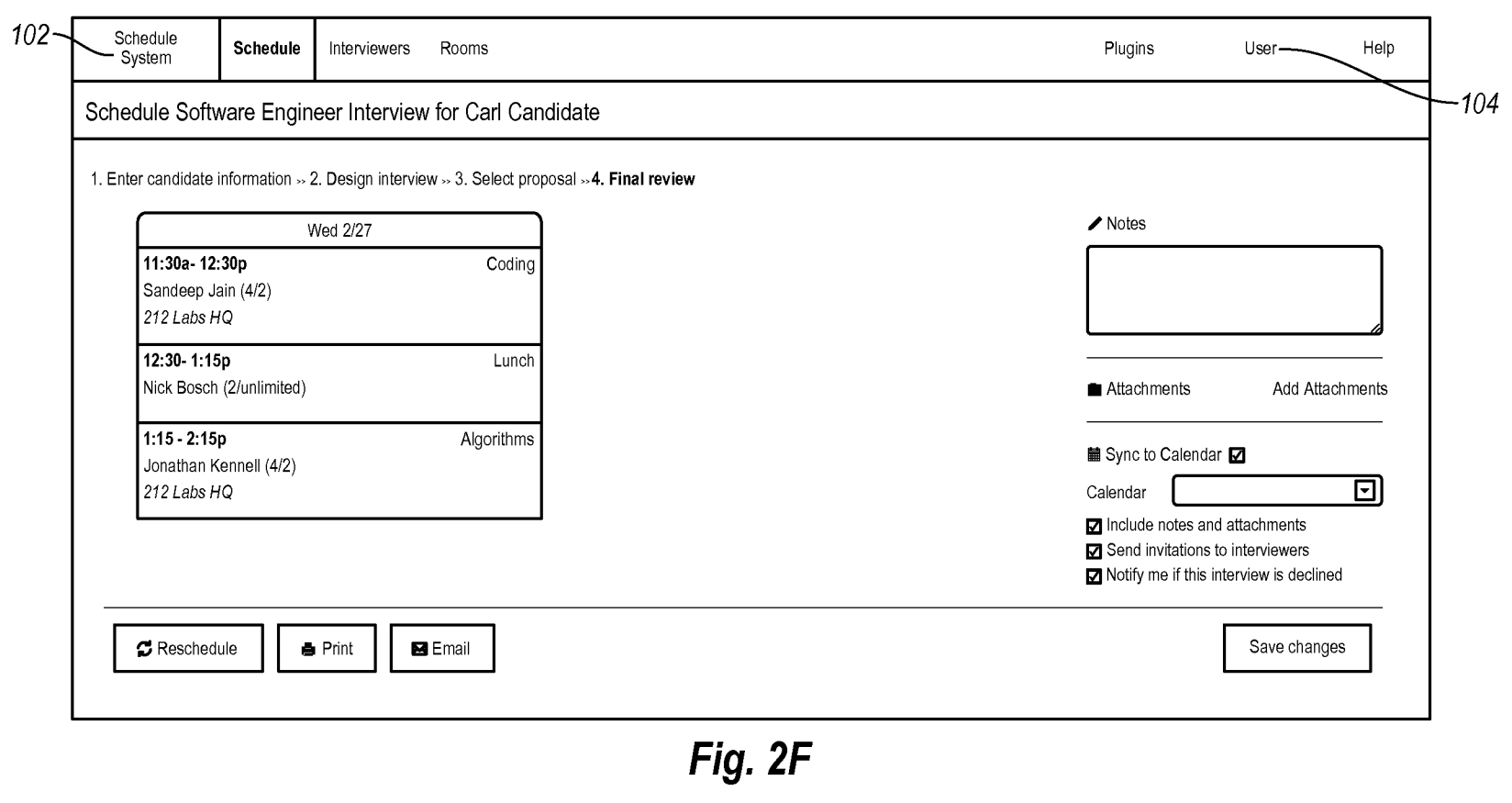

FIG. 2F shows one embodiment of a final review screen provided to the user displaying the final interview schedule. As shown, the interview-scheduling tool 116, via the final review screen, can provide for the user to add attachments to the schedule, such as for example, the candidate resume or cover letter. The interview-scheduling tool 116 can provide an option to the user to update the corresponding calendar information to include the proposed interview schedule. In some embodiments, the user can chose not to synchronize the calendar with the corresponding proposed interview schedule. In addition, the interview-scheduling tool 116 may provide for the finalized interview schedule to be transmitted to one or more of the interviewers included in the finalized interview schedule.

In another embodiment, if the proposed schedules are not well matched or the user desires to broaden the parameters and constraints, the user can select one of the proposed interview schedules and modify the parameters and/or the constraints. FIG. 2G shows one embodiment of a screen provided to the user to customize the proposed interview. The screen can provide for the user to generate alternative proposals based on incremental changes to the proposed schedule.

If a selection of generating alternate proposal is received by the interview-scheduling tool 116, the interview-scheduling tool 116 can transmit the constraints and parameters of the interview to the scheduling engine 120 which determines one of the alternate schedules that meets the parameters and constraints. In other embodiments, the interview-scheduling tool 116 may provide for the user to keep some of the proposed features of the proposed schedule and recalculate other features. FIG. 2G shows an example of a customizable screen that can receive selections by the user to general alternative proposal for one or more interview schedules. The user may enter any changes and save the changed interview schedule to the database 118. Once the changes are entered and the user accepts the proposed schedule, the interview-scheduling tool 116 may allow the user to email each of the interviewers with the proposed interview schedule.

The interview-scheduling tool 116 may provide for the user to edit and customize the proposed interview schedule including one or more interview session. For example, the interview-scheduling tool 116 may permit the user to change various aspects of the proposed interview scheduling, for example, by allowing the user to change the interview topic by typing in a different topic, change the duration by dragging a bottom of a block representing an end time of an interview session, select other options for any of the interview sessions, or change one or more of the proposed interviewers for any one or more of the interview sessions. For example, the user can change the interviewer field by adding another tag, removing one of the existing tags or by adding or removing a specific interviewer by name. For example, the changes can include changes to one or more constraints or parameters including one or more acceptable start or stop times for an interview, one or more specific interviewers, one or more specific interview locations, or for the interview session to be in a specific order in the schedule. In one implementation, the interview-scheduling tool 116 can receive subsequent changes or customizations to the interview schedule and the interview-scheduling tool 116 can input the changes or customizations to the scheduling engine 120 as a new input to calculate a new optimized interview schedule. Referring to FIG. 3A the interview-scheduling tool 116 can provide the finalized interview schedule using a calendar view. The calendar view allows the user to review both the details of each interview session as well as the entire schedule timeline for a particular day. The calendar view may display the interview sessions as expanding from the schedule timeline and the schedule timeline may be condensed into small time periods. In some embodiments, there may be gaps in the interview schedule. The gaps in the schedule may be collapsed or hidden in the schedule timeline, while the gaps may be displayed in the expanded interview session detail. In addition, in particular examples, each interview session in the schedule can be color-coded to separate and distinguish the individual interview sessions.

Referring to FIGS. 3A and 3B, the interview-scheduling tool 116 can maintain and update the scheduled interviews and the responses from the interviewers. In various embodiments, the individual interview sessions of the proposed schedule can be emailed to the respective interviewers as calendar invitations. The invited interviewers can accept the interview invitation, decline the interview invitation, tentatively accept the invitation, or the interviewer may fail to respond. In an embodiment, the interview-scheduling tool 116 can periodically retrieve the calendar information from the external calendar applications 112 and 114 to update interview response status. For example, the interview-scheduling tool 116 can update the interview response status every five minutes. The interview-scheduling tool 116 can update the finalized schedule with the invite status as shown in FIG. 3A.

In one embodiment, the interview-scheduling tool 116 can update the scheduled interview schedule and display the updated status using compound visual indicators based on the responses from the interviewers. Examples of compound visual indicators are shown in FIG. 3B, including calendar conflicts and invite status and the associated visual indicator. For example, if the interviewer has a calendar conflict and has accepted the interview invitation, the associated compound visual indicator includes showing the interview name as "normal" with a checkmark. Contrary, if the interviewer has declined the interview invitation and has no conflict, the associated compound visual indicator includes showing the interview name with strikethrough. The compound visual indicators can also include a caption displayed over the name that indicates the conflict and invite status. It is appreciated that other compound visual indicators can be used to indicate both conflict and invite status, for example, different colors used or different fonts for different status for example accepted, declined, tentative, and whether there is a conflict.

In at least one embodiment, the interview-scheduling tool 116 can determine an alternative optimized interview schedule in response to interview response status of the interviewer. In one instance, the interview-scheduling tool 116 can receive an interview response status as "declined," indicating that the particular interviewer cannot attend the interview. The interview-scheduling tool 116 can use this interview response status to determine an alternative interviewer that can be available to replace the declined interviewer. In one implementation, the interview-scheduling tool 116 may notify the user of the declined status and provide an option for the user to determine an alternative optimize schedule. In another implementation, the interview-scheduling tool 116 is configured to compile a new interview specification, which does not include the declined interviewer, and provide the new interview specification to the schedule engine to determine an alternative optimized schedule. The alternative optimized schedule can include one or more alternative interviewers who are available for that particular interview session.

Figure 3C:
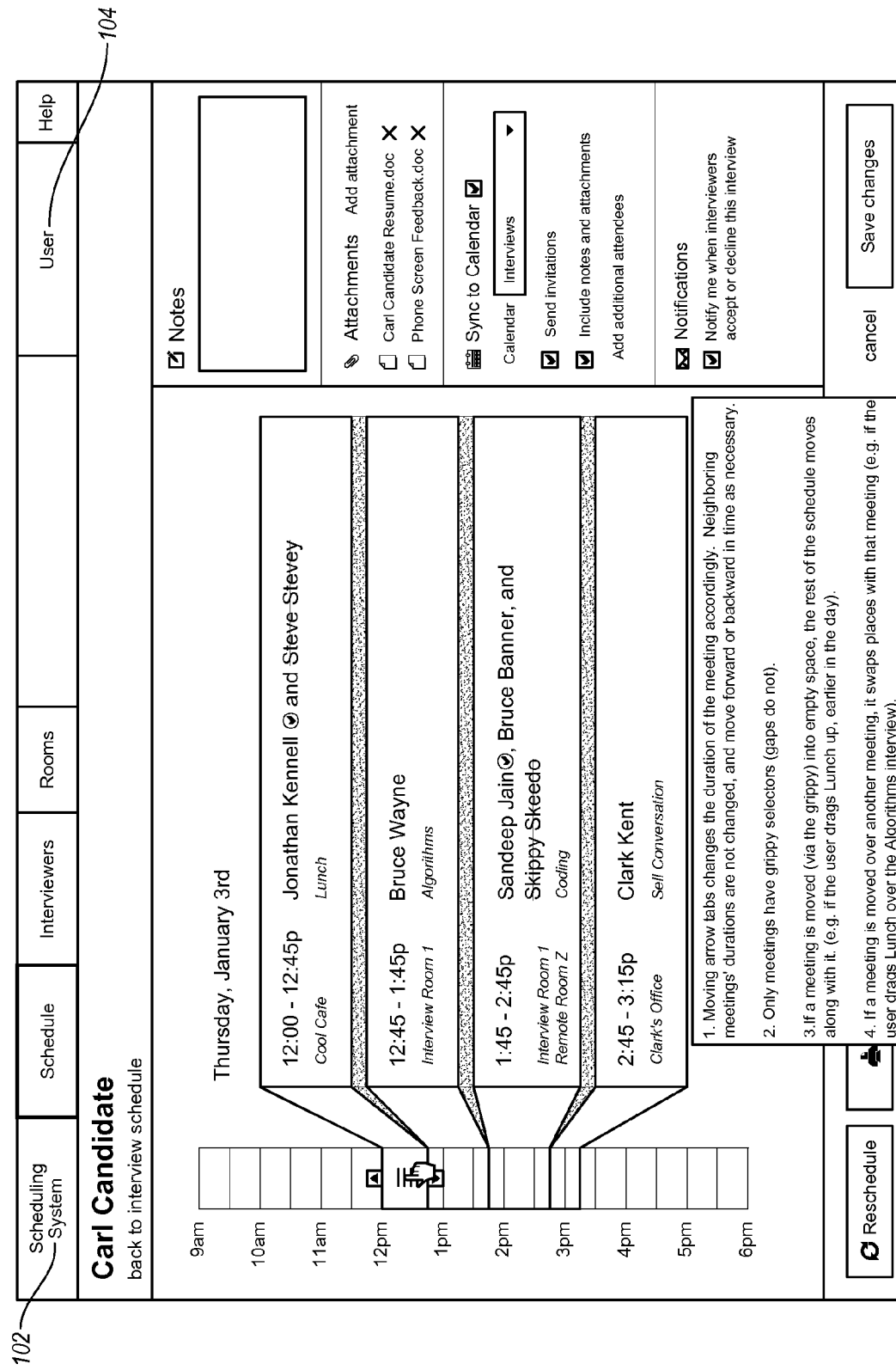
Figure 3D:
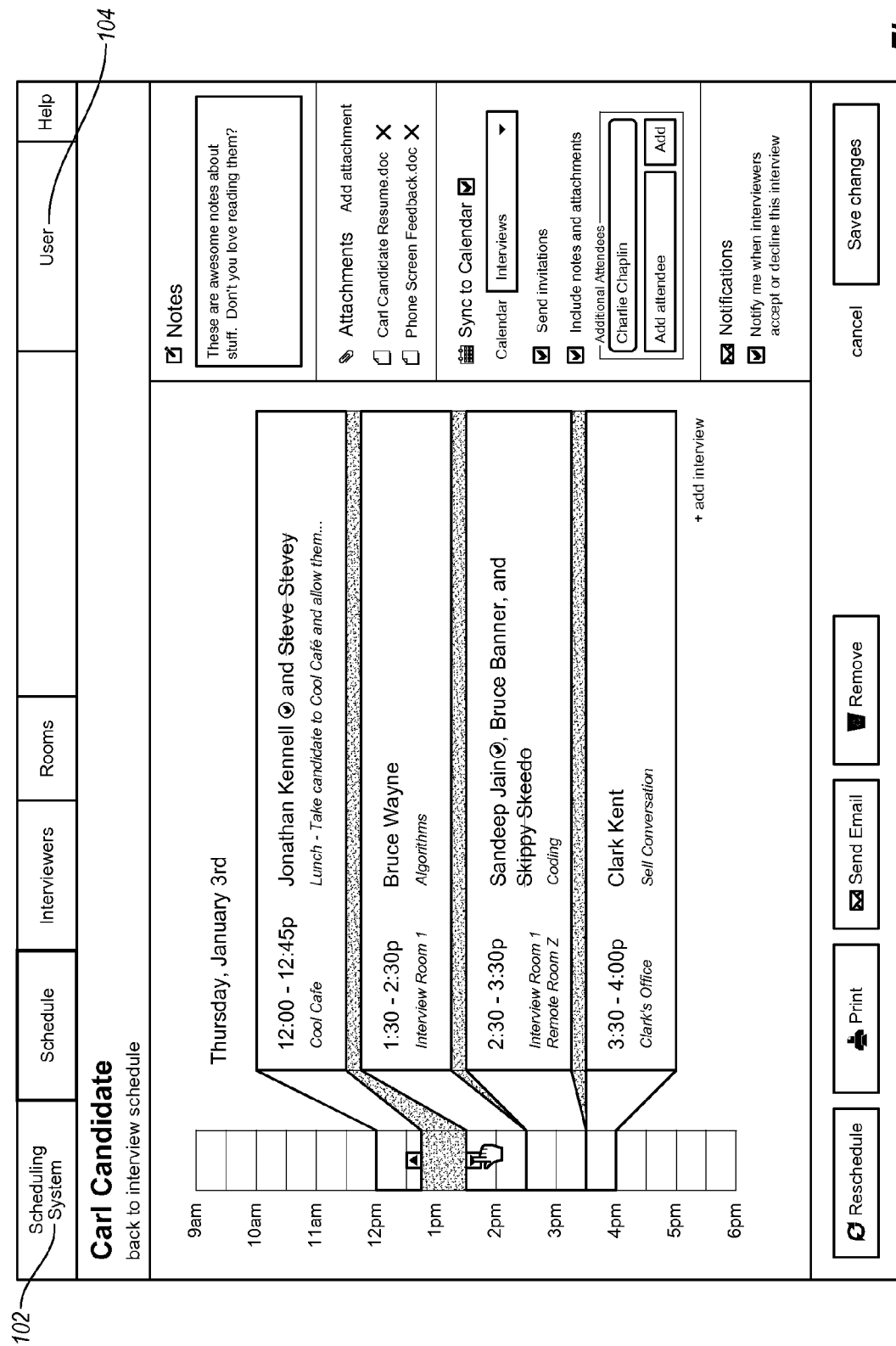

The interview-scheduling tool 116 can provide dynamic management and control of the individual interview sessions. FIGS. 3C-3D illustrate various examples of dynamic management and control. One embodiment of dynamic management and control can include the individual interview sessions, which may be "gripped" by the cursor and visually moved to another location in the schedule timeline. FIG. 3C illustrates one embodiment of dynamic gripping and moving which illustrates the interview session lunch being gripped by the demarcation on the interview timeline. Another embodiment of dynamic management and control can include changing the duration of the individual interview sessions or gaps in the interview schedule by dragging an edge of the session to increase or decrease the duration. FIG. 3D illustrates one embodiment of changing the duration of the gap between Lunch and Algorithms.

The remaining interview sessions can dynamically adjust accordingly, based on one or more dynamic rules. For example, if the duration of the meeting is changed, the neighboring meeting durations are not changed, but rather move forward or backward in time as necessary. In another embodiment, the interview-scheduling tool 116 may include a rule pertaining to moving the entire schedule, for example, if a meeting is moved into empty space, the rest of the schedule moves along with it, (e.g. user drags lunch up earlier in the day, the remaining meeting are moved with the lunch session). In another embodiment, the interview-scheduling tool 116 may include a rule pertaining to moving a meeting over other meetings, for example, if a meeting is moved over another, the moving meeting swaps places with the other meeting (e.g. if the user drags Lunch over the Algorithm interview). Other dynamic rules may be implemented to control the behavior of interview sessions in dynamic management and control of the interview schedule.

According some embodiments, the interview-scheduling tool 116 may provide for the user to view and manage interviewer profiles in an interviewer management screen. The interviewer profiles may be added, removed, and details pertaining to the interviewers may be added, removed or edited in the interviewer profile. FIG. 4 illustrates one embodiment of an interviewer management screen, which may display to the user the interviewer profiles stored by the interview-scheduling tool 116.

According to some embodiments, each interviewer profile may be associated with one or more parameters and constraints. As described in the examples above, the interview-scheduling tool 116 and the scheduling engine 120 can use the parameters and constraints to allow or prohibit the interviewer to be scheduled for a particular interview session. In one embodiment, the parameters and constraints can be used to determine a penalty score, as described above. In one implementation, the constraints pertaining to an interviewer can include the number of interviews per week, interview threshold or interview load. The "interviews per week" threshold limits the number of interviews for which the particular interviewer may be scheduled. If the interviewer has reached the interviews per week threshold, that interviewer may not be scheduled for another interview for that week. FIG. 4 displays the interviews per week thresholds associated with each interviewer. For example, Cersei Lannister has been scheduled for four interviews and has reached the maximum interviews per week constraint. In this example, the interview-scheduling tool 116 and the scheduling engine 120 cannot schedule Cersei Lannister for another interview this week. The user with the appropriate permissions may change the number of interviews per week for each interviewer based on interviewer desired preferences and work schedule.

In another implementation, the interviewers may be associated with parameters pertaining to groups or tags. The tags or groups may include a word or phrase token describing one or more attributes associated with the interviewer. For example, a tag can include "Java" designating the interviewer's knowledge of the Java programming language, or "New York" designating the interviewer's office location, or "closer" indicating the interviewer's skill at closing the complex interview. FIG. 4 shows some examples of groups, including "frontend," "senior," "warehouse," and "sysops." In various embodiments, any number of tags may be associated with any characteristic or attribute of the interviewer, including employee title, technical knowledge, geographic location, or particular skills or any other attributes. The user's tags may be assigned by users within the scheduling system 102 having permissions to add or edit tags. In one embodiment, user tags may be generated based on information received via one or more external sources. The external sources can include employee organization systems, such as for example PeopleSoft or distributed directory information services, such as for example, Lightweight Directory Access Protocol (LDAP) or Active Directory information. The information can include job titles, email addresses, phone numbers, places in the organizational hierarchy, or other information received from external sources.

The interview-scheduling tool 116 when scheduling interviewers for an interview session may allow the user to enter a tag or a group rather than an individual interviewer for a particular interview session. The interview-scheduling tool 116 can receive the tag or group input and then analyze each of calendars of the individual interviewers having the inputted tag to determine the optimized interviewer for the particular interview session. Other interviewers having the same tag or within the same group can be scheduled as alternative interviewers for that interview session. For example, the user may select the "senior" tag, rather than a particular interviewer for an interview session. The interview-scheduling tool 116 can determine that both Arya Stark and Daenarys Targaryen are interviewers having the senior tag. However, Arya Stark has reached the maximum number of interviews per week while Daenarys Targaryen is available and has not reached the maximum. The interview-scheduling tool 116 can display Daenarys Targaryen in the first optimized schedule and Arya Stark in an alternative schedule and may indicate the maximum number of interviews has been reached.

Other parameters and constraints can be provided for an interviewer profile, including available hours and available days that an interviewer can be scheduled for interviews. For example, one interviewer can be limited to interviewing only during particular hours of the day or during particular days. The interview-scheduling tool 116 can analyze each of the individual interviewers having the day and hourly constraints and determine whether that interviewer can be scheduled for the particular interview session. In addition, the interviewer management screen can provide for the user to batch edit multiple interviewers together, for example by adding the same tag to multiple interviewers.

A user in an interviewer management screen can enter the information pertaining to the interviewer's profile. Alternatively, or in addition to, the interviewer's profile information can be entered by the interviewer. In one embodiment, in response to adding a new interviewer to the interviewer management screen, the interview-scheduling tool can generate and transmit a welcome email to the new interviewer. The new interviewer can then enter the details for the profile and enter the appropriate parameters and constraints.

In addition to managing interviewer profiles, the user can manage resources associated with interview schedules. In various embodiments, the interview-scheduling tool can provide for the user to manage rooms or interview spaces available for interviews. FIG. 5 illustrates one embodiment of a resource management screen. The resource management screen includes a listing of rooms including information pertaining to those rooms. Similar to the interviewer management screen described above in FIG. 4, the resource management screen includes parameters and constraints for each of the rooms. The room listing includes room ID, room name, use-by-default constraint, occupancy constraint, interview load, tag or group input.

In one embodiment, the "use by default" constraint allows the interview-scheduling tool to set that particular room to be the default room for every interview scheduled. As shown in FIG. 5, the interview-scheduling tool 116 can provide for the user to select more than one "use by default" room. According to one example, the interview-scheduling tool 116, in conjunction with the scheduling engine 120, can use the parameters and constraints associated with the interview rooms, as well as the calendar information associated with the interview rooms, in determining one or more optimized schedules. For example, if one default room is occupied, the interview-scheduling tool and engine can provide the second default room for use in the interview schedule. In addition, the parameters and constraints associated with the interview rooms, as well as the calendar information for the rooms can be used to determine the penalty score as discussed above.

In some embodiments, the max occupancy constraint allows the interview-scheduling tool to determine whether the room can be used for a particular interview. For example, if a group interview is scheduled with multiple interviewers, the interview-scheduling tool 116 and scheduling engine 120 can determine which of the rooms can accommodate the group of interviewers and the candidate comfortably. In one embodiment, if the number of interviewers, together with the candidate, meets or exceeds the maximum occupancy, the interview-scheduling tool can provide another room in the one or more optimized schedules.

In one implementation, the interview-scheduling tool, via the room management screen, can provide for the user to manage tags associated with the rooms. By inputting one or more tags to be associated with the room, the user can seamlessly schedule a room without determining whether the room fits the needs of the user. For example, by entering the tag "New York" the interview-scheduling tool and engine can include only rooms located in the New York office in the optimized schedules.

Similar to the "interviews per week" constraint described with reference to FIG. 4, the rooms may include the tags associated that limit the number of interviews that can be held in the rooms. In one embodiment, this allows the rooms to be used for other purposes and does not tie up the rooms solely for interviewing purposes.

In addition to the management of parameters and constraints, the room management screen can provide for the user to add interview rooms. The room management screen can provide a series of screens to the user, through which the user can enter the details pertaining to the room, including the parameters and constraints described above. In addition, the room management screen can provide for the user to batch edit multiple rooms together, for example by adding the same tag to multiple rooms. In one embodiment, the rooms can be imported from external calendar applications 112 and 114.

Other resources can be similarly scheduled by the interview-scheduling tool, such as for example, projectors, teleconference equipment, audio and video equipment, parking spaces, as well as other resources.

Figure 6:
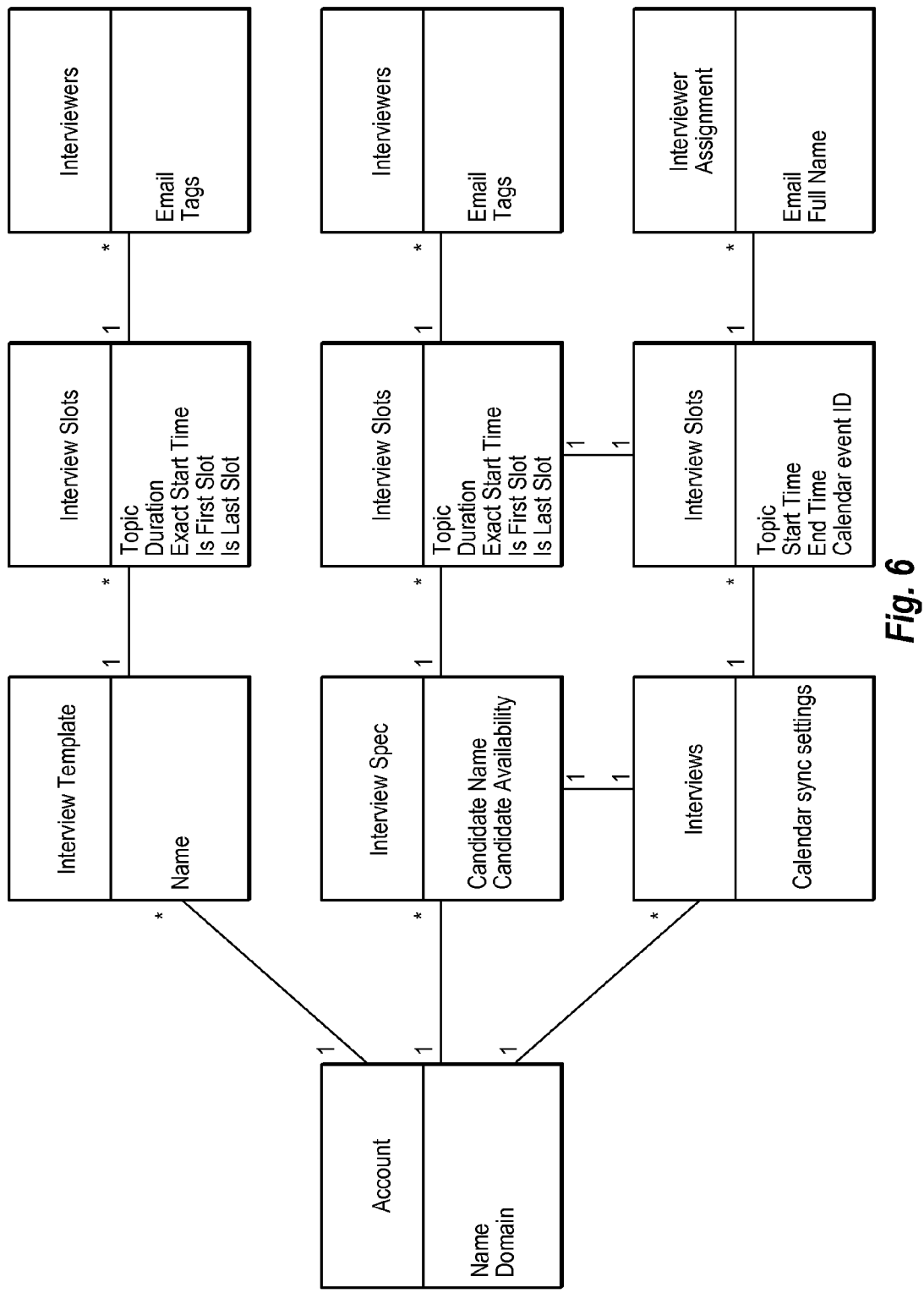
FIG. 6 is a schematic diagram of data structures used by the scheduling system according to one example.

According to various embodiments, the interview-scheduling tool 116 stores various data structures that allow quick duplication of templates and specifications defined for interviews and interviewers, including interview templates, interview specifications, and interview sessions. FIG. 6 illustrates one embodiment of interview data structures including interview template, interview specification and finalized interview and their interconnections. The data structures can be created from previously added interviews and interviewers and stored as interview templates on the interview-scheduling tool. For example, a template for a mobile software engineer position can be created so that multiple interviews can be created for the multiple candidates interviewing for this position from the template. The mobile software engineer template can include predetermined multiple interview sessions, predetermined interviewers may be associated with each session and predetermined parameters and constraints may also be associated with each session in the template. The interview templates may allow a user the ability to quickly recreate or reuse previously created interview schedule frameworks as starting points in scheduling subsequent interviews. The interview template can include an interview template name, such as for example "mobile software engineer."

The interview template can further include one or more interview sessions associated with the particular interview template. Each of the interview sessions can include information associated with the interview session, including an interview topic, an interview duration, a start and an end time, and interview ordering information such as whether the interview session is the first, second, or third interview session. In addition, the interview template can also include interviewers and interview locations associated with the individual interview sessions. The interviewers in the template can include interviewer names, or interviewer tags or groups, as described above. In the example of the mobile software engineer template, the interview sessions can include three interview sessions having topics of "coding," "lunch" and "closing," with each interview slot including duration of an hour with specific interviewers.

In other embodiments, the interview data structures include interview specifications or specs, which describe the structure of an individual complex interview with a candidate. The interview specification can be populated from the interview template and includes information pertaining to the candidate to be interviewed. The interview specification may be associated with an account, including the name and domain information associated with the account; the account being associated with external calendaring applications 112 and 114 provided via the external server. The interview specification can include candidate name and candidate availability. The candidate availability can include one or more windows of availability, including dates, start times, and end times of available times for an interview. Similar to the interview template, the interview specification can include one or more interview sessions associated with the particular interview template, and information pertaining to each of the sessions including an interview topic, interview duration, a start and an end time, and interview ordering. The template can further include interviewer and resource information, such as names, tags, and email addresses.

In additional embodiments, the interview structures can include an interview itinerary, which describe when and where a candidate should meet the interviewers, and information on how to synchronize the interview itinerary information to an external calendaring system. The interview itinerary may be associated with an account, including the name and domain information associated with the account; the account being associated with external calendaring applications 112 and 114. The interview itinerary further includes interview data including calendar synchronization settings. Similar to the interview template and interview specification described above, the interview itinerary can include one or more interview sessions associated with the particular interview itinerary, and information pertaining to each of the sessions including an interview topic, interview duration, a start and an end time, and a calendar event ID. The interview itinerary further includes interviewer assignments, interviewer information such as full names and email addresses, interview location assignment, interview location information such as names of the locations, room numbers, or the like.

In reference to FIG. 6, the interview specification, in some embodiments, is created by making a copy of the interview template. However, in this embodiment, there is no permanent reference between the interview specification and the interview template. In one embodiment, the interview optimization method, such as the method described in method 800, can be applied to the interview specification resulting in the interview itinerary. The interview itinerary can maintain an association with the interview spec interview, which describes the data structure of the interview. This linkage between the interview specification and the interview itinerary allows the scheduling system to re-compute new itineraries if necessary. In addition, as shown in FIG. 6, each of the interview sessions in the interview itinerary maintains a reference to the interview slot of the interview specification from which they were created. This linkage between the interview sessions allows the scheduling system to suggest alternative interviewers if one of the interviewers need to be replaced (e.g. a recruiter needs to replace an interviewer due to a last minute conflict).

Referring again to FIG. 1A, according to at least one embodiment, the scheduling engine 120 may receive the calendar information, the parameters and the constraints for an interview session, the parameters and constraints associated with interviewers, parameters and constraints associated with resources (e.g. rooms), as well as other interview related information, from the interview-scheduling tool 116 and determine one or more optimized interview sessions using method 800 described below. In one embodiment, the scheduling engine is located remotely from the scheduling system. In another embodiment, the scheduling engine is part of the scheduling system. The scheduling engine 120, in one embodiment, is a general-purpose constraint solver. One embodiment of scheduling engine 120 is an open source CSP solver provided by Minion, available from http://minion-.sourceforge.net.

As discussed above with regard to FIG. 1A, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 7:
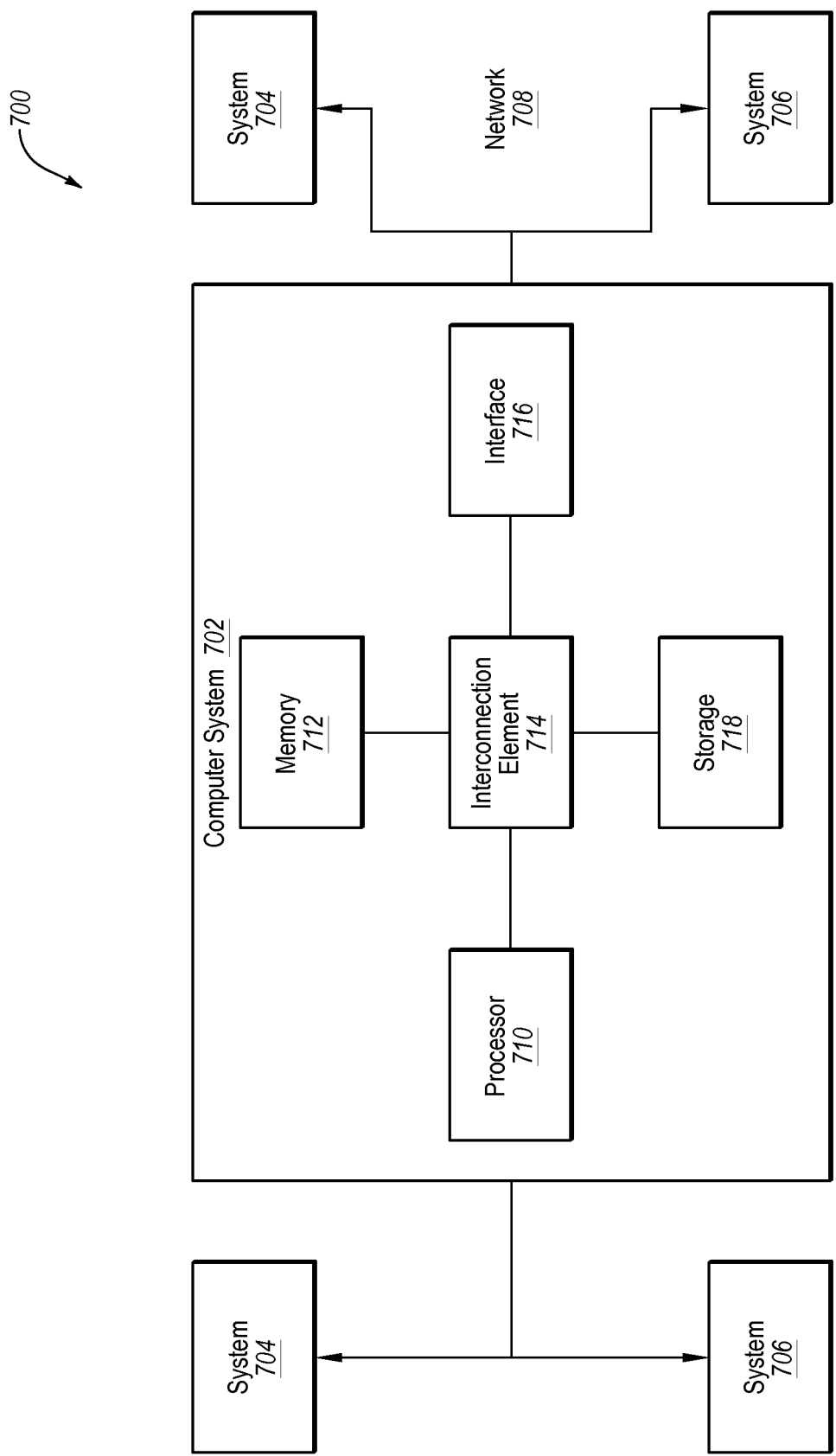
FIG. 7 is a schematic diagram of one example of a computer system that may perform processes and functions disclosed herein.

Referring to FIG. 7, there is illustrated a block diagram of a distributed computer system 700, in which various aspects and functions are practiced. As shown, the distributed computer system 700 includes one more computer systems that exchange information. More specifically, the distributed computer system 700 includes computer systems 702, 704 and 706. As shown, the computer systems 702, 704 and 706 are interconnected by, and may exchange data through, a communication network 708. The network 708 may include any communication network through which computer systems may exchange data. To exchange data using the network 708, the computer systems 702, 704 and 706 and the network 708 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 702, 704 and 706 may transmit data via the network 708 using a variety of security measures including, for example, TLS, SSL or VPN. While the distributed computer system 700 illustrates three networked computer systems, the distributed computer system 700 is not so limited and may include any number of computer systems and computing devices, networked using any medium and communication protocol.

As illustrated in FIG. 7, the computer system 702 includes a processor 710, a memory 712, an interconnection element 714, an interface 716 and data storage element 718. To implement at least some of the aspects, functions and processes disclosed herein, the processor 710 performs a series of instructions that result in manipulated data. The processor 710 may be any type of processor, multiprocessor or controller. Some exemplary processors include commercially available processors such as an Intel Xeon, Itanium, Core, Celeron, or Pentium processor, an AMD Opteron processor, an Apple A4 or A5 processor, a Sun UltraSPARC or IBM Power5+ processor and an IBM mainframe chip. The processor 710 is connected to other system components, including one or more memory devices 712, by the interconnection element 714.

The memory 712 stores programs and data during operation of the computer system 702. Thus, the memory 712 may be a relatively high performance, volatile, random access memory such as a dynamic random access memory ("DRAM") or static memory ("SRAM"). However, the memory 712 may include any device for storing data, such as a disk drive or other nonvolatile storage device. Various examples may organize the memory 712 into particularized and, in some cases, unique structures to perform the functions disclosed herein. These data structures may be sized and organized to store values for particular data and types of data.

Components of the computer system 702 are coupled by an interconnection element such as the interconnection element 714. The interconnection element 714 may include one or more physical busses, for example, busses between components that are integrated within a same machine, but may include any communication coupling between system elements including specialized or standard computing bus technologies such as IDE, SCSI, PCI and InfiniB and. The interconnection element 714 enables communications, such as data and instructions, to be exchanged between system components of the computer system 702.

The computer system 702 also includes one or more interface devices 716 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 702 to exchange information and to communicate with external entities, such as users and other systems.

The data storage element 718 includes a computer readable and writeable nonvolatile, or non-transitory, data storage medium in which instructions are stored that define a program or other object that is executed by the processor 710. The data storage element 718 also may include information that is recorded, on or in, the medium, and that is processed by the processor 710 during execution of the program. More specifically, the information may be stored in one or more data structures specifically configured to conserve storage space or increase data exchange performance. The instructions may be persistently stored as encoded signals, and the instructions may cause the processor 710 to perform any of the functions described herein. The medium may, for example, be optical disk, magnetic disk or flash memory, among others. In operation, the processor 710 or some other controller causes data to be read from the nonvolatile recording medium into another memory, such as the memory 712 that allows for faster access to the information by the processor 710 than does the storage medium included in the data storage element 718. The memory may be located in the data storage element 718 or in the memory 712, however, the processor 710 manipulates the data within the memory, and then copies the data to the storage medium associated with the data storage element 718 after processing is completed. A variety of components may manage data movement between the storage medium and other memory elements and examples are not limited to particular data management components. Further, examples are not limited to a particular memory system or data storage system.

Although the computer system 702 is shown by way of example as one type of computer system upon which various aspects and functions may be practiced, aspects and functions are not limited to being implemented on the computer system 702 as shown in FIG. 7. Various aspects and functions may be practiced on one or more computers having a different architectures or components than that shown in FIG. 7. For instance, the computer system 702 may include specially programmed, special-purpose hardware, such as an application-specific integrated circuit ("ASIC") tailored to perform a particular operation disclosed herein. While another embodiment may perform the same function using a grid of several general-purpose computing devices running MAC OS System X with Motorola PowerPC processors and several specialized computing devices running proprietary hardware and operating systems.

The computer system 702 may be a computer system including an operating system that manages at least a portion of the hardware elements included in the computer system 702. In some examples, a processor or controller, such as the processor 710, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 710 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, which are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Figure 8:
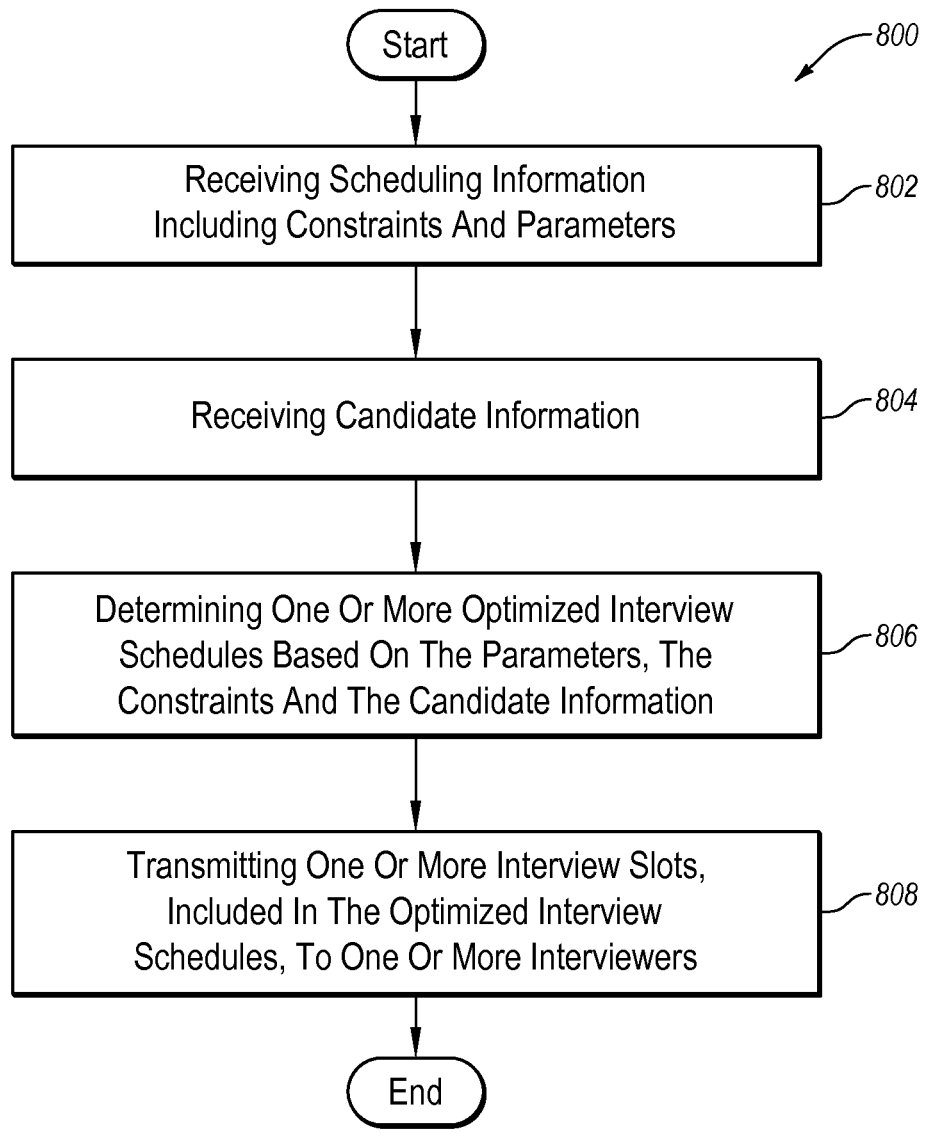
FIG. 8 is a flow diagram of a method of determining an optimized interview schedule, according to one example.

In some embodiments processes are performed that determine optimized schedules, such as the scheduling system 102 described above with reference to FIG. 1A. An example of one of these optimized schedule processes is illustrated by FIG. 8. According to this embodiment, the optimized schedule process 800 includes acts of receiving scheduling information including constraint and parameter information for scheduling the interview with the candidate, receiving candidate information including candidate availability and determining one or more optimized interview schedules matching the constraint information, the parameter information and the candidate availability.

In act 802, the scheduling system, such as the scheduling system 102 discussed with reference to FIG. 1A, receives scheduling information including constraint and parameter information for scheduling an interview with a candidate. In some embodiments, the constraint and parameter information can include variables, domains, constraints, parameters, or any other values, which may be used to determine one or more optimized schedules. As discussed above, the constraint and parameter information can include information pertaining to interview sessions including interview slot topic, interview start time and interview end time or interview duration. In addition, the constraint and parameter information can also include interview ordering (e.g. whether the interview is first, second, third, etc.). The constraint and parameter information can be received from one of the devices entered via the user interface by a user, for example by providing to the user a new interview schedule form. In one embodiment, the constraint and parameter information can be retrieved from an interview template, as described above.

In addition to interview parameter and constraint information, the scheduling system can receive parameter and constraint information pertaining to one or more interviewers, as described above. The parameter and constraint information can include interviewer calendar availability determined from one of external calendar applications associated with the interviewer, including time slots the interviewer is available or is unavailable. For example, the interviewer calendar information can be received from external calendar applications. The interviewer calendar information can be stored in a calendar cache and periodically synchronized with information stored in the external calendar applications. The interviewer parameter and constraint information can further include the number of interviews per week constraints for each interviewer and group or tag information for each interviewer. In addition, in some embodiments, the parameter and constraint information can include limitations on times the interviewer is available, for example from 8 am to 6 pm Monday through Thursday.

According to one embodiment, the scheduling system can receive parameter and constraint information pertaining to one or more resources, such as interview rooms, projectors, teleconference equipment, audio and video equipment, parking spaces, as described above. The resource information can include room name, calendar information associated with the resource (e.g. room meeting schedules and availability), whether the interview room is set as a default room, the maximum room occupancy, and one or more tags associated with the room.

In act 804, the scheduling system can receive candidate information including candidate availability. As discussed above, the candidate availability can be received from one of the devices entered via the user interface by a user. The candidate availability can be entered as date and time information, for example, spanning one or more days and multiple periods or blocks of time in one day. For example, the user can enter candidate availability as Tuesday from 9 am to 5 pm and Wednesday from 9 am to 11 am and 2 pm to 5 pm. In some embodiments, the candidate information including candidate availability may be received prior to, or concurrently as the parameter and constraint information is received in step 802.

In addition, the scheduling system can receive and store external calendar information associated with one or more interviewers, for example from external calendar applications, such as the external calendar applications 112 and 114. In one embodiment, the stored external calendar information can be periodically synchronized with the external calendar information associated with the external calendar applications. In some embodiments, the calendar information may be received prior to, or concurrently as the parameter and constraint information is received in step 802.

In act 806, the scheduling system determines one or more optimized interview schedules matching the constraint information, the parameter information and the candidate availability. The one or more optimized interview schedules can include one or more interview sessions with one or more interviewers associated with each of the interview sessions. In addition, the optimized interview schedules can include resources associated with the interview schedules. In one embodiment, no resources may be scheduled if the resource input was not received in step 802. The optimized interview schedules can be determined, for example, using the method 900 described below. The one or more optimized interview schedules or proposed schedules can be displayed to the user via the user interface and the user can select one of the proposed schedules. The selected optimized schedule can be transmitted to the scheduling system.

In at least one embodiment, the scheduling system can provide for the user to customize one of the proposed schedules by modifying one or more constraints or parameters of the proposed schedule. For example, the user can change the start, end or duration of one of the interview sessions, change, add or remove one or more interviewers scheduled for an interview session, add or remove interview sessions, add or remove resources, or change other constraints or parameters. In some embodiments, the scheduling system can provide for the user to change one of the constraints or parameters, while leaving the remaining constraints and parameters the same. In this embodiment, the scheduling system can provide an alternative optimized schedule based on the changed constraints or parameters.

In act 808, the scheduling system can transmit to one or more interviewers, information pertaining to one or more interview sessions associated with the interviewer. In one instance, the scheduling system may determine an optimized interview schedule having three interview sessions or slots, including a first interview slot associated with a first interviewer, a second interview session associated with a second and a third interviewer and a third interview slot associated with a fourth interviewer. In this embodiment, the scheduling system transmits to the first, second, third and fourth interviewer information pertaining to the related interview session. In one embodiment, the information pertaining to the interview session includes a calendar invite associated with the at least one interview slot transmitted to the at least one interviewer.

The scheduling system can receive a response to the calendar invite including whether the interviewer accepted the interview session, rejected the interview session or tentatively accepted the interview session. In response to receiving the response, the scheduling system can determine a finalized interview schedule. The finalized interview schedule can include a proposed interview session having alternative interviewers in response to the primary interviewers rejecting the interview session. Similar to the primary interviewers, the secondary interviewers are determined during the act of 806.

In some embodiments, the optimized schedule and the associated information pertaining to the optimized schedule can be stored as a data structure and can be retrieved at a later time. The data structures can include one or more interview itineraries, associated with the at least one optimized interview schedule, one or more interview templates associated with the constraint information and the parameter information, and one or more interview specs associated with the candidate information, as well as with any other data structures.

Figure 9:
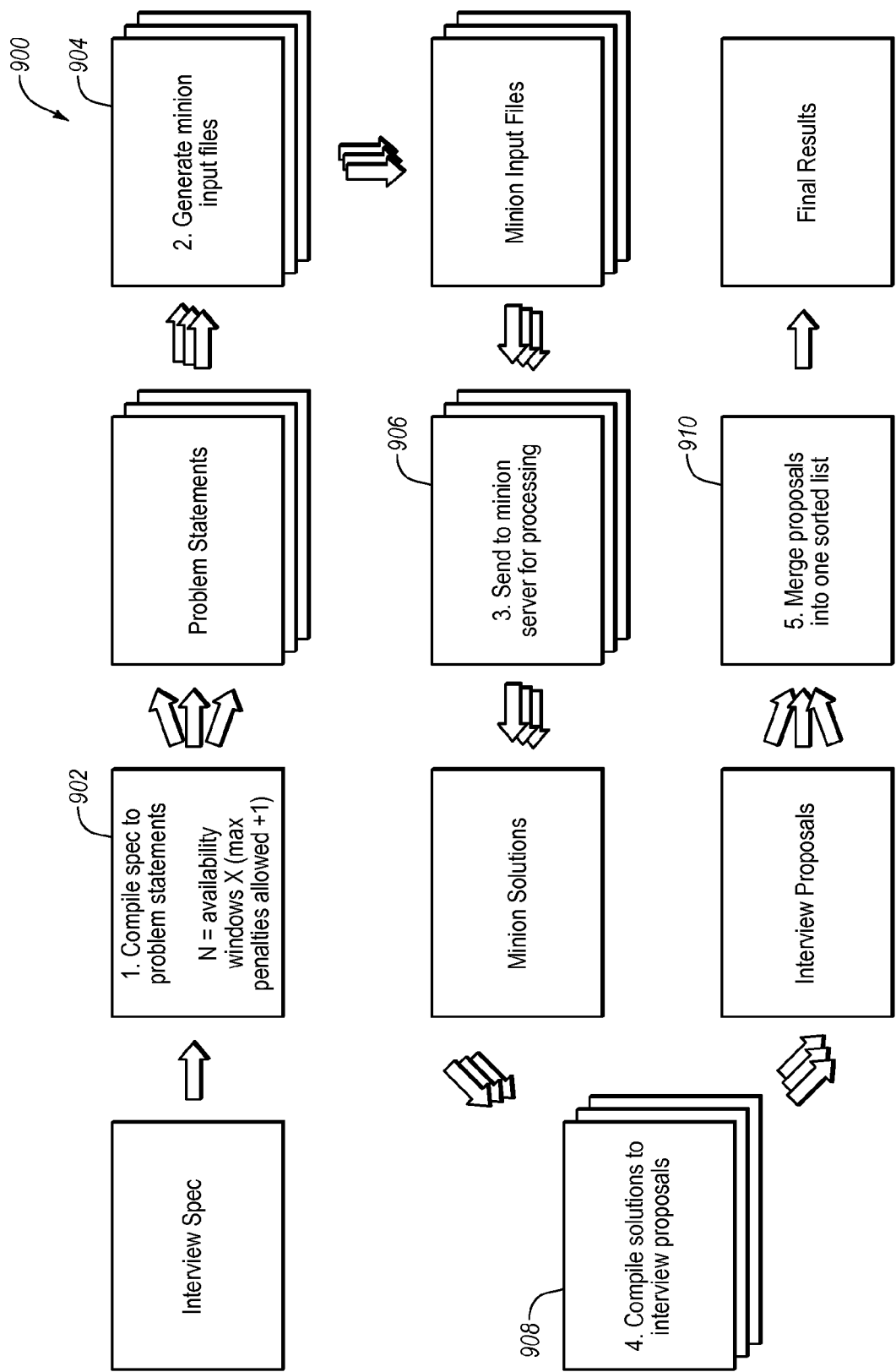
FIG. 9 is a flow diagram of a method of performing optimization, according to one example.

FIG. 9 illustrates one embodiment of the optimization method of determining one or more optimized interview schedules. The overall intention of the optimization method is to divide the input specification into a number of sub-problems that can be solved individually and produce the finalized interview schedule results. The scheduling system receives the interview specification including constraints and parameters as described above. In at least some embodiments, the parameters and constraints, as well as the candidate availability, and the external calendar information can be combined into an interview specification.

In act 902, the scheduling system can compile the interview specification to problem statements. Defining the complicated interview specification into individual problem statements for CSP solver jobs, as described herein, the scheduling engine can quickly solve the multi-constraint, multi variable problem reflected in the interview specification. In some embodiments, the interview specification can include multiple availability windows for the candidate. In addition, the interview specification can include any number of potential interviewers. For example, the potential interviewers can include all the employees of a company or any subset of the employees of the company. In some embodiments, each of the one or more output problem statements, determined by the scheduling system, can include a single availability interval for each interviewer. In some embodiments, based on the external calendar information, interviewers with no availability are excluded. The scheduling system can then reduce the total pool of potential interviewers to a smaller subset of interviewers. The produced problem statements include a subset of problem statements that are small enough to be solved relatively quickly. It should be noted that there may be a single availability interval for the candidate being considered, but there may not be a limited on the availability of each interviewer under consideration. For example, when scheduling a candidate, there may be five interviews for consideration and each of them can only be available once.

In act 904, the scheduling system compiles input files to be provided to the scheduling engine for processing. In one embodiment, the input files include constant values, variable arrays and constraints. The constant values can include an availability input, an interviews input, an interviewers input, and a penalty input. In one embodiment, the availability input can include availability_min and availability_max, which can define the beginning and ending of the candidate availability window. Each candidate availability window can include a block of time associated with candidate availability. This availability can be measured in minutes-since-unix-epoch. The availability input can be used as a constant.

In one embodiment, the interview input can include the N interviews needed to find the start and end times for an interview session, the duration of the interview and the interview session ordering. In at least one embodiment, if the start and end times input, or interview ordering input for an interview session was not provided, a value of zero can be associated with the interview input. The interviewers can define the M interviewers eligible to be assigned to interviews. In some embodiments, the penalty input can define the degree of a match of the proposed schedule to the requested parameters. In one embodiment, the penalty input can be used to find the interview schedules that include double-booked interviewers or interviewers overloaded past the maximum amount of interviews per week. For example, an input penalty of zero can be used to find the "perfect" schedule matching the input parameters 100%, while an input penalty of one can be used to find schedules with one double-booked interview. In one implementation the constant values of the interviewers input, the interviews input and the penalty input can be variable.

In one implementation, the variables can include variable arrays including bound interview start time arrays, bound interview end time arrays, Boolean penalty arrays, Boolean interviewer mappings, and Boolean interview mappings. In one embodiment, the bound interview start and end time arrays include arrays of N integers, where each integer is a number of minutes since the unix epoch within the range of the given availability window (availability_min/availability_max). The Boolean penalty arrays can include array of N Boolean (true/false) values, where each value is true if and only if the N'th interview requires double booking or overloading its assigned interviewer or a calendar resource. The Boolean interviewer mappings array can include a 2-D array of M×N Booleans, where each value is true if and only if the I'th interviewer is assigned to conduct the J'th interview. And the Boolean interview mappings array 2-D array of N×N Booleans, where each value is true if and only if the I'th interview from the input corresponds to the J'th interview in the output.

In at least one implementation, the constraints can include a set of predetermined rules, which allow the scheduling engine to quickly solve the multi variable problem quickly. In some embodiments, the predetermined rules can include:

1) the sum of all true penalty Booleans must equal our target number of penalties from the input;
2) the start time of the first interview must be on the half hour;
3) durations of each interview are enforced;
4) interviews are forced to be consecutive;
5) each input interview must have exactly one output interview assignment;
6) each interviewer has at most one interview assignment, unless the scheduling system received an explicit indication for the requested interviewer to be included more than once;
7) each interview is to have exactly the number of requested interviewers assigned;
8) for interviews with explicitly-requested interviewers, require that at least one of the given interviewers is assigned to the given interview;
9) the interviewers or the resources are not double-booked (or take a penalty for the assigned interview);
10) penalties cannot be taken without deserving it;
11) interview ordering or timing requirements are enforced;
12) artificial ordering constraints are added between equivalent interviews (interviews with the same exact criteria) to avoid minion producing duplicate results;
13) specific start time constraints are enforced; and
14) penalties if an overloaded interviewer is utilized are enforced. It is appreciated that other constraints can be programmed based on the desired accuracy of the solution and the desired processing speed of the scheduling engine.

In act 906, the inputs are transmitted to the scheduling engine for processing. As described above, the scheduling engine, in one embodiment, can be included as part of the scheduling system. In another embodiment, the scheduling engine can be located remotely from the scheduling system.

In act 908, the scheduling engine can provide solutions, which can be received by the scheduling system. The scheduling solutions may comprise a file including a list of the solutions found, with variable assignments for each solution. For example, for an output that includes four solutions, each of the solutions can include 11 variable arrays, each array having a set of values corresponding to the variables, constraints and constants provided to the scheduling engine. In one embodiment, no or zero solutions can be returned by the scheduling solution, such as if no solution exists for the variables, constants and constraints provided to the scheduling engine. The scheduling system can compile the solutions from the scheduling engine to produce interview proposals. The interview proposals are provided in a form that can be provided to a user of the scheduling system.

In act 910, the scheduling system merges the proposals into one sorted list of interview proposals. In one implementation, the merging step allows the scheduling system to quickly search and locate alternative proposals and alternative interviewers if any changes to the schedule are subsequently made. The merging step provides for the scheduling engine to provide the interview results in sorted order (by penalty count). In one embodiment, the sorted order of the results is kept even when the results are returned to the user via a number of asynchronous, unordered requests. In one implementation, the merging and all scheduling results are forgotten once the user selects one of the proposed schedules and finalizes the interview schedule. Subsequent changes or customizations to the interview schedule are input to the scheduling system as a new interview specification, which returns the method 900 to act 902.

Figure 11:
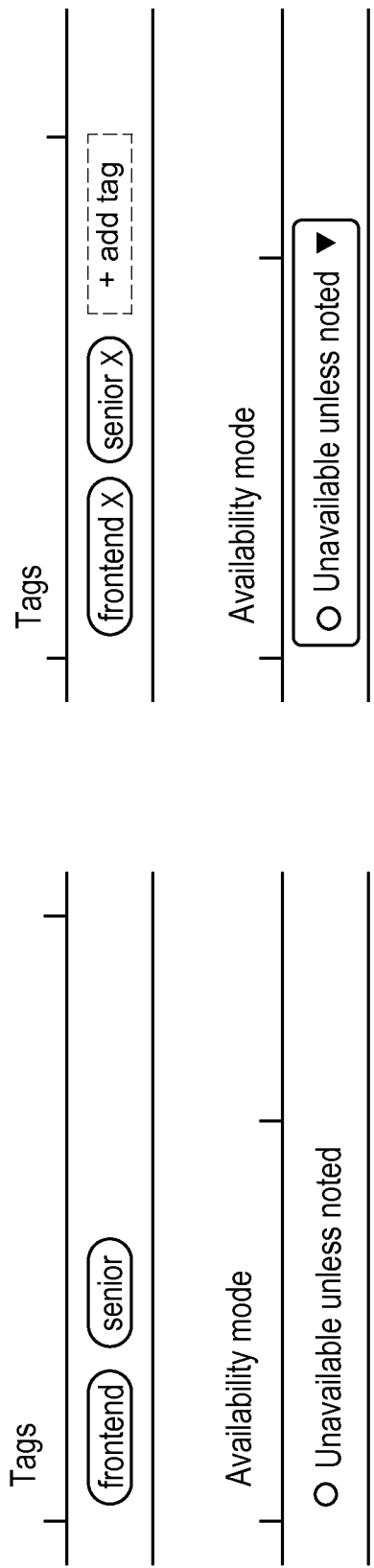
FIG. 11 is an illustration of another interviewer management screen provided by the scheduling system with an availability mode of an interviewer according to one embodiment.
Figure 14:
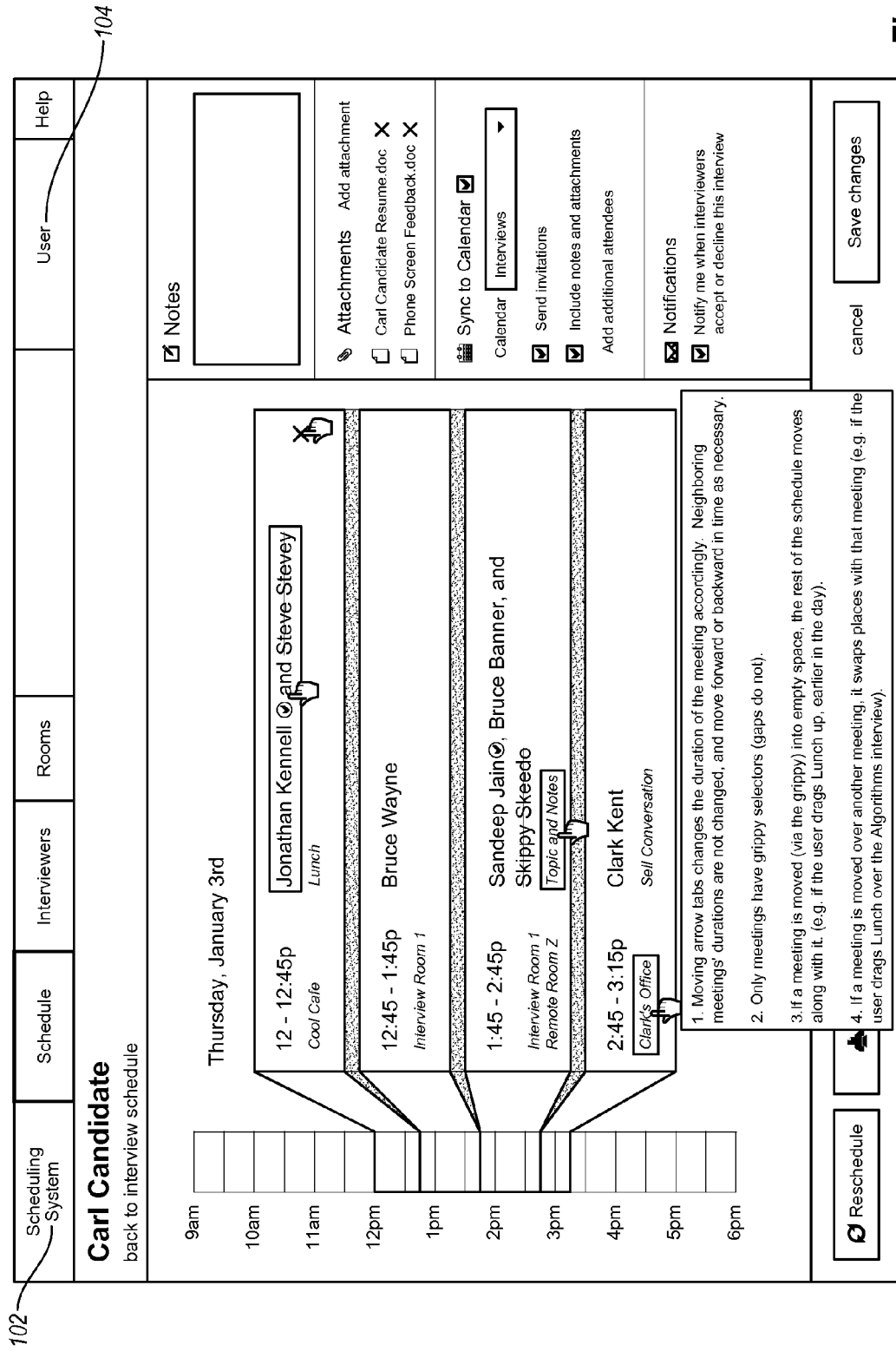
Figure 15:
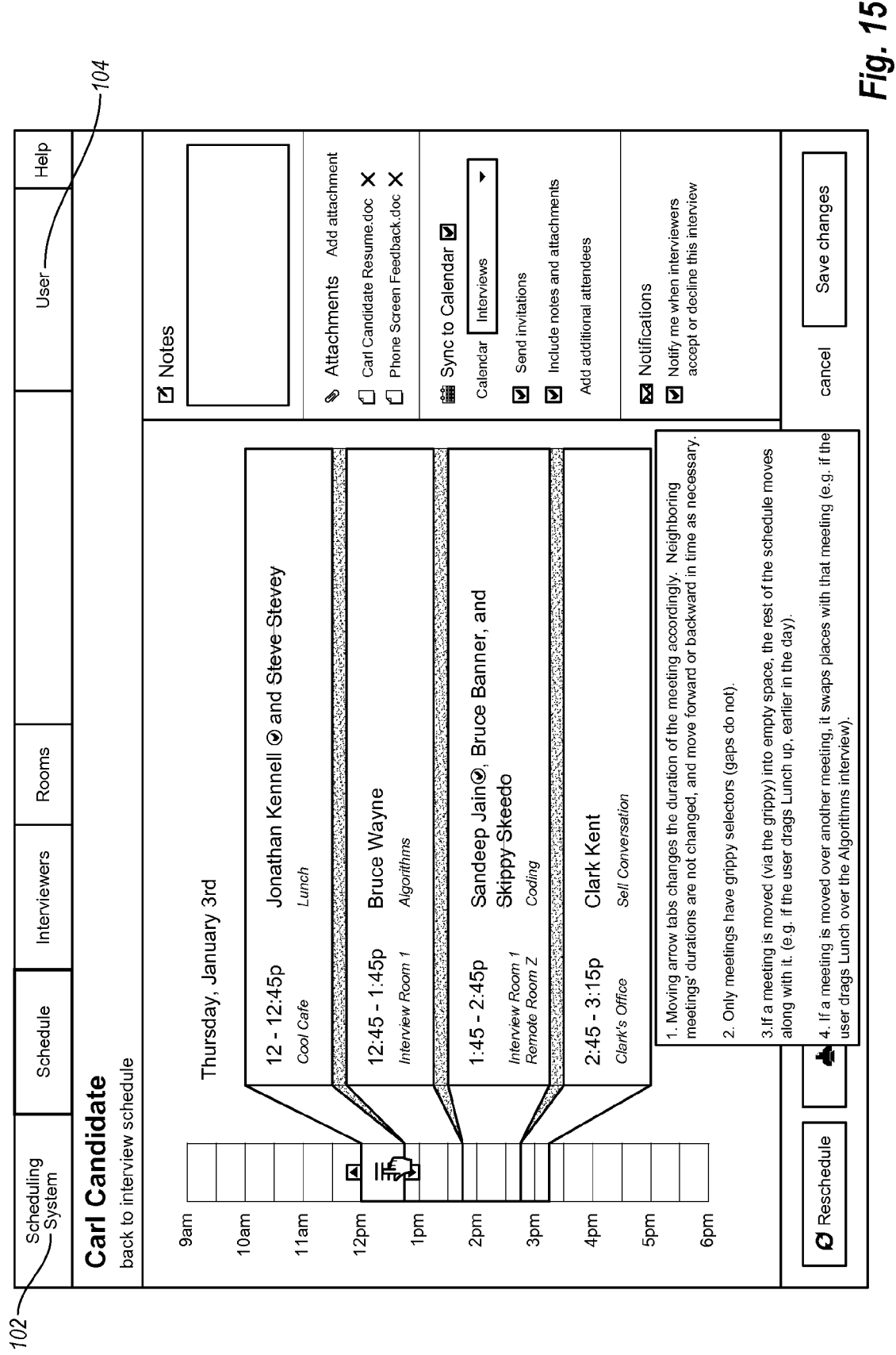
Figure 18:

FIG. 10 is an illustration of another interviewer management screen provided by the scheduling system with additional interviewer fields according to one embodiment;

FIG. 11 is an illustration of another interviewer management screen provided by the scheduling system with an availability mode of an interviewer according to one embodiment;

FIG. 12 is an illustration of another interviewer management screen provided by the scheduling system with elements for manually adding available times for an interviewer according to one embodiment;

FIG. 13 is an illustration of another interviewer management screen provided by the scheduling system with multiple linked calendars according to one embodiment;

FIGS. 14-18 are illustrations of interview management screens provided by the scheduling system for rendering an interview schedule with multiple back-to-back interview sessions and modifying the interview schedule according to various embodiments; and FIG. 19 is an illustration of another interviewer management screen provided by the scheduling system for swapping interviewers according to one embodiment.

The document titled "New Account Wireframes 2013-01-02" is hereby incorporated herein by reference in its entirety and attached hereto as Appendix A. The document titled "New Interviewers Wireframes 2013-01-04" is hereby incorporated herein by reference in its entirety and attached hereto as Appendix B. The document titled "New Rooms Wireframes 2013-01-03" is hereby incorporated herein by reference in its entirety and attached hereto as Appendix C. The document titled "New Schedule Wireframes 2013-01-07" is hereby incorporated herein by reference in its entirety and attached hereto as Appendix D. The document titled "Reschedge API disclosure" is hereby incorporated herein by reference in its entirety and attached hereto as Appendix E. The document titled "Reschedge Data Structure Disclosure" is hereby incorporated herein by reference in its entirety and attached hereto as Appendix F. The document titled "Reschedge patent introduction" is hereby incorporated herein by reference in its entirety and attached hereto as Appendix G. The document titled "Reschedge system architecture disclosure" is hereby incorporated herein by reference in its entirety and attached hereto as Appendix H. The presentation titled "Under the hood of Reschedge" is hereby incorporated herein by reference in its entirety and attached hereto as Appendix I. The document titled "Reschedge Wireframes 2012-08-09" is hereby incorporated herein by reference in its entirety and attached hereto as Appendix J. The document titled "Reschedge Wireframes 2012-09-20" is hereby incorporated herein by reference in its entirety and attached hereto as Appendix K. The document titled "Schedule 2013-01-11" is hereby incorporated herein by reference in its entirety and attached hereto as Appendix L.

Having thus described several aspects of at least one embodiment, it is to be appreciated that various alterations, modifications, and improvements will readily occur to those skilled in the art. For instance, examples and embodiments disclosed herein may also be used in other contexts. Such alterations, modifications, and improvements are intended to be part of this disclosure, and are intended to be within the scope of the embodiments discussed herein. Accordingly, the foregoing description and drawings are by way of example only.

What is claimed is:

1. A method comprising:
presenting, by an interview-scheduling tool executing by a processing device, a user interface to receive candidate availability information from a user for possible interview schedules for an interview candidate and to permit the user to define an interview schedule framework that specifies desired criteria for a desired interview schedule for the interview candidate, wherein the desired criteria of the interview schedule framework specify a plurality of interview sessions, and, for each of the plurality of interview sessions:
an interview topic for the respective interview session; and
a desired start time and a desired end time or desired duration for the respective interview session;
receiving, by the interview-scheduling tool, the candidate availability information and the desired criteria, wherein at least two of the plurality of interview sessions are back-to-back interview sessions;
defining, by the interview-scheduling tool, a data structure representing the interview schedule framework, wherein the data structure comprises a set of constraint satisfaction problems (CSPs), wherein defining the data structure comprises creating an input file with the set of CSPs by defining a list of variables that make up the CSPs, wherein the list of variables are provided in a two-dimensional array of integers, and wherein the set of constraints comprises:
a first constraint to find a solution that has exactly one penalty from an interviewer conflict, an interview location conflict or a room change for a number of candidate availability windows to be checked for the desired interview schedule;
a second constraint to enforce that the plurality of interview session are consecutive;
a third constraint to enforce that each of the available interviewers has at most one interviewer role assignment unless specifically identified in the desired criteria; sending the input file to a constraint solver tool;

receiving an output file from the constraint solver tool, wherein result values for the list of variables are to be returned in the output file and wherein the output file comprises data representing the zero or more interview schedule results that fit the interview schedule framework; and presenting, by the interview-scheduling tool, zero or more interview schedule results that fit the desired interview schedule for selection by the user, wherein the zero or more interview schedule results are automatically generated from the set of CSPs by the constraint solver tool and without additional user interaction at the user interface.

2. The method of claim 1, further comprising:
receiving, by the interview-scheduling tool, a selection of one of the zero or more interview schedule results as a selected interview schedule for the interview candidate; and initiating, by the interview-scheduling tool, scheduling operations to schedule the selected interview schedule.

3. The method of claim 2, further comprising presenting a visual representation of interview session of the selected interview schedule on a timeline, wherein the visual representation comprises statuses of the plurality of interview sessions of the selected interview schedule.

4. The method of claim 1, wherein the desired criteria of the interview schedule framework further specify at least one of a specific interviewer name or an interviewer tag, wherein the interviewer tag is to permit the user to specify a type of interviewer without specifying an interviewer name, wherein the method further comprises:
generating, by the interview-scheduling tool, a list of available interviewers in view of at least one of the specific interviewer name or the interviewer tag; and
obtaining, by the interview-scheduling tool, availability information for the list of available interviewers, wherein the defining the data structure further comprises defining the availability information as availability constraints in the set of CSPs.

5. The method of claim 4, further comprising tracking, by the interview-scheduling tool, interviewer load of a plurality of interviewers, and wherein generating the list of available interviewers comprises generating the list of available interviewers in view of the interview load of the plurality of interviewers.

6. The method of claim 1, wherein the desired criteria of the interview schedule framework further specify at least one of a specific interview location or an interview location tag, wherein the interview location tag is to permit the user to specify a type of interview location without specifying the specific interview location, wherein the method further comprises:
generating, by the interview-scheduling tool, a list of available interview locations in view of at least one of the specific interviewer location or the interview location tag; and
obtaining, by the interview-scheduling tool, availability information for the list of available interview locations, wherein the defining the data structure further comprises defining the availability information as interview location availability constraints in the set of CSPs.

7. The method of claim 1, wherein the desired criteria of the interview schedule framework further specify timing and ordering information comprising at least one of a interview position designation or a specific time for each of the plurality of interview sessions, wherein the defining the data structure further comprises defining the timing and ordering information as timing and ordering constraints in the set of CSPs.

8. The method of claim 1, further comprising automatically generating, by the interview-scheduling tool, the zero or more of interview schedule results from the set of CSPs without the additional user interaction at the user interface.

9. The method of claim 1, further comprising:
determining, by the interview-scheduling tool, a ranking of the zero or more interview schedule results; and
presenting, by the interview-scheduling tool, the zero or more interview schedule results in an order based on the ranking.

10. The method of claim 9, wherein the input file comprises an input language based on common constraint matrix modeling, wherein the list of variables comprises interview times in the two-dimensional array of integers, wherein each row represents start and end times of one of the respective interview session and each column represents whether the respective interview session is occurring in the respective time interval, wherein the two-dimensional array further comprises a first column with a first index of a start time when the respective interview session begins and a second column with a second index of an end time when the respective interview session ends.

11. The method of claim 9, wherein the input file comprises an input language based on common constraint matrix modeling, wherein the list of variables comprises available interviewers in a two-dimensional array of Boolean variables, wherein rows represent the available interviewers and columns represent the plurality of interview sessions, or vice versa, wherein a list of available interviewers is based on the at least one of an interview name or an interviewer tag in the desired criteria.

12. The method of claim 9, wherein the input file comprises an input language based on common constraint matrix modeling, wherein the list of variables comprises available interview locations in a two-dimensional array of Boolean variables, wherein rows represent the available interview locations and columns represent the plurality of interview sessions, or vice versa.

13. The method of claim 1, wherein the input file comprises:
defining, from the desired criteria of the interview schedule framework, a set of constraints that define what values can be assigned to the list of variables.

14. The method of claim 13, wherein the list of variables further comprises at least one of:
a first helper variable to store a start time for a first interview session of the plurality of interview sessions;
a second helper variable to store an end time for a last interview session of the plurality of interview sessions;
a third helper array of Boolean variables to track which one of the plurality of interview sessions is to occur after which other one of the plurality of interview sessions; or
a fourth helper array to track a final order of each of the plurality of interview sessions.

15. The method of claim 13, wherein the list of variables further comprises a penalty variable to designate one or more of an interviewer conflict, an interview location conflict and a location change.

16. The method of claim 13, wherein the set of constraints comprises:
interviewer constraint;
interviewer availability constraints;
interview location constraints;
interview location availability constraints;

a general ordering constraint, if any, between the plurality of interview sessions; and a specific ordering constraint, if any, of one of the plurality of interview sessions.

17. The method of claim 13, wherein the set of constraints further comprise one or more of the following:
   a fourth constraint to enforce an exact start time and duration of each of the plurality of interview sessions;
   a fifth constraint to enforce that no two interview sessions of the plurality of interview sessions overlap;
   a sixth constraint to enforce that the plurality of interview sessions start at a correct modulo;
   a seventh constraint to enforce that each interviewer role must have exactly one interviewer assignment;
   an eighth constraint to enforce that each available interview location role must have exactly one interview location assignment;
   a ninth constraint to enforce that a specific interviewer be assigned to a specific interview session;
   a tenth constraint to enforce an order on duplicate interview sessions so as to avoid duplicate interview schedule results; or
   an eleventh constraint to enforce a penalty when there is a change of interview locations between any two of the plurality of interview sessions.

18. The method of claim 1, further comprising saving, by the interview-scheduling tool, a template of the interview schedule framework for subsequent use in scheduling a subsequent interview.

19. A non-transitory computer-readable storage medium including instructions that, when executed by a processing device of a computing system, cause the computing system to perform operations comprising:
   presenting, by an interview-scheduling tool executing by the processing device, a user interface to receive candidate availability information from a user for possible interview schedules for an interview candidate and to permit the user to define an interview schedule framework that specifies desired criteria for a desired interview schedule for the interview candidate, wherein the desired criteria of the interview schedule framework specify a plurality of interview sessions, and, for each of the plurality of interview sessions:
      an interview topic for the respective interview session; and
      a desired start time and a desired end time or desired duration for the respective interview session;
   receiving, by the interview-scheduling tool, the candidate availability information and the desired criteria, wherein at least two of the plurality of interview sessions are back-to-back interview sessions;
   defining, by the interview-scheduling tool, a data structure representing the interview schedule framework, wherein the data structure comprises a set of constraint satisfaction problems (CSPs), wherein defining the data structure comprises creating an input file with the set of CSPs by defining a list of variables that make up the CSPs, wherein the list of variables are provided in a two-dimensional array of integers, and wherein the set of constraints comprises:
      a first constraint to find a solution that has exactly one penalty from an interviewer conflict, an interview location conflict or a room change for a number of candidate availability windows to be checked for the desired interview schedule;
      a second constraint to enforce that the plurality of interview session are consecutive;
      a third constraint to enforce that each of the available interviewers has at most one interviewer role assignment unless specifically identified in the desired criteria;
   sending the input file to a constraint solver tool;
   receiving an output file from the constraint solver tool, wherein result values for the list of variables are to be returned in the output file and wherein the output file comprises data representing the zero or more interview schedule results that fit the interview schedule framework; and
   presenting, by the interview-scheduling tool, a plurality of interview schedule results that fit the desired interview schedule for selection by the user, wherein the plurality of interview schedule results are automatically generated from the set of CSPs by the constraint solver tool and without additional user interaction at the user interface.

20. The non-transitory computer-readable storage medium of claim 19, wherein the desired criteria of the interview schedule framework further specify at least one of a specific interviewer name or an interviewer tag, wherein the interviewer tag is to permit the user to specify a type of interviewer without specifying an interviewer name, wherein the operations further comprise:
   generating, by the interview-scheduling tool, a list of available interviewers in view of at least one of the specific interviewer name or the interviewer tag; and
   obtaining, by the interview-scheduling tool, availability information for the list of available interviewers, wherein the defining the data structure further comprises defining the availability information as availability constraints in the set of CSPs.

21. A computing system comprising:
   a data storage device; and
   a processing device, coupled to the data storage device, to execute an interview-scheduling tool, wherein the interview-scheduling tool is to:
   present a user interface to receive candidate availability information from a user for possible interview schedules for an interview candidate and to permit the user to define an interview schedule framework that specifies desired criteria for a desired interview schedule for the interview candidate, wherein the desired criteria of the interview schedule framework specify a plurality of interview sessions, and, for each of the plurality of interview sessions:
      an interview topic for the respective interview session; and
      a desired start time and a desired end time or desired duration for the respective interview session;
   receive the candidate availability information and the desired criteria;
   define a data structure representing the interview schedule framework, wherein the data structure comprises a set of constraint satisfaction problems (CSPs), wherein to define the data structure, the processing device is to create an input file with the set of CSPs by defining a list of variables that make up the CSPs, wherein the list of variables are provided in a two-dimensional array of integers, and wherein the set of constraints comprises:
      a first constraint to find a solution that has exactly one penalty from an interviewer conflict, an interview location conflict or a room change for a number of candidate availability windows to be checked for the desired interview schedule;
      a second constraint to enforce that the plurality of interview session are consecutive;

a third constraint to enforce that each of the available interviewers has at most one interviewer role assignment unless specifically identified in the desired criteria;

send the input file to a constraint solver tool;

receive an output file from the constraint solver tool, wherein result values for the list of variables are to be returned in the output file and wherein the output file comprises data representing the zero or more interview schedule results that fit the interview schedule framework; and present a plurality of interview schedule results that fit the desired interview schedule for selection by the user, wherein the plurality of interview schedule results are automatically generated from the set of CSPs by the constraint solver tool and without additional user interaction at the user interface.

22. The computing system of claim 21, wherein the processing device is further to execute the constraint solver tool.

* * * * *